United States Patent
Lu et al.

(10) Patent No.: US 11,781,685 B2
(45) Date of Patent: Oct. 10, 2023

(54) QUICK-FITTING PIPE FITTING ASSEMBLY

(71) Applicant: Shanghai Vision Mechanical Joint Co., Ltd., Shanghai (CN)

(72) Inventors: Zhigang Lu, Shanghai (CN); Zhibing Zhai, Suzhou (CN)

(73) Assignee: Shanghai Vision Mechanical Joint Co., Ltd., Shanghai (CN)

( * ) Notice: Subject to any disclaimer, the term of this patent is extended or adjusted under 35 U.S.C. 154(b) by 171 days.

(21) Appl. No.: 17/361,291

(22) Filed: Jun. 28, 2021

(65) Prior Publication Data

US 2022/0186861 A1 Jun. 16, 2022

(30) Foreign Application Priority Data

Dec. 11, 2020 (CN) .......................... 202011456294.0
Jun. 9, 2021 (CN) .......................... 202110644539.0

(51) Int. Cl.
*F16L 43/00* (2006.01)
*F16L 23/08* (2006.01)

(52) U.S. Cl.
CPC .............. *F16L 23/08* (2013.01); *F16L 43/00* (2013.01)

(58) Field of Classification Search
CPC . F16L 23/08; F16L 43/00; F16L 17/04; F16L 43/02; F16L 21/065
See application file for complete search history.

(56) References Cited

U.S. PATENT DOCUMENTS

| 793,209 A | 6/1905 | Miller | |
| 2,406,235 A * | 8/1946 | McCoy | F16L 49/00 285/179 |
| 5,967,564 A * | 10/1999 | Gaucherot | F16L 23/04 285/23 |
| 11,619,330 B2 * | 4/2023 | Drivon | F16L 23/003 285/334.5 |

(Continued)

FOREIGN PATENT DOCUMENTS

| CN | 203823271 U | 9/2014 | |
| CN | 207673995 U | 7/2018 | |
| DE | 202013001224 U1 * | 4/2013 | ............. F16L 23/08 |

(Continued)

OTHER PUBLICATIONS

English Tanslation of the Description Portion of FR-2697893, retrieved from EPO, on Apr. 5, 2023.*

(Continued)

*Primary Examiner* — Zachary T Dragicevich
*Assistant Examiner* — James A Linford

(57) ABSTRACT

A quick-fitting pipe fitting assembly for coupling with at least one pipe element includes a pipe fitting body, at least one coupling unit, at least one gasket and a plurality of connecting elements. Each coupling unit includes a fixed coupling element integrally extended from the pipe fitting body and a movable coupling element, the gasket disposed at the coupling unit, the connecting elements movably connect the fixed coupling element with the movable coupling element, wherein the at least one coupling unit is adapted for being preassembled with the at least one pipe element and can be fastened by at least one fastening element that is capable of being operated to fasten the movable coupling element with the fixed coupling element.

22 Claims, 46 Drawing Sheets

(56) References Cited

U.S. PATENT DOCUMENTS

2018/0209568 A1* 7/2018 Gill .................. F16L 25/12
2020/0141525 A1* 5/2020 Drivon ............... F16L 23/003

FOREIGN PATENT DOCUMENTS

EP          0769647  A1 *  4/1997
FR          1316313  A  *  1/1963
FR          2697893  A1 *  5/1994    ............. F16L 23/08

OTHER PUBLICATIONS

List of references cited by examiner in U.S. Appl. No. 17/410,066 issued on Apr. 12, 2023.

* cited by examiner

QUICK-FITTING PIPE FITTING ASSEMBLY

CROSS REFERENCE OF RELATED APPLICATION

This application is a non-provisional application that claims priority under 35 U.S.C. § 119 to China application number CN202011456294.0, filed Dec. 11, 2020, and China application number CN202110644539.0, filed Jun. 9, 2021, wherein the entire content of which is expressly incorporated herein by reference.

BACKGROUND OF THE PRESENT INVENTION

Field of Invention

The present invention relates to a pipe fitting for coupling at least one pipe element, and more particularly to a quick-fitting pipe fitting assembly which can be conveniently and quickly installed with the pipe element.

Description of Related Arts

A pipe fitting, such as an elbow, a tee, a cross, a reducer, and a pipe blind, is generally used to couple with one or more pipe elements. A convention pipe fitting requires two or more joints for coupling with the pipe elements. Each of the joints, such as a grooved joints, generally includes two or more shells, a gasket received in the shells, and a plurality of fasteners such as bolt and nut fasteners for firmly fastening the shells together. Each of the shells is formed with an engaging key for coupling with a corresponding groove of the corresponding pipe element. Therefore, two or more separated joints are required for coupling the conventional fitting with the corresponding pipe element, so that the installation is relatively time-consuming and labor-intensive. Further, it is easy to cause the loss of the joints and the fasteners.

SUMMARY OF THE PRESENT INVENTION

The invention is advantageous in that it provides a quick-fitting pipe fitting assembly which has a simple structure and can reduce installation steps, save installation time, and improve installation efficiency.

Another advantage of the invention is to provide a quick-fitting pipe fitting assembly, wherein each end portion of the quick-fitting pipe fitting assembly is integrally formed with a fixed coupling element, and the installing process only requires fastening a movable coupling element with the fixed coupling element to accomplish the coupling between the pipe fitting and a corresponding pipe element, so that the operation is convenient and reliable.

Another advantage of the invention is to provide a quick-fitting pipe fitting assembly, wherein since a portion of a coupling unit is integrally formed on the fitting body, the number of components of the quick-fitting pipe fitting is reduced, so that the management efficiency of the quick-fitting pipe fitting is improved.

Another advantage of the invention is to provide a quick-fitting pipe fitting assembly, wherein the connecting elements for connecting and fastening each coupling unit can be preassembled on the coupling unit, so as to reduce the management cost of the connecting elements, and to increase the connecting efficiency of the quick-fitting pipe fitting assembly with the pipe elements.

Another advantage of the invention is to provide a quick-fitting pipe fitting assembly, wherein a gasket can be provided between the coupling unit of the quick-fitting pipe fitting assembly and the pipe element, so as to enhance the tightness of the connection between the quick-fitting pipe fitting assembly and the pipe element and prolong a service life of the quick-fitting pipe fitting assembly. In addition, the gasket is detachably installed with the quick-fitting pipe fitting assembly, so it can be replaced after damage.

Additional advantages and features of the invention will become apparent from the description which follows and may be realized by means of the instrumentalities and combinations particularly pointing out in the appended claims.

According to the present invention, the foregoing and other objects and advantages are attained by a quick-fitting pipe fitting assembly for coupling with at least one pipe element, wherein the quick-fitting pipe fitting assembly comprises a pipe fitting body, at least one coupling unit, at least one gasket, and a plurality of connecting elements. Each coupling unit comprises a fixed coupling element integrally extended from the pipe fitting body and a movable coupling element. The gasket is disposed at the coupling unit. The connecting elements movably connect the fixed coupling element with the movable coupling element. The at least one pipe element is adapted for being preassembled with the at least one coupling unit. The plurality of connecting elements comprises at least one fastening element that is capable of being operated to fasten the movable coupling element with the fixed coupling element, so as to fasten the at least one pipe element with the at least one coupling unit.

The present invention further provides a method for coupling a pipe element via a quick-fitting pipe fitting assembly, wherein the method comprises a step of receiving a coupling end portion of the pipe element by a coupling unit which comprises a fixed coupling element and a movable coupling element, wherein the fixed coupling element is integrally extended from a pipe fitting body, and the movable coupling element is movably mounted with the fixed coupling element.

The present invention further provides a method for coupling a pipe element via a quick-fitting pipe fitting assembly, wherein the method comprises the following steps.

(A) Insert a coupling end portion of the pipe element in at least a coupling unit which comprises a fixed coupling element integrally extended from a pipe fitting body and a movable coupling element which is movably connected with the fixed coupling element.

(B) Operate a fastening element to fasten the fixed coupling element with the movable coupling element to retain the coupling end portion of the pipe element in the coupling unit.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
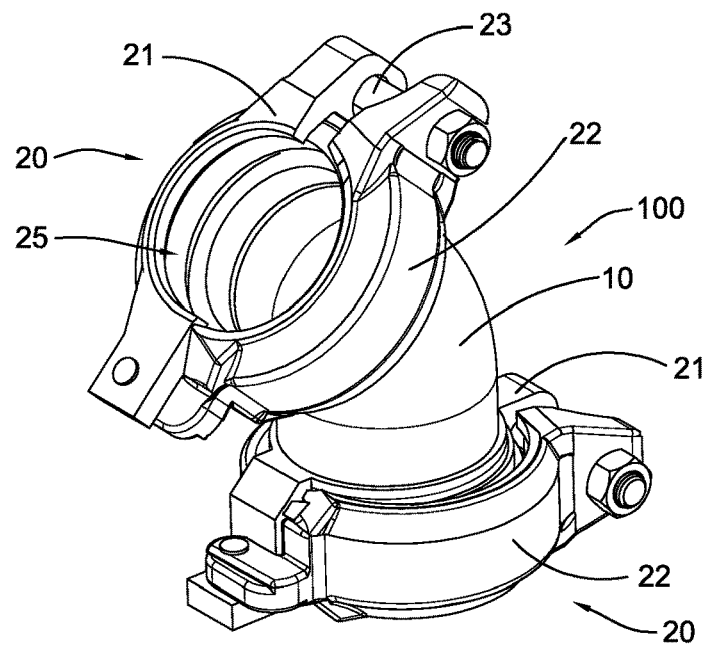
FIG. 1 is a perspective view of a quick-fitting pipe fitting assembly according to a first preferred embodiment of the present invention.
Figure 2:
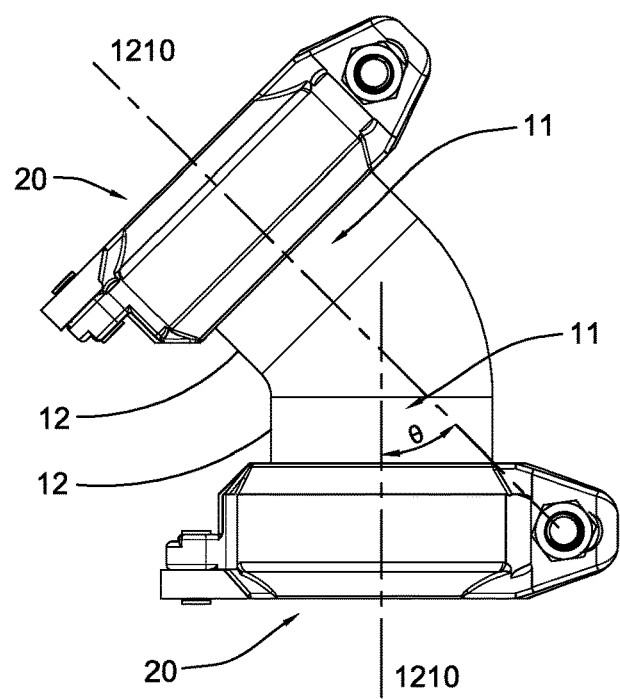
FIG. 2 is a side schematic view illustrating the quick-fitting pipe fitting assembly according to the above first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIG. 1 to FIG. 6C of the drawings, a quick-fitting pipe fitting assembly 100 for coupling with a plurality of pipe elements 200 according to a first preferred embodiment of the present invention is illustrated. The quick-fitting pipe fitting assembly 100 can be worked as an elbow, a coupling, a union, an adaptor, a flange, a nipple, a tee, a cross, a bushing, a wye, a barb, a reducer, a valve, a bend, a blind plate, a weldolet, a threadolet, a sockolet, a latrolet, a nipolet, and a sweepolet.

According to this preferred embodiment, the quick-fitting pipe fitting assembly 100, which is embodied as an elbow, comprises a pipe fitting body 10 which is an elbow body having two channels 11 communicated with each other and comprising two fitting portions 12 defining the two channels 11 respectively with each fitting portion 12 has an end portion 121, two coupling units 20 provided at the two end portions 121 of the pipe fitting body 10 respectively for coupling with two pipe elements 200, and two gaskets 30 disposed at the two coupling units 20 respectively. The two fitting portions 12 are integrated with each other to form a tubular structure and define an angle θ between two axles 1210 of the two end portions 121, the angle θ can be 30° to 180°, such as 30°, 45°, 60°, 90°, 120°, 150°, and 180°. According to this embodiment, the angle θ is 45°. Accordingly, when the two pipe elements 200 are assembled with the quick-fitting pipe fitting assembly 100 of this embodiment which is embodied as a 45° elbow, the extending directions of the two pipe elements 200 define an included angle which is 45°.

Figure 3:
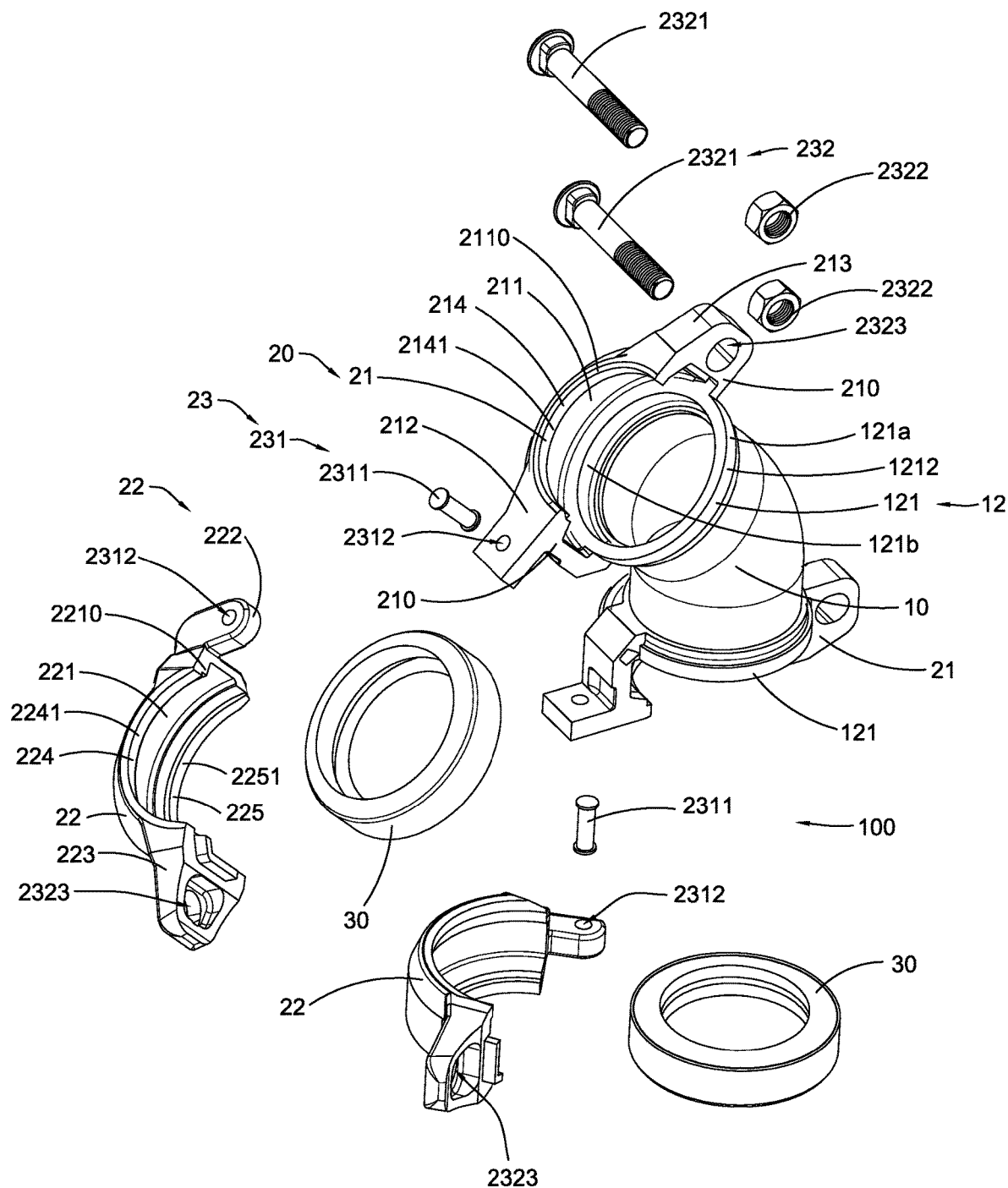
FIG. 3 is an exploded view of the quick-fitting pipe fitting assembly according to the above first preferred embodiment of the present invention.
Figure 4:
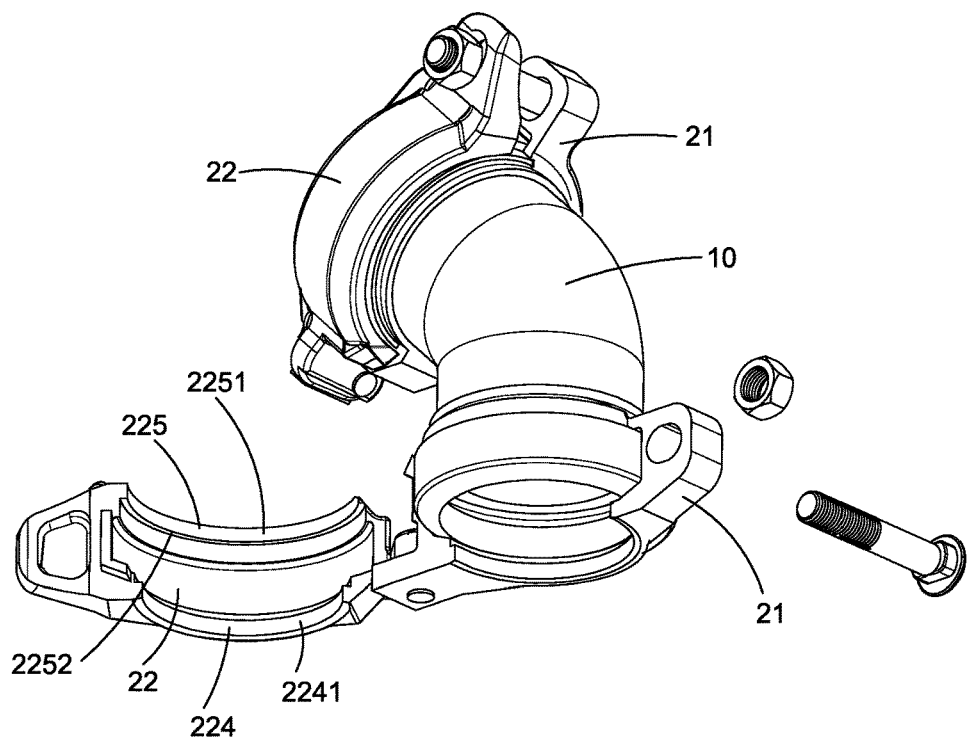
FIG. 4 is a partially exploded perspective view illustrating movable coupling elements and a pipe fitting body of the quick-fitting pipe fitting assembly according to the above first preferred embodiment of the present invention.
Figure 5:
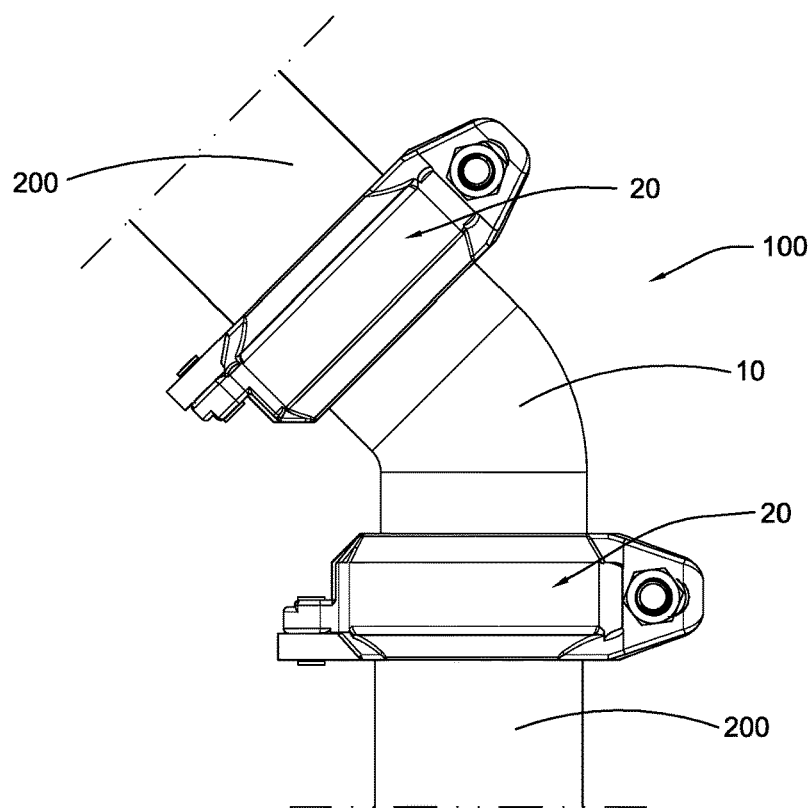
FIG. 5 is a schematic view illustrating the quick-fitting pipe fitting assembly being coupled with two pipe elements according to the above first preferred embodiment of the present invention.

More specifically, as shown in FIGS. 3 and 4 of the drawings, each of the two coupling units 20 comprises a fixed coupling element 21, a movable coupling element 22, and a plurality of connecting elements 23 for connecting the fixed coupling element 21 with the movable coupling element 22. The fixed coupling element 21 is integrally extended from the corresponding end portion 121 of the pipe fitting body 10 for being fastened with the movable coupling element 22 by the connecting elements 23, so as to couple the corresponding pipe element 200 with the quick-fitting pipe fitting assembly 100.

According to the present invention, the fixed coupling element 21 is integrated with the pipe fitting body 10 to form a main body portion having a one-piece structure. In other words, the main body is integrally manufactured to provide the fixed coupling element 21 and the pipe fitting body 10. It only requires fastening the movable coupling element 22 to the fixed coupling element 21 when coupling one of the pipe elements 200 to the corresponding coupling unit 20 of the quick-fitting pipe fitting assembly 100, so that the pipe fitting of the present invention is able to be quickly coupled with the pipe elements 200, and thus the quick-fitting of the pipe fitting of the present invention is accomplished.

The plurality of connecting elements 23 detachably couple the fixed coupling element 21 with the movable coupling element 22 of each of the two coupling units 20. According to this preferred embodiment, the plurality of connecting elements 23 comprises a pivotally connecting element 231 for pivotally connecting the fixed coupling element 21 with the movable coupling element 22 and a fastening element 232 for fastening the fixed coupling element 21 with the movable coupling element 22.

The fixed coupling element 21 of each of the two coupling units 20 comprises a fixed housing body 211, a first connecting portion 212, and a second connecting portion 213. The first connecting portion 212 and the second connecting portion 213 are respectively formed at two sides of the fixed housing body 211. The movable coupling element 22 of each of the two coupling units 20 comprises a movable housing body 221, a first connector portion 222, and a second connector portion 223. The first connector portion 222 and the second connector portion 223 are respectively formed at two sides of the movable housing body 221. The pivotally connecting element 231 pivotally connects the first connecting portion 212 of the fixed coupling element 21 with the first connector portion 222 of the movable coupling element 22 to allow the movable coupling element 22 of each of the two coupling units 20 to be movable with respect to the fixed coupling element 21. The fastening element 232 is arranged for fastening the second connecting portion 213 with the second connector portion 223 of the movable coupling element 22.

The pipe fitting body 10 can be made of metal or plastic. The fixed coupling element 21 and the movable coupling element 22 of each of the two coupling units 20 can be made of metal or plastic and can be coupled with each other to form a substantially loop structure defining an inner cavity 24 extended along a circumferential direction and having an opening 25. In this embodiment, each of the fixed coupling element 21 and the movable coupling element 22 has a C-shape defining two sides, wherein a first side of each coupling unit 20 is pivotally connected via the pivotally connecting element 231 and second side of each coupling unit 20 is connected via the fastening element 232.

The fixed coupling element 21 and the movable coupling element 22 are adapted to move between an opened position that the second connecting portion 213 of the fixed coupling element 21 and the second connector portion 223 of the movable coupling element 22 of each coupling unit 20 are moved away from each other, and a closed position that the second connecting portion 213 of the fixed coupling element 21 and the second connector portion 223 of the movable coupling element 22 of each coupling unit 20 are moved towards each other to firmly fasten the fixed coupling element 21 with the corresponding movable coupling element 22, so as to form the inner cavity 24. In this preferred embodiment, the fastening element 232 is configured to fasten the fixed coupling element 21 and the corresponding movable coupling element 22 at the closed position.

Each gasket 30, which is made of a resilient material, is disposed in the corresponding inner cavity 24 formed by the fixed coupling element 21 and the corresponding movable coupling element 22 of each of the two coupling units 20 for providing a sealing effect when the two pipe elements 200 are assembled with the quick-fitting pipe fitting assembly 100 of the present invention.

According to the present invention, before coupling the pipe elements 200 with the quick-fitting pipe fitting assembly 100, the fixed coupling element 21 may be separated with the movable coupling element 22 of each of the two coupling units 20, and each gasket 30 is not disposed in the corresponding coupling unit 20. Preferably, the fixed coupling element 21 is preassembled with the movable coupling element 22 of each of the two coupling units 20 by the connecting elements 23, and the gaskets 30 are disposed in the two coupling units 20 respectively. After each pipe element 200 is coupled to the coupling units 20, the fastening element 232 is operated to fasten the corresponding movable coupling element 22 with the fixed coupling element 21, so as to firmly couple each corresponding pipe element 200 to the quick-fitting pipe fitting assembly 100.

Each of the two pipe elements 200 can be a pipe, or a conventional pipe fitting without the coupling units 20 of the instant invention. Accordingly, the quick-fitting pipe fitting assembly 100 of the present invention can be used for coupling two pipes, a pipe and a conventional pipe fitting, two conventional pipe fittings.

According to this embodiment, each of the pipe elements 200 is embodied as a pipe which comprises a coupling end portion 201 which is a groove end portion having a coupling groove 202. The coupling groove 202 is indented on an outer circumferential surface of the pipe element 200, such that a diameter of the coupling groove 202 is smaller than an outer diameter of the pipe element 200. The diameter of the coupling end portion 201 is larger than the diameter of a coupling circumference 203 at a bottom of the coupling groove 202. In one embodiment, after forming the groove 201, the coupling end portion 201 is formed in such a manner that the diameter of the coupling end portion 201 is gradually increased from the groove 201 to the end of the pipe element 200. In another embodiment, when the groove 201 is formed by cutting off the portion corresponding to the position of the coupling groove 202, the diameters of the coupling end portion 201 along the length can be the same.

Each of the fixed coupling element 21 further comprises a fixed engaging key 214 integrally and inwardly extended from a fixed coupling end portion 2110 of the fixed coupling body 211 at a side remotely from the end portion 121 of the pipe fitting body 10. Each of the movable coupling element 22 further comprises a first movable engaging key 224 and a second movable engaging key 225 integrally and inwardly extended from two movable coupling end portions 2210 of the movable coupling body 221 respectively.

Each of the two pipe elements 200 has the coupling groove 202 for engaging with the fixed engaging key 214 of the fixed coupling element 21 and the first engaging key 224 of the movable coupling element 22 of each of the two coupling units 20. Each of the second movable engaging keys 225 is arranged for being retained at the corresponding end portion 121 of the fitting portions of the pipe fitting body 10.

Accordingly, the opening 25 is defined between the fixed engaging key 214 of the fixed coupling element 21 and the first movable engaging key 224 of the movable coupling element 22 of each of the two coupling units 20 that it is big enough for the corresponding coupling end portion 201 of one of the two pipe elements 200 to pass therethrough, so that the quick-fitting pipe fitting assembly 100 can be directly installed with the pipe elements 200 without requiring to disassemble the gaskets 30 and the fastening elements 232.

According to this preferred embodiment of the present invention, each of the first movable engaging keys 224 has a first movable engaging surface 2241 which has varying radiuses of curvature, and each of the second movable engaging key 225 has a second movable engaging surface 2251 which has varying radiuses of curvature. Each of the fixed engaging keys 214 has a fixed engaging surface 2141 which has a fixed radius of curvature. Each of the pipe elements 200 has the coupling circumference 203 at the bottom of the corresponding coupling groove 202. In other words, the coupling circumference 203 is the bottom wall of the coupling groove 202. When the quick-fitting pipe fitting assembly 100 of the present invention is preassembled with one of the pipe elements 200 to align the first movable engaging key 224 and the fixed engaging key 214 of the corresponding coupling unit 20 with the corresponding coupling groove 202, the fastening element 232 is operated to firmly fasten the fixed coupling unit 21 with the movable coupling unit 22 in such a manner that the first movable engaging surface 2241 of the first movable engaging key 224 is deformed and a part of or all of the engaging surface 2241 is attached on the corresponding coupling circumference 203, the corresponding fixed engaging surface 2141 is not deformed, and the corresponding fixed engaging key 214 is retrained in the coupling groove 202. The second movable engaging surface 2251 of the second movable engaging key 225 of the corresponding movable coupling element 22 is pressed and retained on the corresponding end portion 121 of the fitting portions 12 of the pipe fitting body 10. The deformation of each of the engaging surfaces 2241 and 2251 results in deformed and varied radiuses of curvature thereof, and the variation range thereof is about 4.5% to 12%.

In other words, the first movable engaging surface 2241 of the first movable engaging key 224 of each movable coupling element 22 does not have a fixed radius of curvature, and thus each of the first movable engaging surfaces 2241 is not a circular surface with a round curvature. The coupling circumference 203 of each of the pipe elements 200 has a round curvature. The fixed engaging surface 2141 of the fixed engaging key 214 of each of the fixed coupling elements 21 can be constructed to have a round curvature. When the quick-fitting pipe fitting assembly 100 of the present invention is preassembled on the pipe elements 200 to align the engaging keys 224 and 214 with the corresponding coupling grooves 202, a gap 26 is formed between each first movable engaging surface 2241 and the corresponding coupling circumference 203 of each of the pipe elements 200. And then when the corresponding fastening element 232 is operated, the gap 26 is reduced until each of the first movable engaging surface 2241 is retained at a position that the firmly and stably coupling between the pipe elements 200 with quick-fitting pipe fitting assembly 100 is achieved.

According to this preferred embodiment, each of the first and second movable engaging surfaces 2241 and 2251 defines a curve of varying radiuses of curvature which can be but not limited to a logarithmic spiral curve, an Archimedes spiral curve, a pascal spiral curve, an ellipse curve, a high-power curve and a combination thereof. Accordingly, each of the engaging surfaces 2241 and 2251 does not have a round curvature and thus the gap 26 is created when each of the first movable engaging surfaces 2241 of the quick-fitting pipe fitting assembly 100 of the present invention is preassembled in the corresponding coupling grooves 202 of the pipe elements 200. As an example, each of the engaging surfaces 2241 and 2251 defines a logarithmic spiral curve having an equation of $\rho=e^{\theta}$, wherein $\theta$ has a range of 0-180°.

Figure 6A:
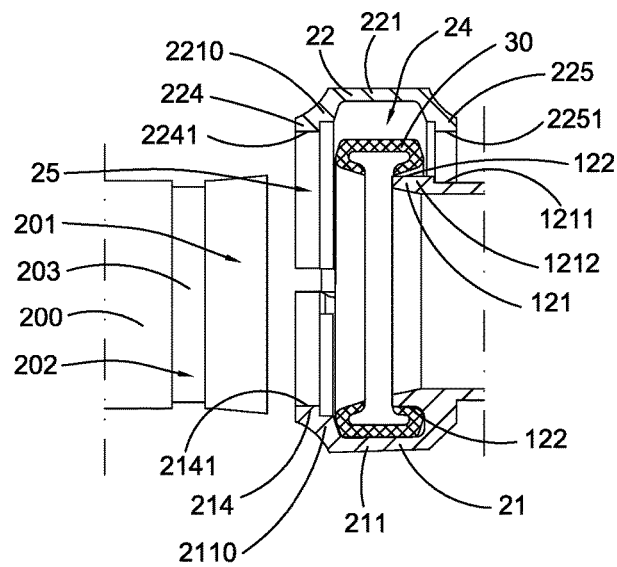
FIG. 6A is a sectional view illustrating a state before the pipe element is coupled with the quick-fitting pipe fitting according to the above first preferred embodiment of the present invention.
Figure 6B:
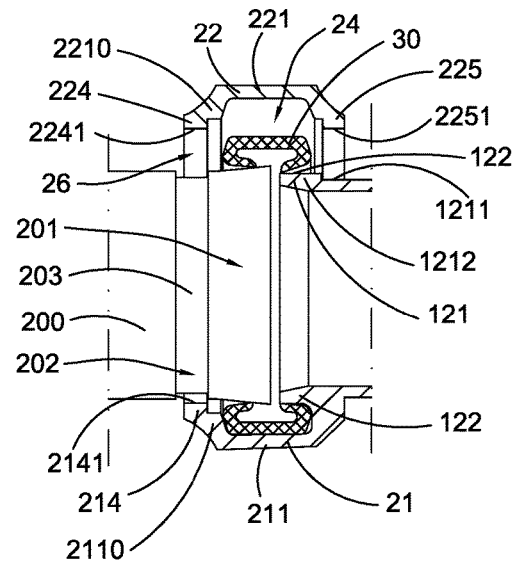
FIG. 6B is a sectional view illustrating a state in which the pipe element is being installed to the quick-fitting pipe fitting according to the above first preferred embodiment of the present invention.
Figure 6C:
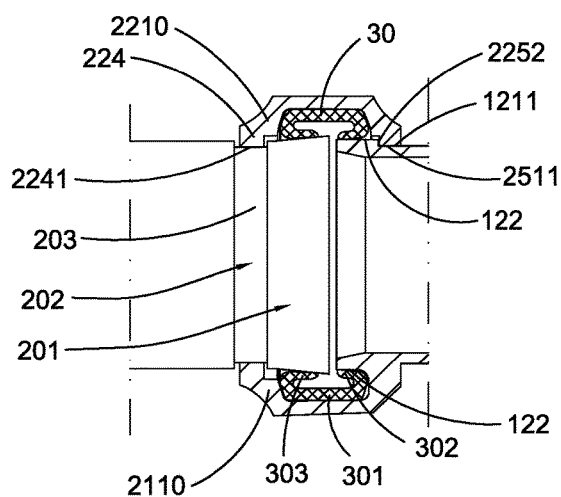
FIG. 6C is a sectional view illustrating a state in which a first coupling unit is firmly coupled so as to firmly couple the pipe element with the quick-fitting pipe fitting assembly according to the above first preferred embodiment of the present invention.
Figure 6D:
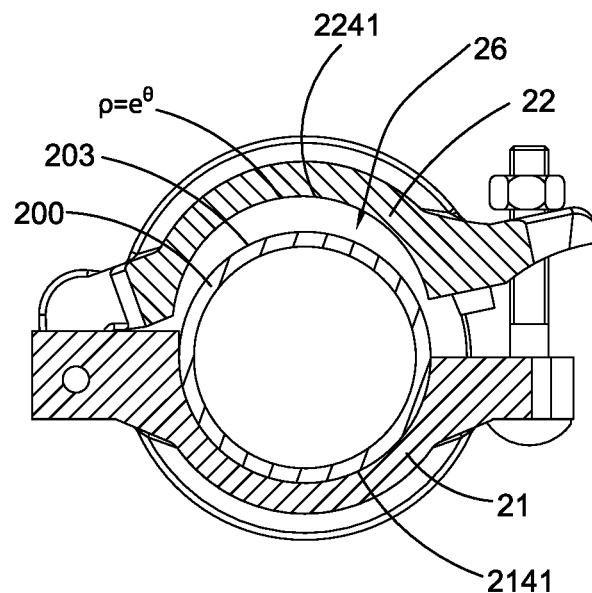
FIGS. 6D and 6E are sectional views illustrating the operation of a fastening element for coupling a coupling end portion of the pipe element between a fixed coupling element and a movable coupling element of the quick-fitting pipe fitting according to the above first preferred embodiment of the present invention.
Figure 6E:
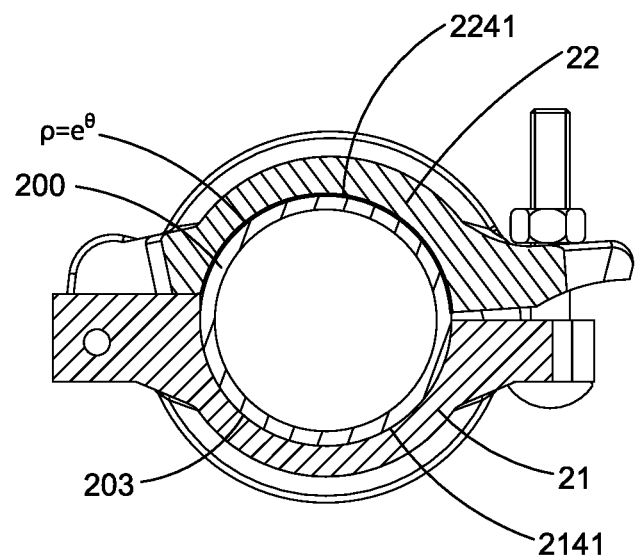

When the quick-fitting pipe fitting assembly 100 is mounted to a position that it is preassembled with the pipe elements 200 to align each of the first movable engaging keys 224 and the fixed engaging keys 214 with the corresponding coupling grooves 202, the gap 26 is created between each of the first movable engaging surfaces 2241 of the first movable engaging keys 224 and the corresponding coupling circumference 203 of each of the pipe elements 200, allowing the quick-fitting pipe fitting assembly 100 to be installed on the pipe elements 200 in a preassembled state without requiring to disassemble the fastening element 232 and the gasket 40. When the gap 26 is gradually reduced by operating on the corresponding fastening element 232, each of the first movable engaging surfaces 2241 is deformed to allow a deformed radius of curvature thereof to be substantially equal to the radius curvature of the coupling circumference 203 of each of the pipe elements 200, as shown in FIGS. 6D and 6E.

A first part 121a of each end portion 121 of the pipe fitting body 10 is not formed with the fixed coupling element 21, and a rest second part 121b of each end portion 121 of the pipe fitting body 10 is integrally formed with the fixed coupling element 21. The first part 121a of each end portion 121 of the pipe fitting body 10 comprises a coupling surface 1211 extended along a circumferential direction between two opposite ends 210 of the fixed coupling element 21. Each of the second movable engaging surfaces 2251 is deformed to allow a deformed radius of curvature thereof to be substantially equal to the radius curvature of the corresponding coupling surface 1211 of the end portion 121 of the pipe fitting body 10.

According to this preferred embodiment of the present invention, the first part 121a of each end portion 121 of the pipe fitting body 10 comprises a retaining protrusion 1212 integrally protruded from the coupling surface 1211 between the two ends 210 of the fixed coupling element 21 for retaining the corresponding second movable engaging key 225 at the end portion 121 of the pipe fitting body 10. More specifically, each movable engaging key 225 comprises an inner wall 2252 which is adapted for biasing against the retaining protrusion 1212, so as to retain the corresponding second movable engaging key 225 at the end portion 121 of the pipe fitting body 10.

Figure 7A:
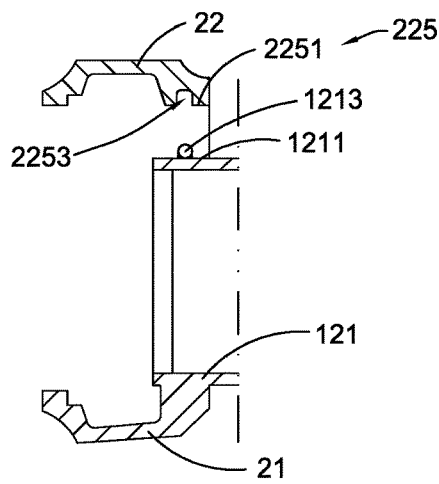
FIGS. 7A to 7C are sectional views illustrating alternative modes of the end portion of the pipe fitting body of the quick-fitting pipe fitting assembly for coupling with the movable coupling element according to the above first preferred embodiment of the present invention.

As shown in FIG. 7A of the drawings, as a first alternative mode of the pipe fitting body 10, the first part 121a of each end portion 121 of the pipe fitting body 10 comprises a retaining attachment 1213 attached at the coupling surface 1211 between the two ends 210 of the fixed coupling element 21 for retaining the corresponding second movable engaging key 225 at the end portion 121 of the pipe fitting body 10. The retaining attachment 1213 may be welded or bonded on the corresponding end portion coupling surface 1211. The corresponding second movable engaging key 225 has a second engaging groove 2253 configured for engaging with the retaining attachment 1213.

Figure 7B:
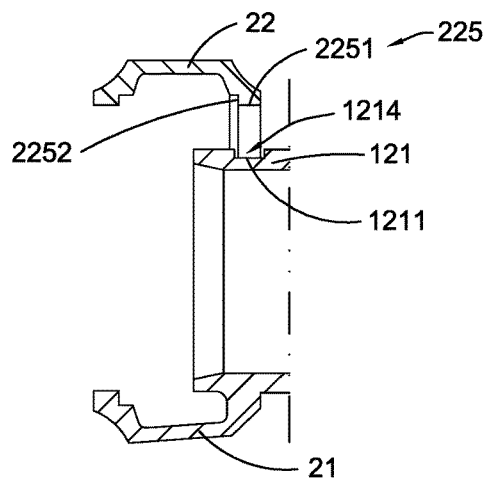

As shown in FIG. 7B of the drawings, as a second alternative mode of the pipe fitting body 10, the first part 121a of each end portion 121 of the pipe fitting body 10 has a retaining groove 1214 above the coupling surface 1211 between the two ends 210 of the fixed coupling element 21 for engaging with the corresponding second movable engaging key 225, so as to retain the corresponding second movable engaging key 225 at the end portion 121 of the pipe fitting body 10.

Figure 7C:
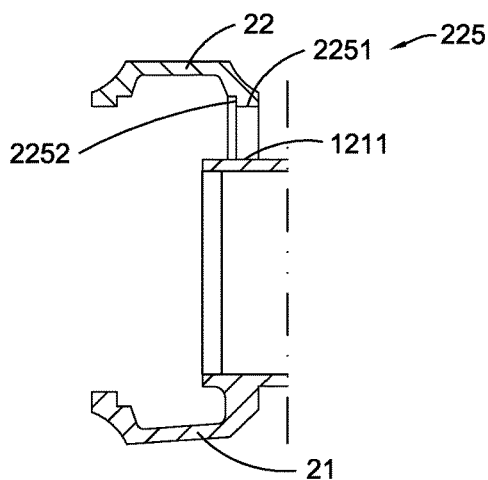

As shown in FIG. 7C of the drawings, as a third alternative mode of the pipe fitting body 10, the first part 121a of each end portion 121 of the pipe fitting body 10 is embodied as a plain end portion between the two ends 210 of the fixed coupling element 21 for defining the plain coupling surface which is adapted for being pressed by the corresponding second engaging surface 2251 of the second movable engaging key 225.

Figure 7D:
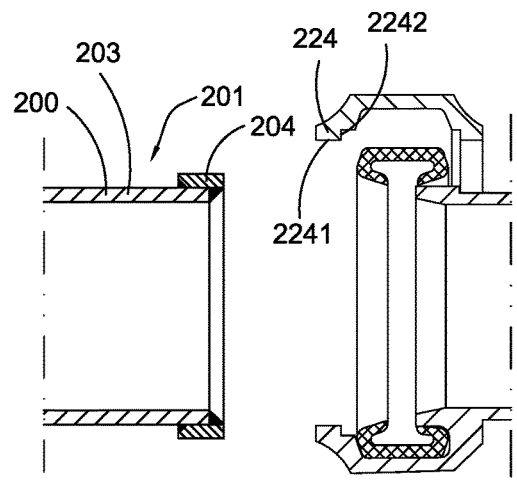
FIGS. 7D to 7F are sectional views illustrating alternative modes of the coupling end portion of the pipe element for coupling with the quick-fitting pipe fitting assembly according to the above first preferred embodiment of the present invention.

As shown in FIG. 7D of the drawings, as a first alternative mode of the pipe elements 200, each of the pipe elements 200 comprises a coupling end portion 201 which comprises the coupling circumference 203 and a protrusion ring 204 integrally protruded from the coupling circumference 203 for retaining the corresponding fixed engaging key 214 of the fixed coupling element 21 and the corresponding first movable engaging key 224 of the movable coupling element 22. In other words, an inner wall 2142 of the corresponding fixed engaging key 214 of the fixed coupling element 21 is adapted for biasing against the protrusion ring 204 while an inner wall 2242 of the corresponding first movable engaging key 224 of the movable coupling element 22 is also adapted for biasing against the protrusion ring 204 so as to retain the corresponding fixed coupling element 21 and the corresponding movable coupling element 22 at the coupling end portion 201 of the corresponding pipe element 200.

Figure 7E:
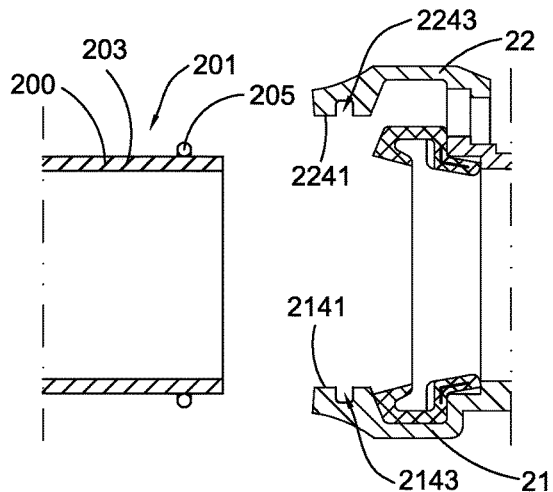

As shown in FIG. 7E of the drawings, as a second alternative mode of the pipe elements 200, each of the pipe elements 200 comprises a coupling end portion 201 which comprises the coupling circumference 203 and an attachment ring 205 attached at the coupling circumference 203 for retaining the corresponding fixed engaging key 214 of the fixed coupling element 21 and the corresponding first movable engaging key 224 of the movable coupling element 22. The attachment ring 205 can be welded or bonded at the coupling circumference 203. Accordingly, a fixed engaging groove 2143 of the corresponding fixed engaging key 214 of the fixed coupling element 21 is adapted for engaging with the attachment ring 205 while a first engaging groove 2243 of the corresponding first movable engaging key 224 of the movable coupling element 22 is also adapted for engaging with the attachment ring 205 so as to retain the corresponding fixed coupling element 21 and the corresponding movable coupling element 22 at the coupling end portion 201 of the corresponding pipe element 200.

Figure 7F:
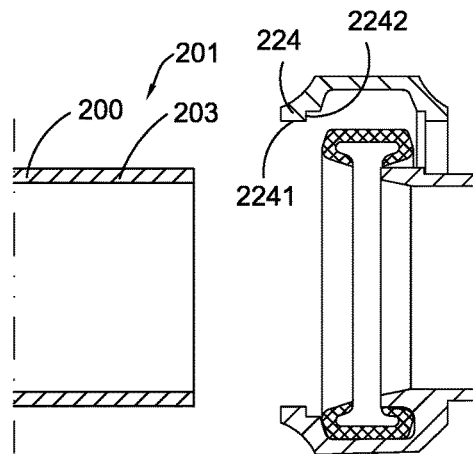

As shown in FIG. 7F of the drawings, as a third alternative mode of the pipe elements 200, each of the pipe elements 200 comprises a coupling end portion 201 which is embodied a plain end portion comprising the coupling circumference 203.

According to this preferred embodiment, each of the pivotally connecting element 231 comprises a connecting pin 2311 and two connecting holes 2312 formed in the first connecting portion 212 of the corresponding fixed coupling element 21 and the first connector portion 222 of the corresponding movable coupling element 22 respectively. Each of the fastening element 232 comprises a bolt 2321, a nut 2322, and two fastening holes 2323 formed in the second connecting portion 213 of the corresponding fixed coupling element 21 and the second connector portion 222 of the corresponding movable coupling element 22 respectively. The bolt 2321 penetrates through the fastening hole 2323 and the nut 2322. Accordingly, when the quick-fitting pipe fitting assembly 100 is preassembled with each pipe element 200, the bolt 2321 and the nut 2322 can be operated, so as to direct the fixed engaging surface 2141 and the first movable engaging surface 2241 to engage and contact with the coupling circumferences 203 and direct the second movable engaging surface 2251 to engage and contact with the coupling surface 1211.

The pivotally connecting element 231 pivotally connects the first connecting portion 212 of the fixed coupling element 21 with the first connector portion 222 of the movable coupling element 22 to allow the movable coupling element 22 of each of the two coupling units 20 to be movable with respect to the fixed coupling element 21. The fastening element 232 is arranged for fastening the second connecting portion 213 of the corresponding fixed coupling element with the second connector portion 223 of the corresponding movable coupling element 22. Accordingly, when the fastening element 232 is operated, the second connecting portion 213 of the corresponding fixed coupling element is driven to move towards the second connector portion 223 of the corresponding movable coupling element 22, so as to retain the coupling end portion 201 of the corresponding pipe element at the corresponding coupling unit 20.

According to this preferred embodiment, before installation, each of the two gasket 30 is disposed in the inner cavity 24 of the corresponding coupling unit 20, the bolt 31 is assembled with the second connecting portion 213 of the corresponding fixed coupling element 21 and the second connector portion 223 of the corresponding movable coupling element 22, and the nut 2322 is assembled on the bolt 2321. And when the quick-fitting pipe fitting assembly 100 is able to be installed with the pipe elements 200, the gaskets 40 are not required to be detached from coupling units 20, the bolts 2321 and nuts 2322 are not required to be removed from the second connecting portions 213 and the second connector portions 223.

According to this preferred embodiment, the fixed coupling element 21 and the movable coupling element 22 of each of the two coupling units 20 can be pivotally moved with respect to the pivotally connecting element 231 which functions as a pivot point. When the fastening element 232 is operated, the opening 25 of the quick-fitting pipe fitting assembly 100 is reduced, and the distance between the second connecting portion 231 and the second connector portion 223 is reduced, so that when the first movable engaging key 224 is moved to a state that a part of or all of the first movable engaging surface 2241 is attached to the coupling circumferences 203 so that the first movable engaging key 224 is firmly retained at the corresponding groove 202 of the corresponding pipe element 200. the second movable engaging key 225 is moved to a state that a part of or all of the second movable engaging surface 2251 is attached to the coupling surface 1211 so that the second movable engaging key 225 is firmly retained at the end portion 121 of the pipe fitting body 10.

In addition, according to this preferred embodiment, each of the pipe fitting portions 12 has an outer end wall 122, wherein each of the gaskets 30 is disposed in the corresponding inner cavity 24 and a portion 301 adjacent to the pipe fitting body 10 is biasing against the outer end wall 122 of the corresponding pipe fitting portion 12, so as to firmly retain the corresponding gasket 30 in the corresponding inner cavity 24.

According to this preferred embodiment of the present invention, the present invention further provides a method for coupling two pipe elements 200 via the quick-fitting pipe fitting assembly 100. More specifically, the method comprises the following steps:

(a) receiving the two coupling end portions 201 of the pipe elements 200 at two coupling units 20 to align the fixed engaging key 214 and the first movable engaging key 224 of each of the coupling units 20 with the corresponding coupling circumference 203 of each pipe element 200, and aligning the second movable engaging key 225 of each of the coupling units 20 with the corresponding coupling surface 1211 of the pipe fitting body 10, wherein each of the first and second movable engaging surfaces 2241 and 2251 has varying radiuses of curvature and the fixed engaging surface 2141 has a fixed radius of curvature; and (b) deforming the first movable engaging surface 2241 of each coupling unit 20 to allow the first movable engaging surface 2241 to at least partially contact with the corresponding coupling circumference 203 and deforming the second movable engaging surface 2251 of each coupling unit 20 to allow the second movable engaging surface 2251 to at least partially contact with the corresponding coupling surface 1211 of the pipe fitting body 10.

The present invention further provides a method for coupling the pipe elements 200 by the quick-fitting pipe fitting assembly 100 for facilitating the quick operation of the operator. More specifically, the method comprises the following steps:

(A) inserting two coupling end portions 201 of two pipe elements 200 in two coupling units 20 each comprising the fixed coupling element 21 integrally extended from the pipe fitting body 10 and the movable coupling element 22 which is preassembled with the fixed coupling element 21 by the connecting elements 23; and (B) operating the fastening element 232 of the connecting elements 23 to fasten the fixed coupling element 21 with the movable coupling element to retain the corresponding coupling end portion 201 of each of the pipe element 200 in the corresponding coupling unit 20.

In the preassembled state, the fixed engaging key 214 and the first movable engaging key 224 of each of the coupling units 20 are aligned with the corresponding coupling circumference 203 of each pipe element 200, and the second movable engaging key 225 of each of the coupling units 20 is aligned with the corresponding coupling surface 1211 of the pipe fitting body 10, wherein each of the first and second movable engaging surfaces 2241 and 2251 has varying radiuses of curvature, the fixed engaging surface 2141 has a fixed radius of curvature When each of the fastening elements 232 is operated, the gap 26 between the first movable engaging surface 2241 of each of the coupling units 20 and the coupling circumference 203 of the corresponding pipe element is reduced, so that the quick-fitting pipe fitting assembly 100 is firmly assembled with the pipe elements 200.

Figure 8A:
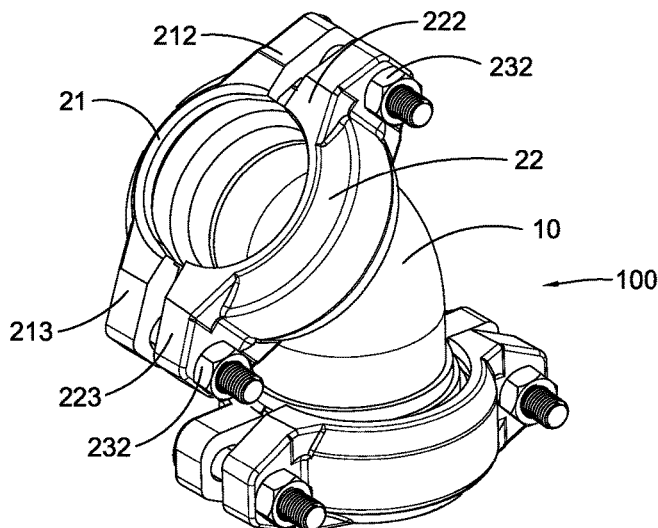
FIG. 8A is a perspective view of a quick-fitting pipe fitting assembly according to a first alternative mode of the above first preferred embodiment of the present invention.
Figure 8B:
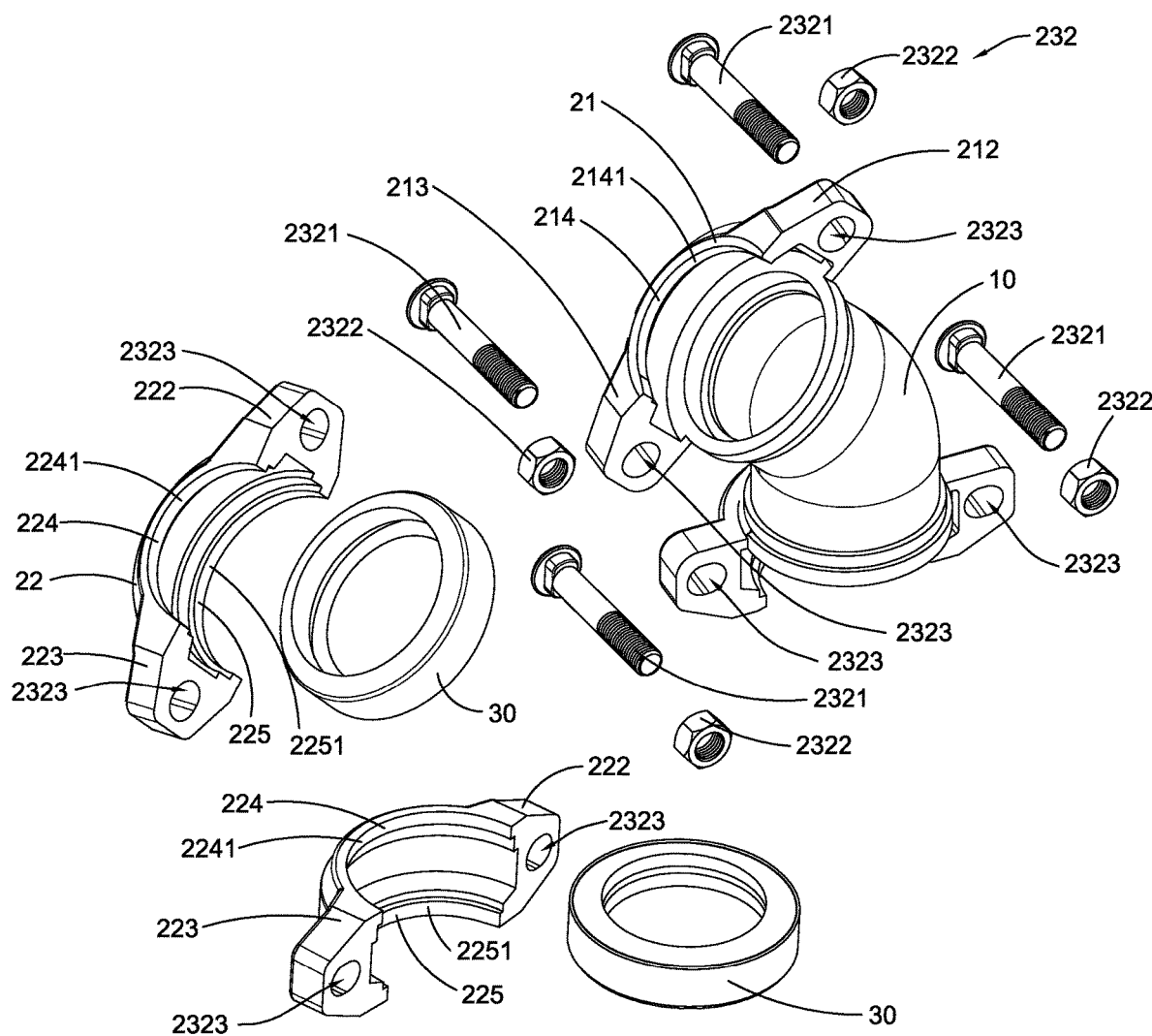
FIG. 8B is an exploded view of the quick-fitting pipe fitting assembly according to the above first alternative mode of the above first preferred embodiment of the present invention.

Referring to FIGS. 8A and 8B of the drawings, a quick-fitting pipe fitting assembly 100 according to a first alternative mode of the above first preferred embodiment of the present invention is illustrated. In this first alternative mode of the first preferred embodiment, the connecting elements 23 of each of the two coupling units 20 are embodied as two fastening elements 232 each comprising the bolt 2321, the nut 2322 and the fastening holes 2323.

Accordingly, when fasten the fixed coupling element 21 with the corresponding movable coupling element 22, the two fastening elements 232 are operated to firmly fasten the first connecting portion 212 with the first connector portion 222, and firmly fasten the second connecting portion 213 with the second connector portion 223.

Figure 9A:
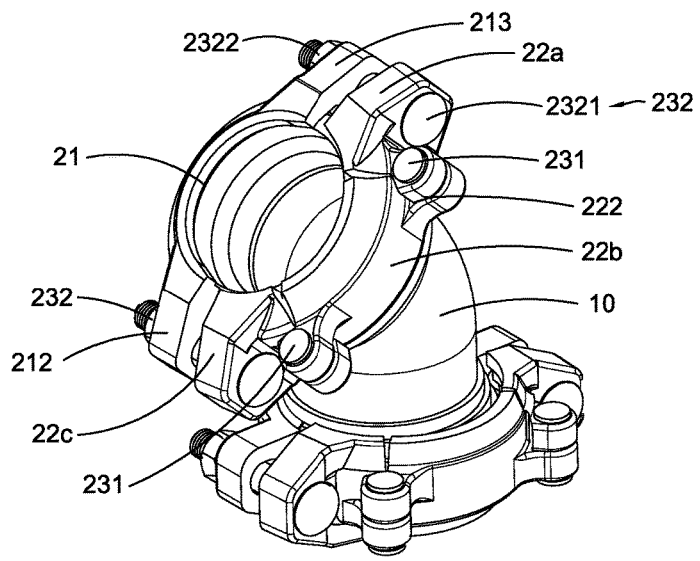
FIG. 9A is a perspective view of a quick-fitting pipe fitting assembly according to a second alternative mode of the above first preferred embodiment of the present invention.
Figure 9B:
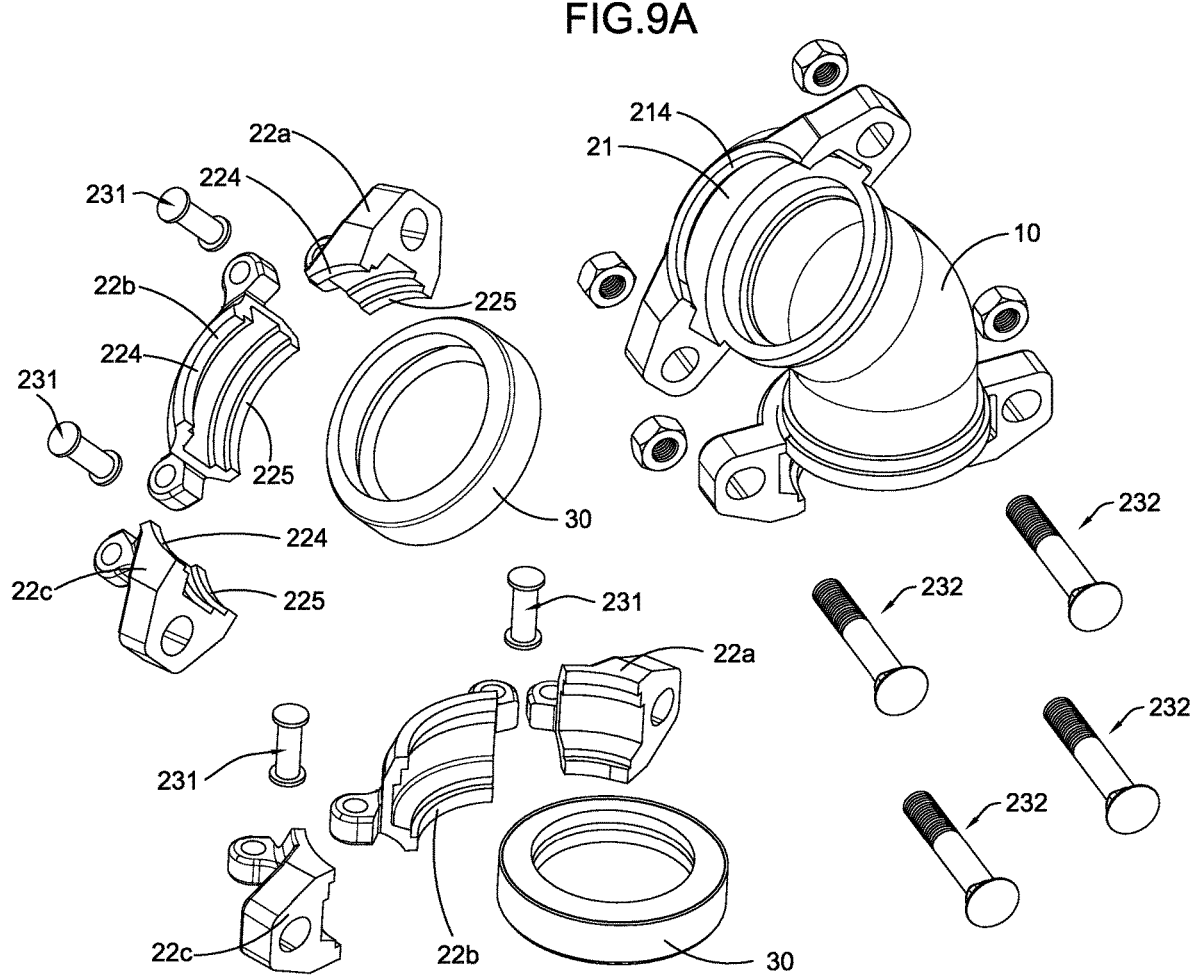
FIG. 9B is an exploded view of the quick-fitting pipe fitting assembly according to the second alternative mode of the above first preferred embodiment of the present invention.

Referring to FIGS. 9A and 9B of the drawings, a quick-fitting pipe fitting assembly 100 according to a second alternative mode of the above first preferred embodiment of the present invention is illustrated. In this second alternative mode of the first preferred embodiment, each of the coupling units 20 comprises a first movable coupling element 22a, a second movable coupling element 22b, and a third coupling element 22c. The first movable coupling element 22a and the third coupling element 22c are respectively connected with the fixed coupling element 21 by two fastening elements 232, the first movable coupling element 22a and the third coupling element 22c are respectively connected with the second movable coupling element 22b which is positioned between the first movable coupling element 22a and the third coupling element 22c by two pivotally connecting elements 231.

In addition, if each nut 2322 of the corresponding fastening element 232 of this embodiment is preassembled at a position facing towards the first or second connector portions 222 or 223, the existence of the first or second connector portions 222 or 223 may not be convenient for the operation for fastening the corresponding fastening element 232. Preferably, each nut 2322 of the corresponding fastening element 232 of this embodiment can be preassembled at a position facing towards the first connecting portion 212 or the second connecting portion 213, so that it is convenient for operating the corresponding fastening element 232 for directing the nut 2322 to bias against the corresponding first connecting portion 212 or the second connecting portion 213 so as to fasten the corresponding fixed coupling element 21 with the corresponding movable coupling element 22.

Figure 10A:
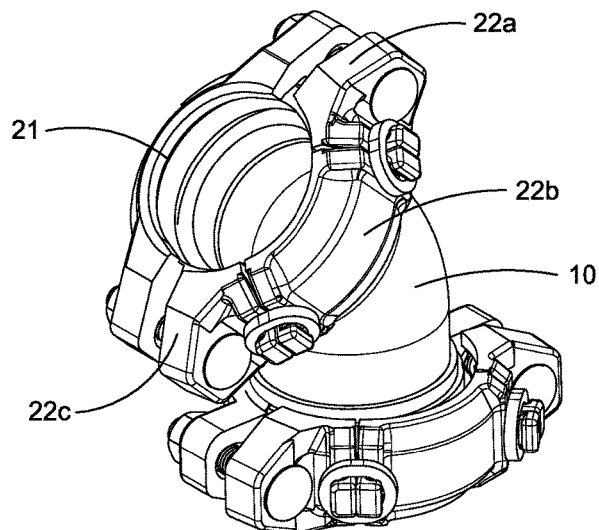
FIG. 10A is a perspective view of a quick-fitting pipe fitting assembly according to a third alternative mode of the above first preferred embodiment of the present invention.
Figure 10B:
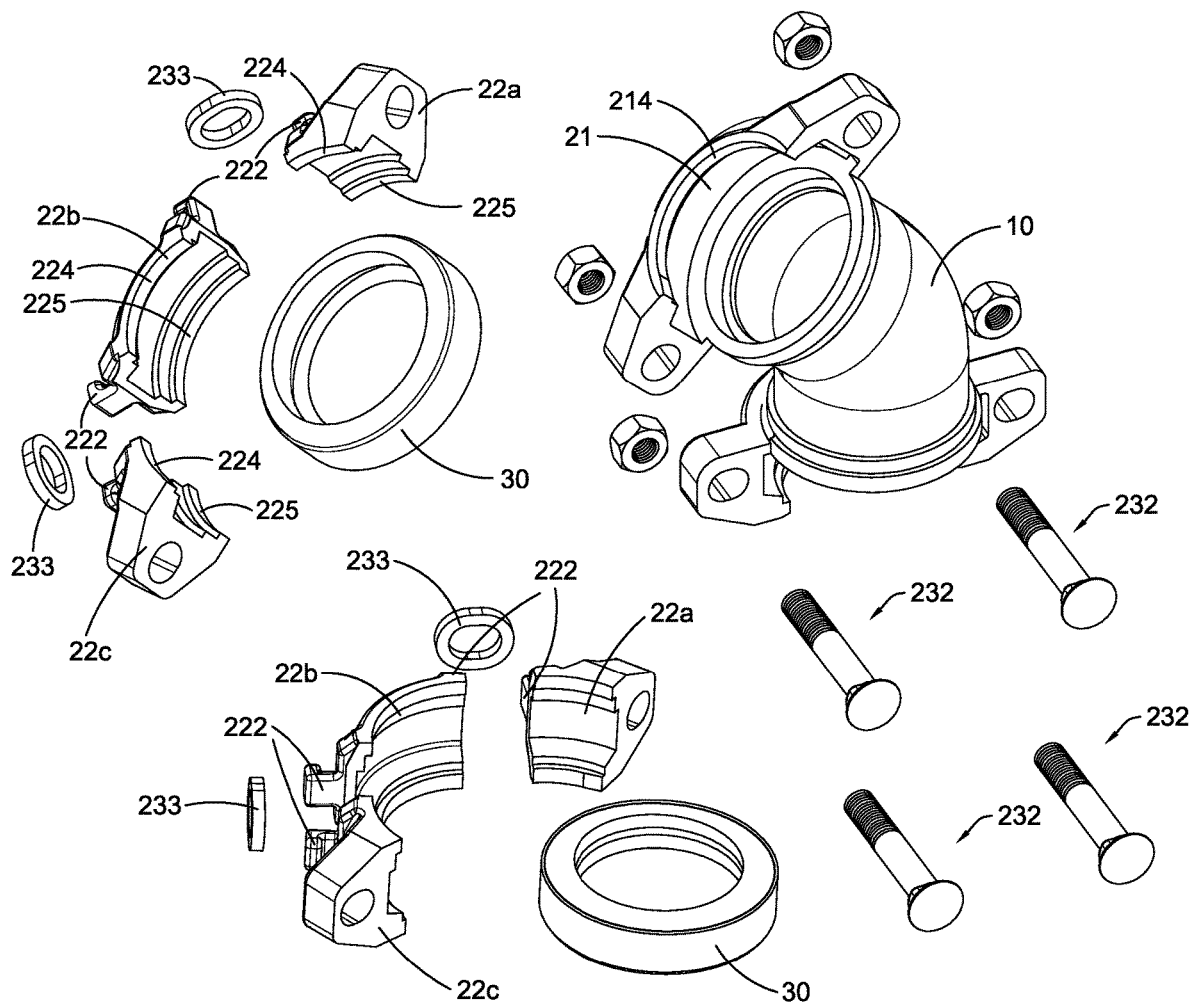
FIG. 10B is an exploded view of the quick-fitting pipe fitting assembly according to the third alternative mode of the above first preferred embodiment of the present invention.
Figure 11:
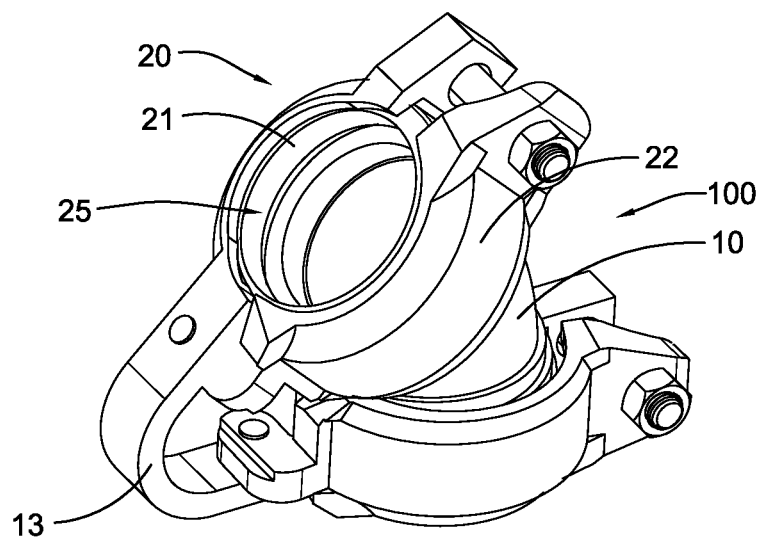
FIG. 11 is a perspective view of a quick-fitting pipe fitting assembly according to a fourth alternative mode of the above first preferred embodiment of the present invention.
Figure 12:
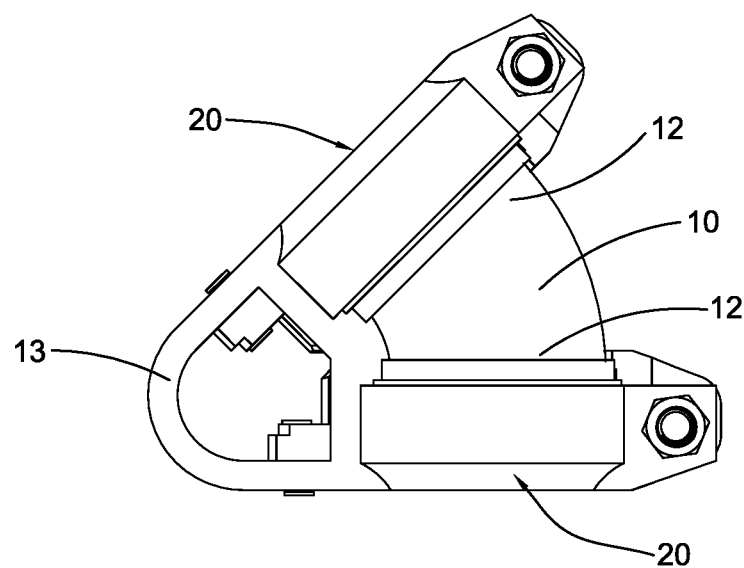
FIG. 12 is a side schematic view illustrating the quick-fitting pipe fitting assembly according to the fourth alternative mode of the above first preferred embodiment of the present invention.
Figure 13:
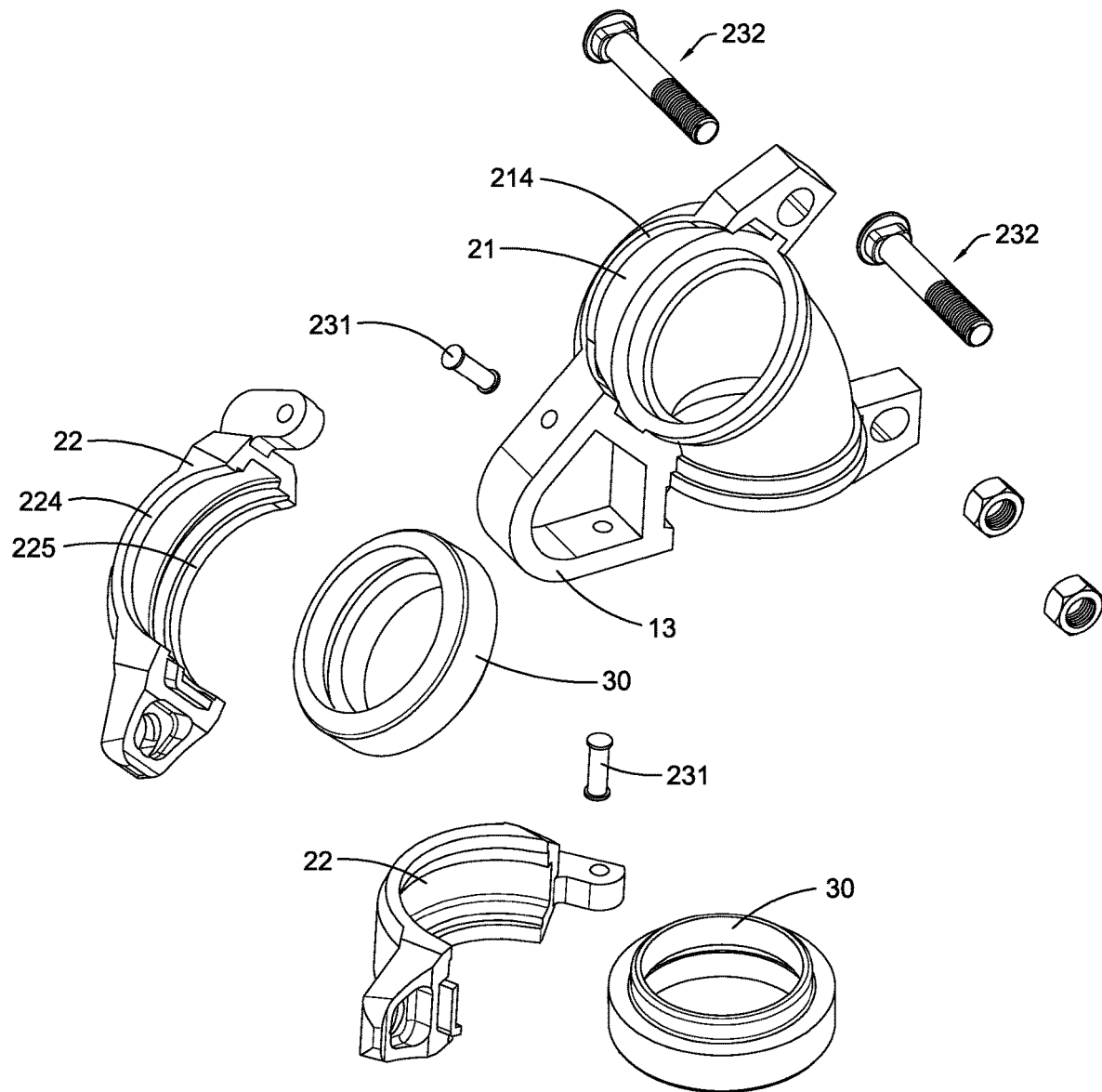
FIG. 13 is an exploded view of the quick-fitting pipe fitting assembly according to the fourth alternative mode of the above first preferred embodiment of the present invention.
Figure 14:
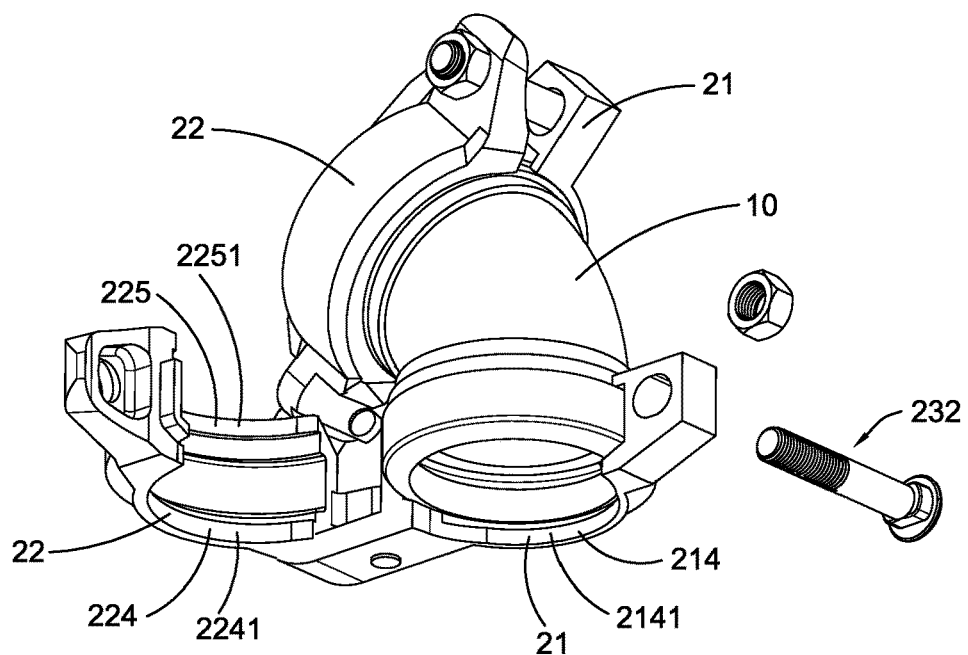
FIG. 14 is a partially exploded perspective view illustrating movable coupling elements and a pipe fitting body of the quick-fitting pipe fitting assembly according to the fourth alternative mode of the above first preferred embodiment of the present invention.
Figure 15:
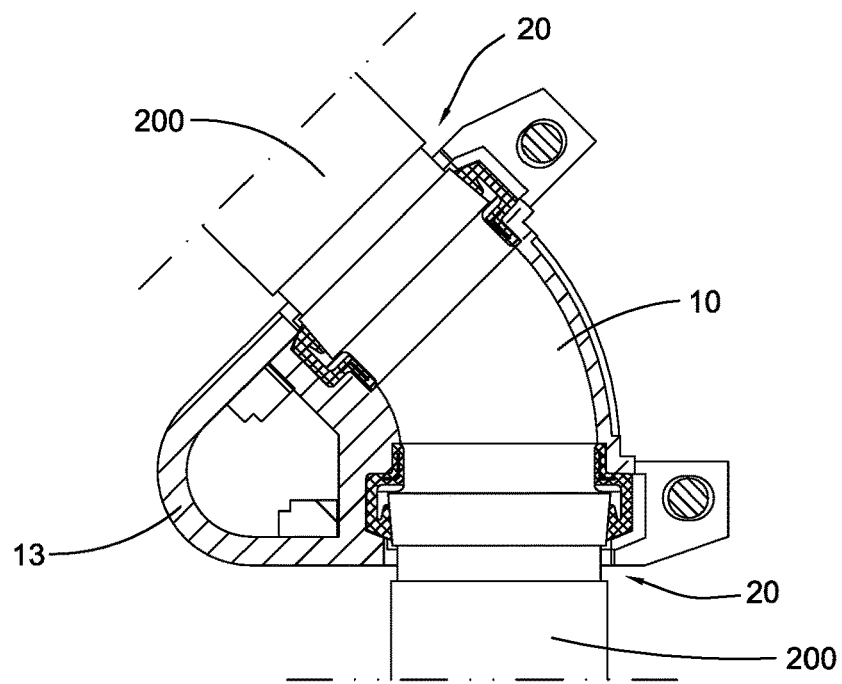
FIG. 15 is a sectional view illustrating the quick-fitting pipe fitting assembly being coupled with two pipe elements according to the fourth alternative mode of the above first preferred embodiment of the present invention.

Referring to FIGS. 10A and 10B of the drawings, a quick-fitting pipe fitting assembly 100 according to a third alternative mode of the above first preferred embodiment of the present invention is illustrated. In this third alternative mode of the first preferred embodiment, each of the coupling units 20 comprises a first movable coupling element 22a, a second movable coupling element 22b, and a third coupling element 22c. The first movable coupling element 22a and the third coupling element 22c are respectively connected with the fixed coupling element 21 by two fastening elements 232, the first movable coupling element 22a and the third coupling element 22c are respectively connected with the second movable coupling element 22b which is positioned between the first movable coupling element 22a and the third coupling element 22c by two snap rings 233. In other words, the second movable coupling element 22b comprises two first connector portions 222 at two sides thereof, each first connector portion 222 is connected with the first connector portion 222 of the first movable coupling element 22a or the third movable coupling element 22c by the snap ring 233.

Referring to FIGS. 11 to 16C of the drawings, a quick-fitting pipe fitting assembly 100 according to a fourth alternative mode of the above first preferred embodiment of the present invention is illustrated. According to this fourth alternative mode of the first preferred embodiment, the pipe fitting body 10 comprises two fitting portions 12 and a connector 13 integrally connected to the end portions 121 of the two fitting portions 12 respectively. The two fitting portions 12 are integrated with each other to form a tubular structure.

In addition, each of the coupling units 20 has an inner cavity 24, each of the gaskets 30 of this preferred embodiment comprises a gasket body 31 received in the inner cavity 24 and a biasing portion 32 integrally extended from the gasket body 31. Each of the end portions 121 has an inner end wall 123 and a retention groove 124. The biasing portion 32 of each gasket 30 is extended out of the inner cavity 24 and is received at the retention groove 124 and biasing against the inner end wall 123. The gasket body 31 comprises a base portion 301, a first retention portion 302 and a second retention portion 302, wherein the first retention portion 302 and the second retention portion 302 are integrally extended from two ends of said base portion 301. The biasing portion 32 is integrally extended from said first retention portion 302.

Figure 16A:
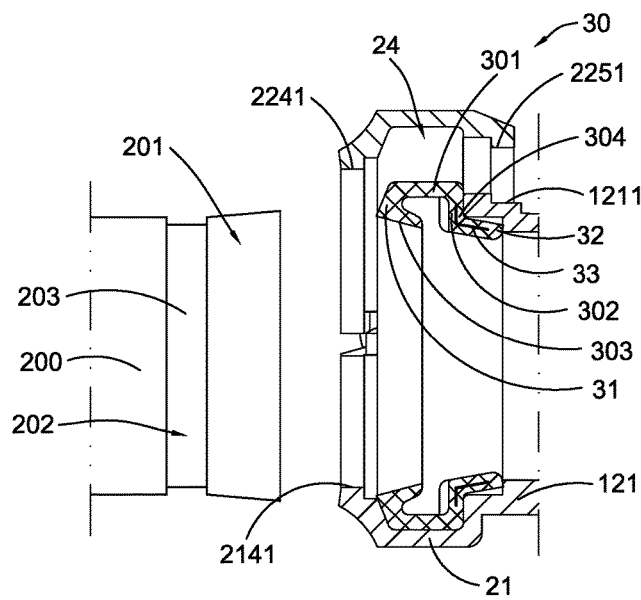
FIG. 16A is a sectional view illustrating a state before the pipe element is coupled with the quick-fitting pipe fitting assembly according to the fourth alternative mode of the above first preferred embodiment of the present invention.
Figure 16B:
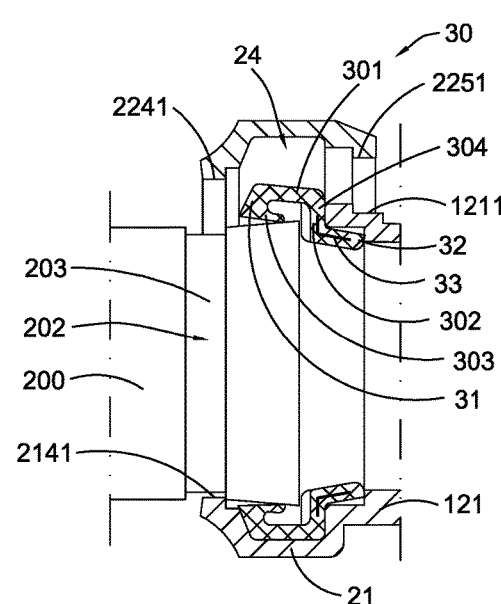
FIG. 16B is a sectional view illustrating a state in which the pipe element is being installed to the quick-fitting pipe fitting assembly according to the fourth alternative mode of the above first preferred embodiment of the present invention.
Figure 16C:
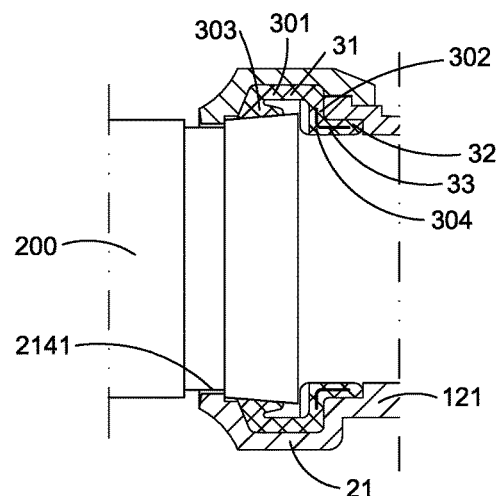
FIG. 16C is a sectional view illustrating a state in which a first coupling unit is firmly coupled so as to firmly couple the pipe element with the quick-fitting pipe fitting assembly according to the fourth alternative mode of the above first preferred embodiment of the present invention.

Preferably, the portion 304 of each gasket 30 adjacent to the pipe fitting body 10 is embedded with a rigid frame 33 to enhance a strength of the corresponding gasket 30, so as to prevent the corresponding gasket 30 to easily slip off from the inner cavity 24. As shown in FIGS. 16A to 16C, the portion 304 of each gasket 30 comprises the first retention portion 302 and the biasing portion 32.

Accordingly, as shown in FIGS. 16A to 16C of the drawings, when the coupling end portion 201 of the pipe element 200 is inserted into the corresponding gasket 30, the portion 301 with the rigid frame 33 is retained between the coupling end portion 201 of the pipe element 200 and the inner end wall 123 of the pipe fitting body 10. In addition, it is worth mentioning that the structure of the gasket 30 of this embodiment can be employed in other embodiments.

Figure 17:
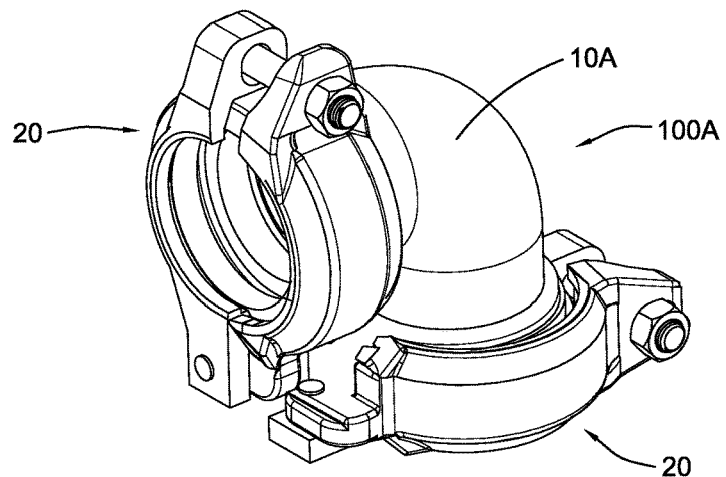
FIG. 17 is a perspective view of a quick-fitting pipe fitting assembly according to a second preferred embodiment of the present invention.
Figure 18:
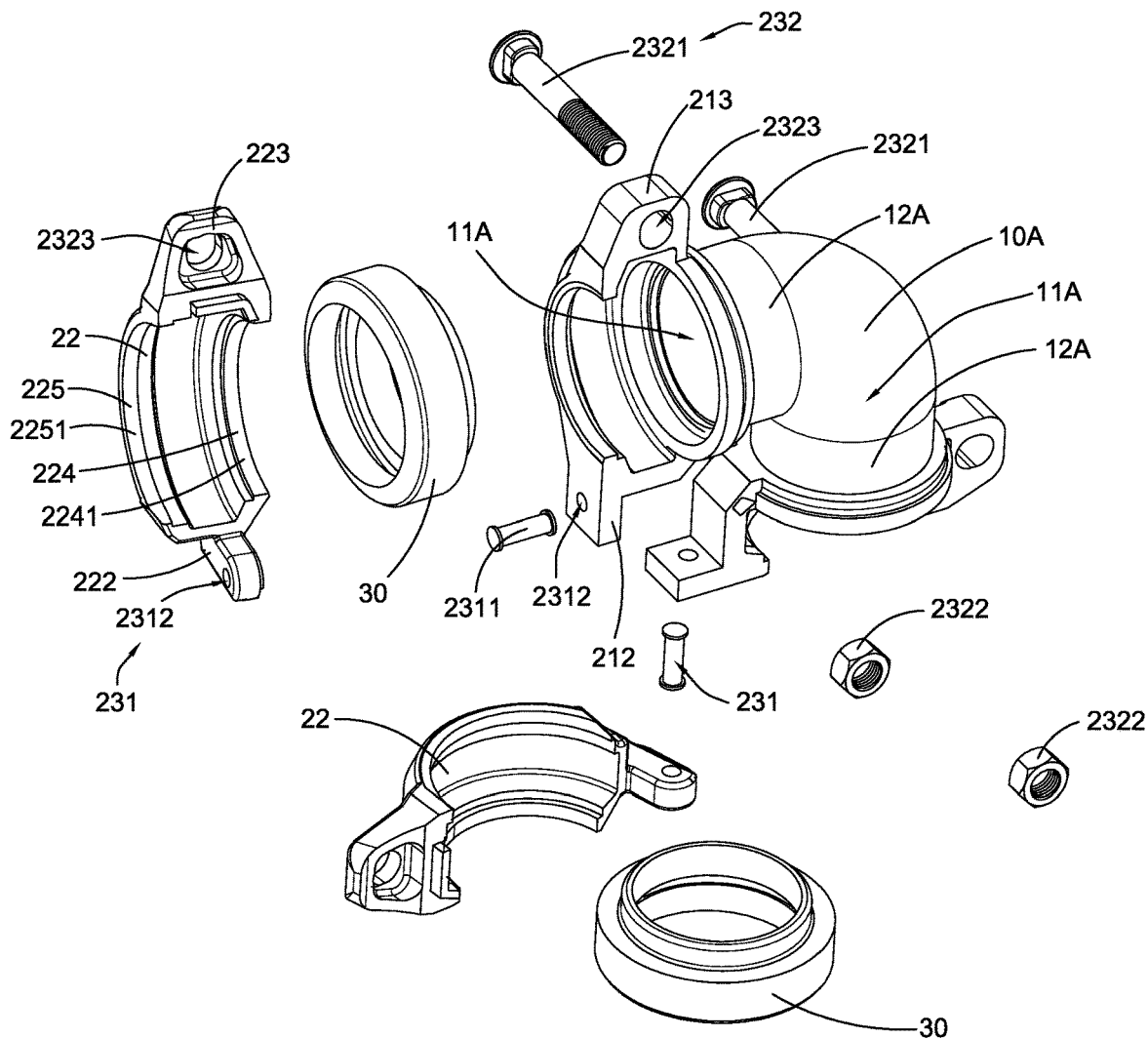
FIG. 18 is an exploded view of the quick-fitting pipe fitting assembly according to the above second preferred embodiment of the present invention.
Figure 19:
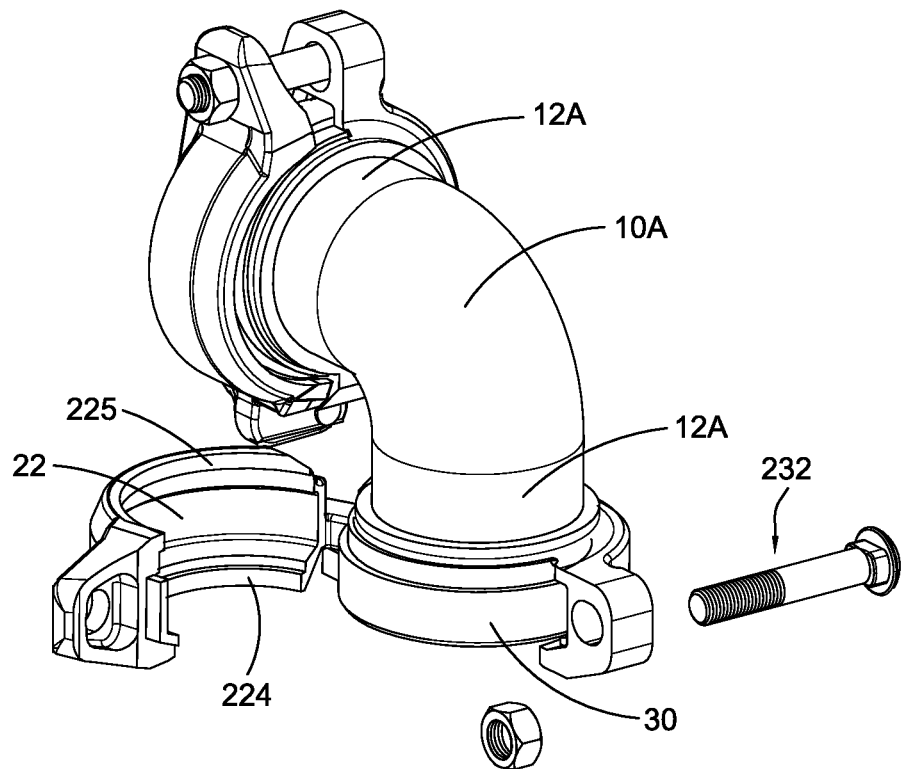
FIG. 19 is a partially exploded perspective view illustrating movable coupling elements and a pipe fitting body of the quick-fitting pipe fitting assembly according to the above second preferred embodiment of the present invention.

Referring to FIGS. 17 to 19 of the drawings, a quick-fitting pipe fitting assembly 100A according to a second preferred embodiment of the present invention is illustrated. According to this preferred embodiment, the quick-fitting pipe fitting assembly 100A, which is also embodied as an elbow, comprises a pipe fitting body 10A which is an elbow body having two channels 11A communicated with each other and comprising two fitting portions 12A each having an end portion 121A, two coupling units 20 provided at the two end portions 121 of the pipe fitting body 10 respectively for coupling with two pipe elements 200, and two gaskets 30 disposed at the two coupling units 20 respectively. The two fitting portions 12A define an angle θ between two axles 1210A of the two end portions 121A. According to this embodiment, the angle θ is 90°. Accordingly, when the two pipe elements 200 are assembled with the quick-fitting pipe fitting assembly 100A of this embodiment which is embodied as a 90° elbow, the extending directions of the two pipe elements 200 define an included angle which is 90°.

Each of the two coupling units 20 comprises a fixed coupling element 21, a movable coupling element 22, and a plurality of connecting elements 23 for connecting the fixed coupling element 21 with the movable coupling element 22. The fixed coupling element 21 is integrally extended from the corresponding end portion 121A of the pipe fitting body 10A for being fastened with the movable coupling element 22 by the connecting elements 23, so as to couple the corresponding pipe element 200 with the quick-fitting pipe fitting assembly 100A.

Similarly, the plurality of connecting elements 23 detachably couple the fixed coupling element 21 with the movable coupling element 22 of each of the two coupling units 20. According to this preferred embodiment, the plurality of connecting elements 23 comprise a pivotally connecting element 231 for pivotally connecting a first connecting portion 212 of the fixed coupling element 21 with a first connector portion 222 of the movable coupling element 22 and a fastening element 232 for fastening a second connecting portion 213 of the fixed coupling element 21 with a second connector portion 223 of the movable coupling element 22.

Figure 20A:
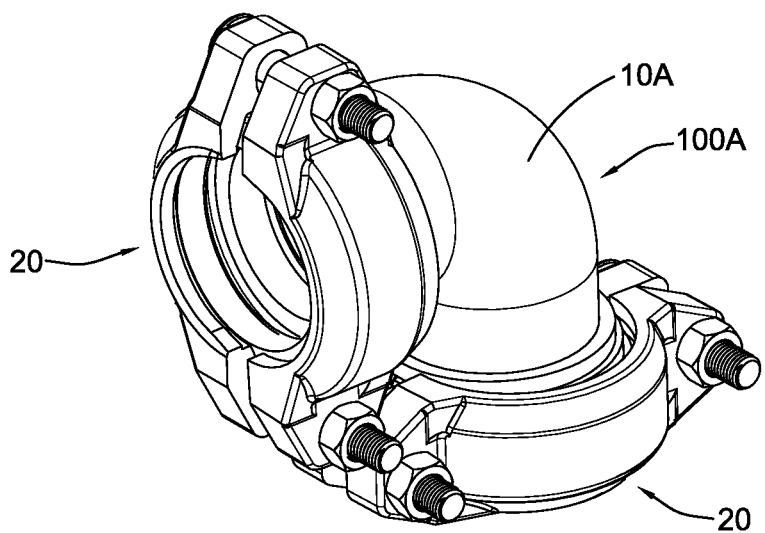
FIGS. 20A and 20B are perspective view and exploded view of a quick-fitting pipe fitting assembly according to a first alternative mode of the above second preferred embodiment of the present invention.
Figure 20B:
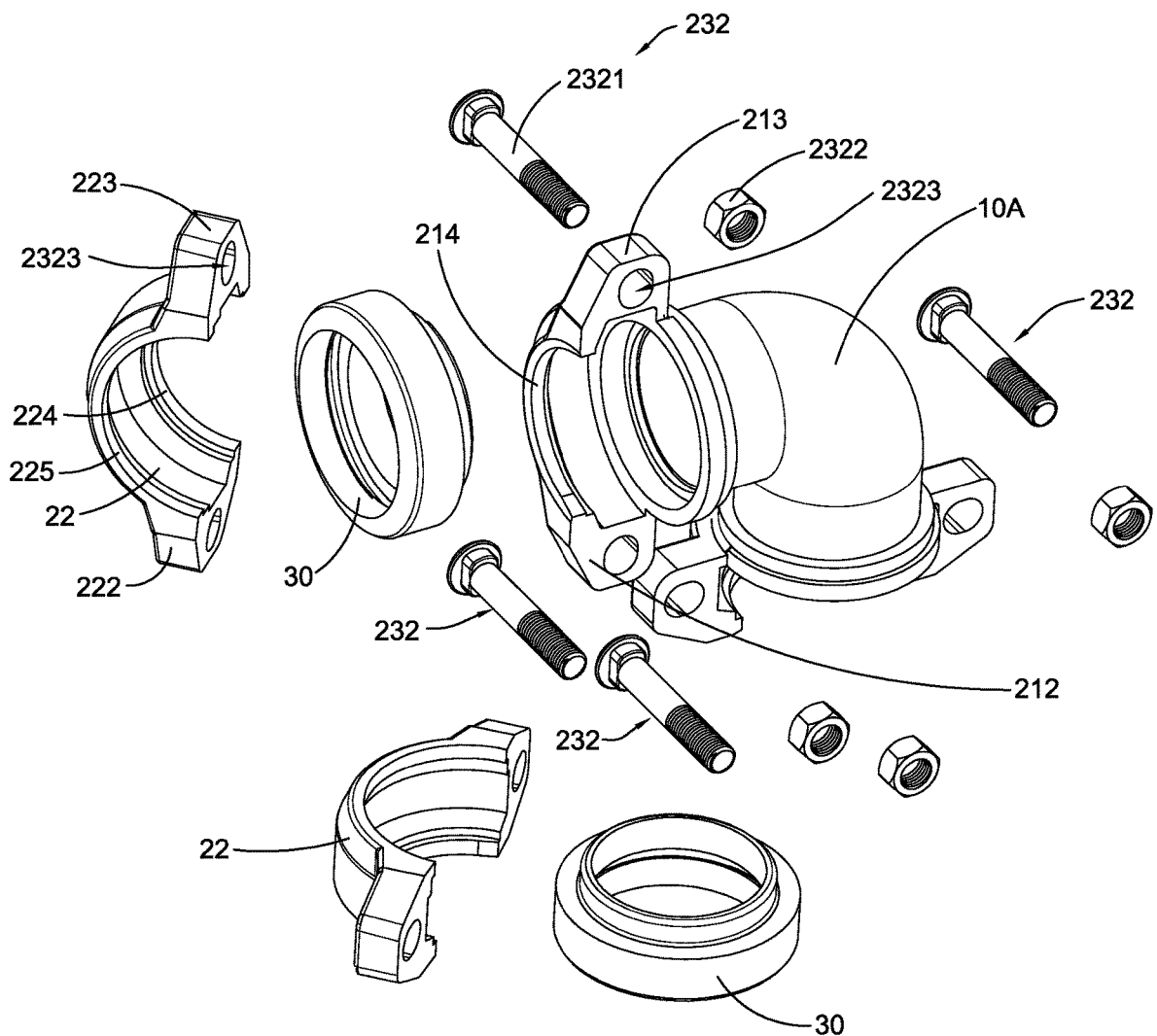

Referring to FIGS. 20A and 20B of the drawings, a quick-fitting pipe fitting assembly 100A according to a first alternative mode of the above second preferred embodiment of the present invention is illustrated. In this first alternative mode of the second preferred embodiment, the quick-fitting pipe fitting assembly 100A is a 90° elbow. The connecting elements 23 of each of the two coupling units 20 are embodied as two fastening elements 232 each comprising the bolt 2321, the nut 2322 and the fastening holes 2323. Accordingly, when fasten the fixed coupling element 21 with the corresponding movable coupling element 22, the two fastening elements 232 are operated to firmly fasten the first connecting portion 212 with the first connector portion 222, and firmly fasten the second connecting portion 213 with the second connector portion 223.

Figure 21A:
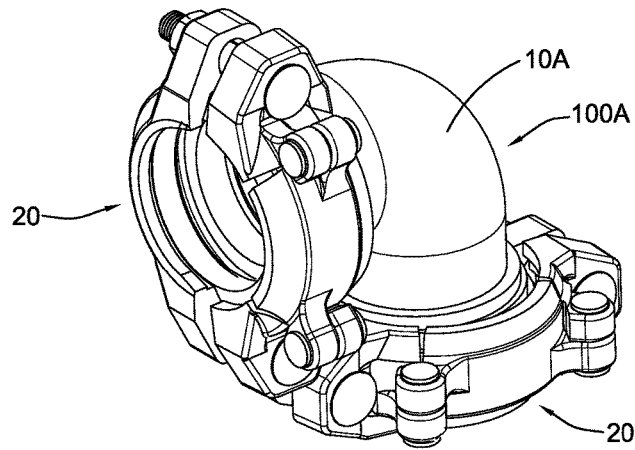
FIG. 21A is a perspective view of a quick-fitting pipe fitting assembly according to a second alternative mode of the above second preferred embodiment of the present invention.
Figure 21B:
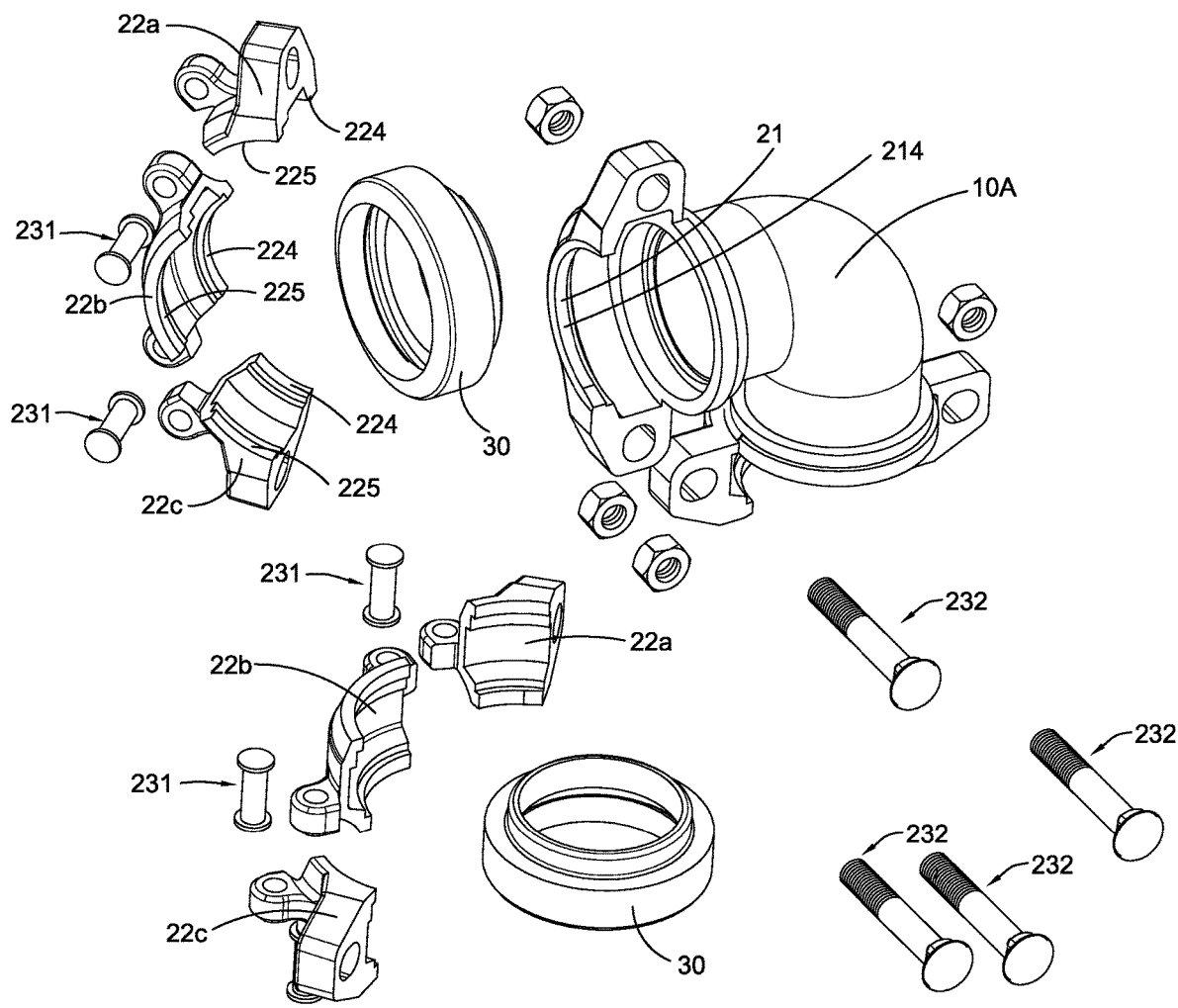
FIG. 21B is an exploded view of the quick-fitting pipe fitting assembly according to the second alternative mode of the above second preferred embodiment of the present invention.

Referring to FIGS. 21A and 21B of the drawings, a quick-fitting pipe fitting assembly 100A according to a second alternative mode of the above second preferred embodiment of the present invention is illustrated. In this second alternative mode of the second preferred embodiment, the quick-fitting pipe fitting assembly 100A is a 90° elbow, each of the coupling units 20 comprises a first movable coupling element 22a, a second movable coupling element 22b, and a third coupling element 22c. The first movable coupling element 22a and the third coupling element 22c are respectively connected with the fixed coupling element 21 by two fastening elements 232, the first movable coupling element 22a and the third coupling element 22c are respectively connected with the second movable coupling element 22b which is positioned between the first movable coupling element 22a and the third coupling element 22c by two pivotally connecting elements 231.

Figure 22A:
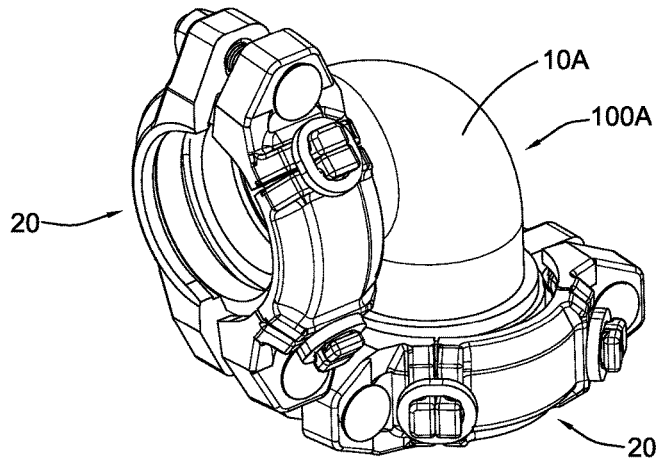
FIG. 22A is a perspective view of a quick-fitting pipe fitting assembly according to a third alternative mode of the above second preferred embodiment of the present invention.
Figure 22B:
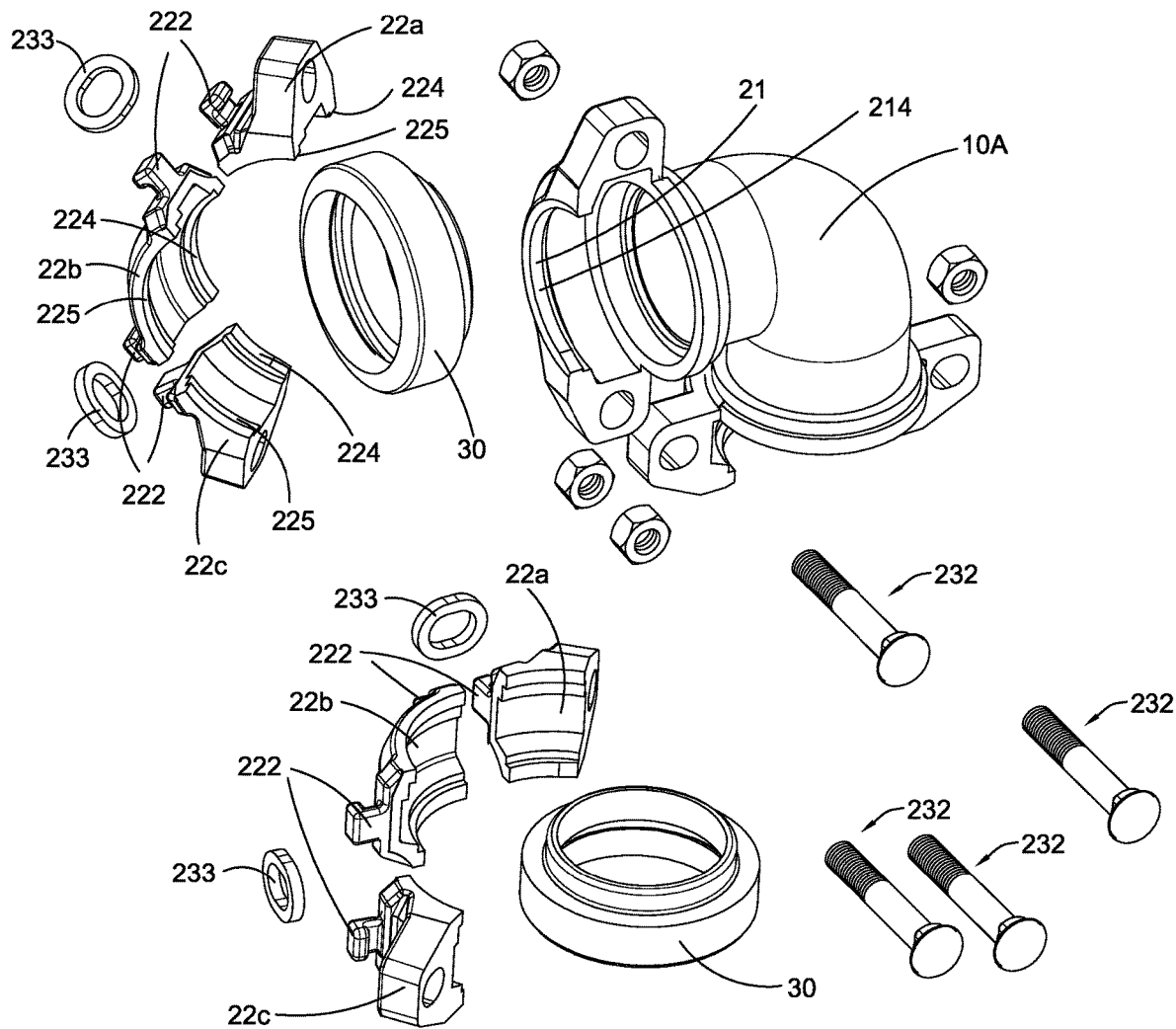
FIG. 22B is an exploded view of the quick-fitting pipe fitting assembly according to the third alternative mode of the above second preferred embodiment of the present invention.

Referring to FIGS. 22A and 22B of the drawings, a quick-fitting pipe fitting assembly 100A according to a third alternative mode of the above second preferred embodiment of the present invention is illustrated. In this third alternative mode of the second preferred embodiment, the quick-fitting pipe fitting assembly 100A is a 90° elbow, each of the coupling units 20 comprises a first movable coupling element 22a, a second movable coupling element 22b, and a third coupling element 22c. The first movable coupling element 22a and the third coupling element 22c are respectively connected with the fixed coupling element 21 by two fastening elements 232, the first movable coupling element 22a and the third coupling element 22c are respectively connected with the second movable coupling element 22b which is positioned between the first movable coupling element 22a and the third coupling element 22c by two snap rings 233. In other words, the second movable coupling element 22b comprises two first connector portions 222 at two sides thereof, each first connector portion 222 is connected with the first connector portion 222 of the first movable coupling element 22a or the third movable coupling element 22c by the snap ring 233.

Figure 23:
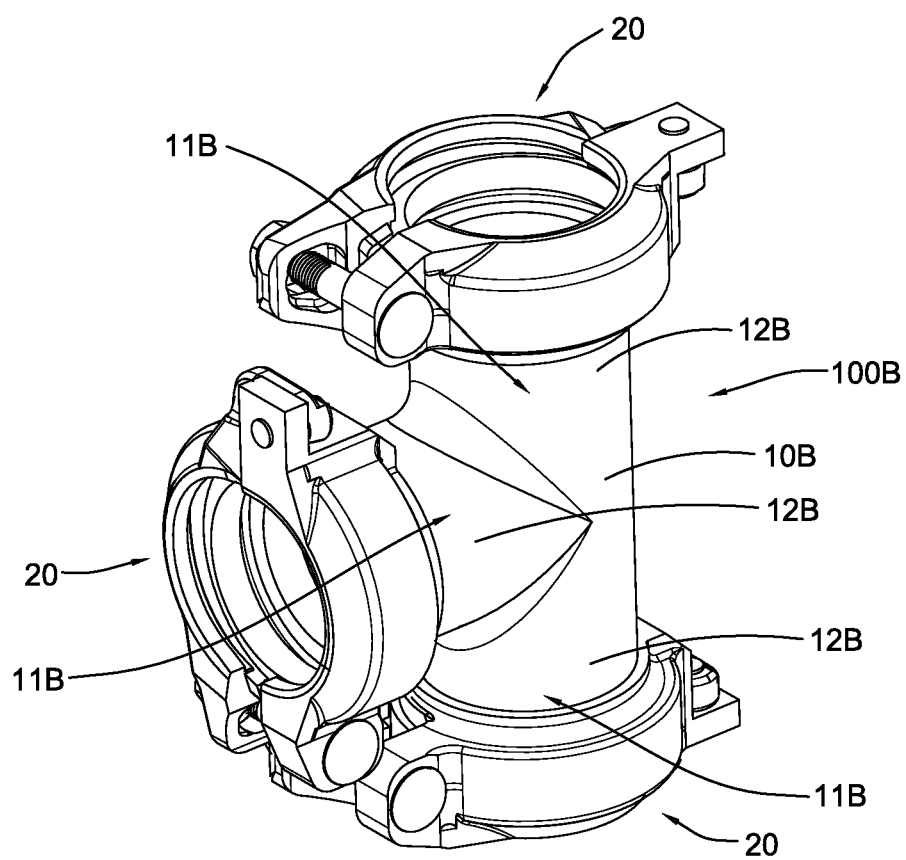
FIG. 23 is a perspective view of a quick-fitting pipe fitting assembly according to a third preferred embodiment of the present invention.
Figure 24:
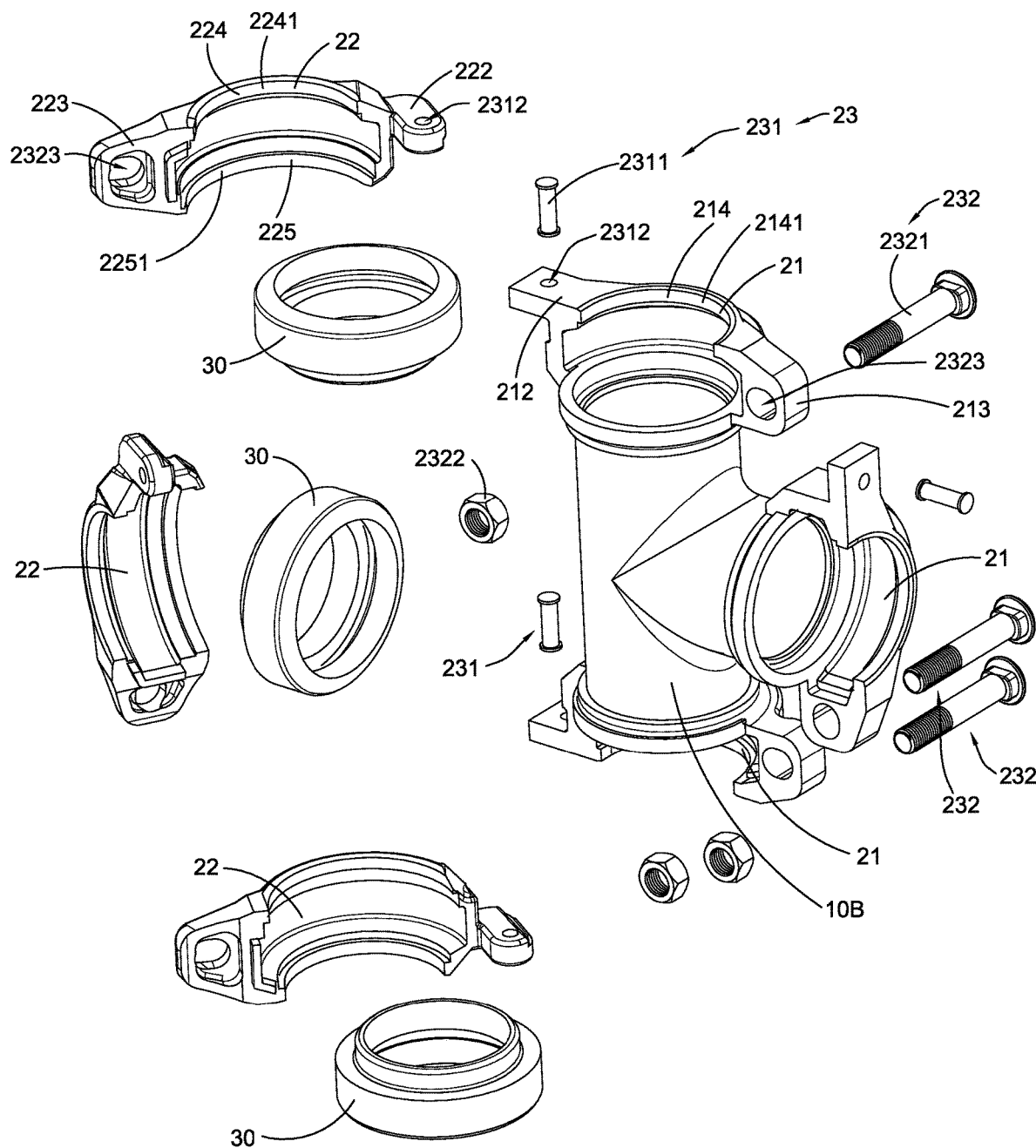
FIG. 24 is an exploded view of the quick-fitting pipe fitting assembly according to the above third preferred embodiment of the present invention.
Figure 25:
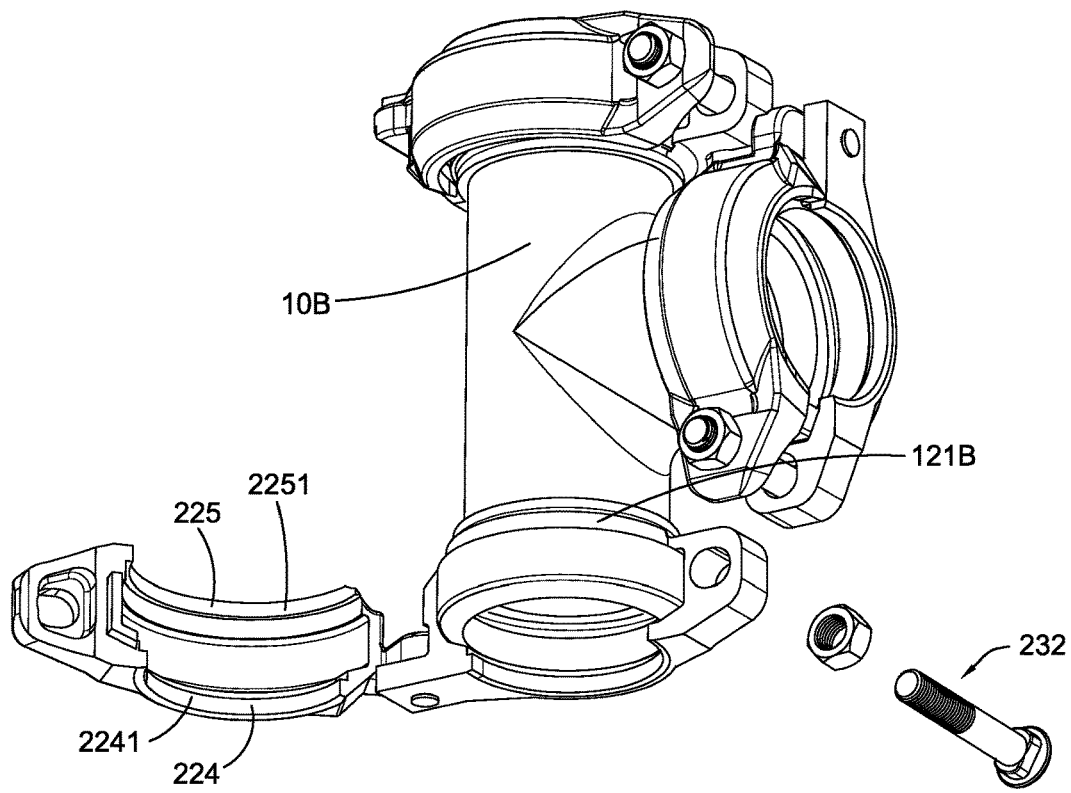
FIG. 25 is a partially exploded perspective view illustrating movable coupling elements and a pipe fitting body of the quick-fitting pipe fitting assembly according to the above third preferred embodiment of the present invention.

Referring to FIGS. 23 to 25 of the drawings, a quick-fitting pipe fitting assembly 100B according to a third preferred embodiment of the present invention is illustrated. According to this third preferred embodiment, the quick-fitting pipe fitting assembly 100B, which is embodied as a tee, comprises a pipe fitting body 10A which is a tee body having three channels 11B and comprising three fitting portions 12B defining the three channels 11B respectively with each fitting portion 12B has an end portion 121B, three coupling units 20 provided at the three end portions 121B of the pipe fitting body 10B respectively for coupling with three pipe elements 200, and three gaskets 30 disposed at the three coupling units 20 respectively.

Each of the three coupling units 20 comprises a fixed coupling element 21, a movable coupling element 22, and a plurality of connecting elements 23 for connecting the fixed coupling element 21 with the movable coupling element 22. The fixed coupling element 21 is integrally extended from the corresponding end portion 121B of the pipe fitting body 10B for being fastened with the movable coupling element 22 by the connecting elements 23, so as to couple the corresponding pipe element 200 with the quick-fitting pipe fitting assembly 100B.

Similarly, the plurality of connecting elements 23 detachably couple the fixed coupling element 21 with the movable coupling element 22 of each of the three coupling units 20. According to this preferred embodiment, the plurality of connecting elements 23 comprise a pivotally connecting element 231 for pivotally connecting a first connecting portion 212 of the fixed coupling element 21 with a first connector portion 222 of the movable coupling element 22 and a fastening element 232 for fastening a second connecting portion 213 of the fixed coupling element 21 with a second connector portion 223 of the movable coupling element 22.

Figure 26A:
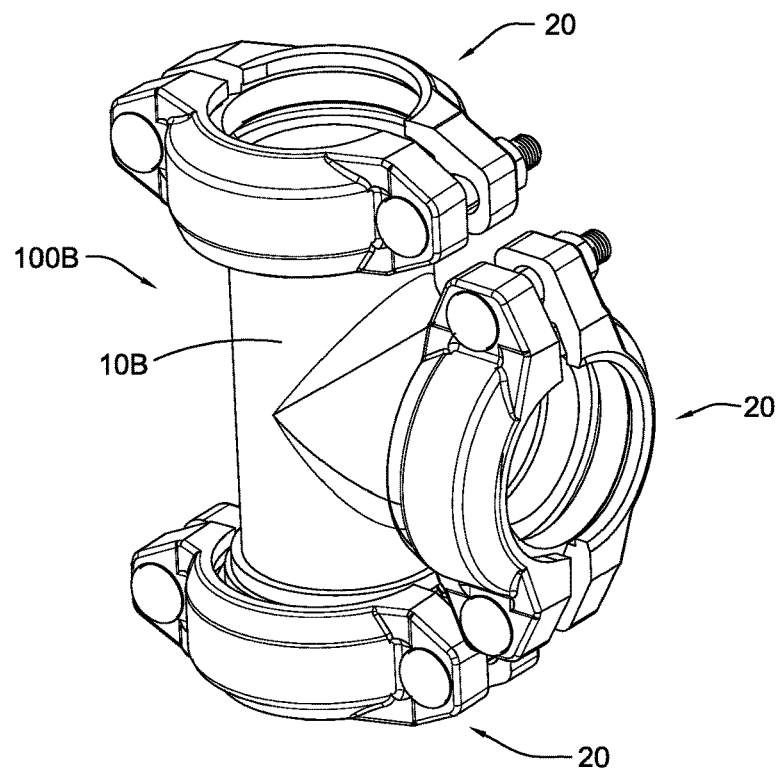
FIGS. 26A and 26B are perspective view and exploded view of a quick-fitting pipe fitting assembly according to a first alternative mode of the above third preferred embodiment of the present invention.
Figure 26B:
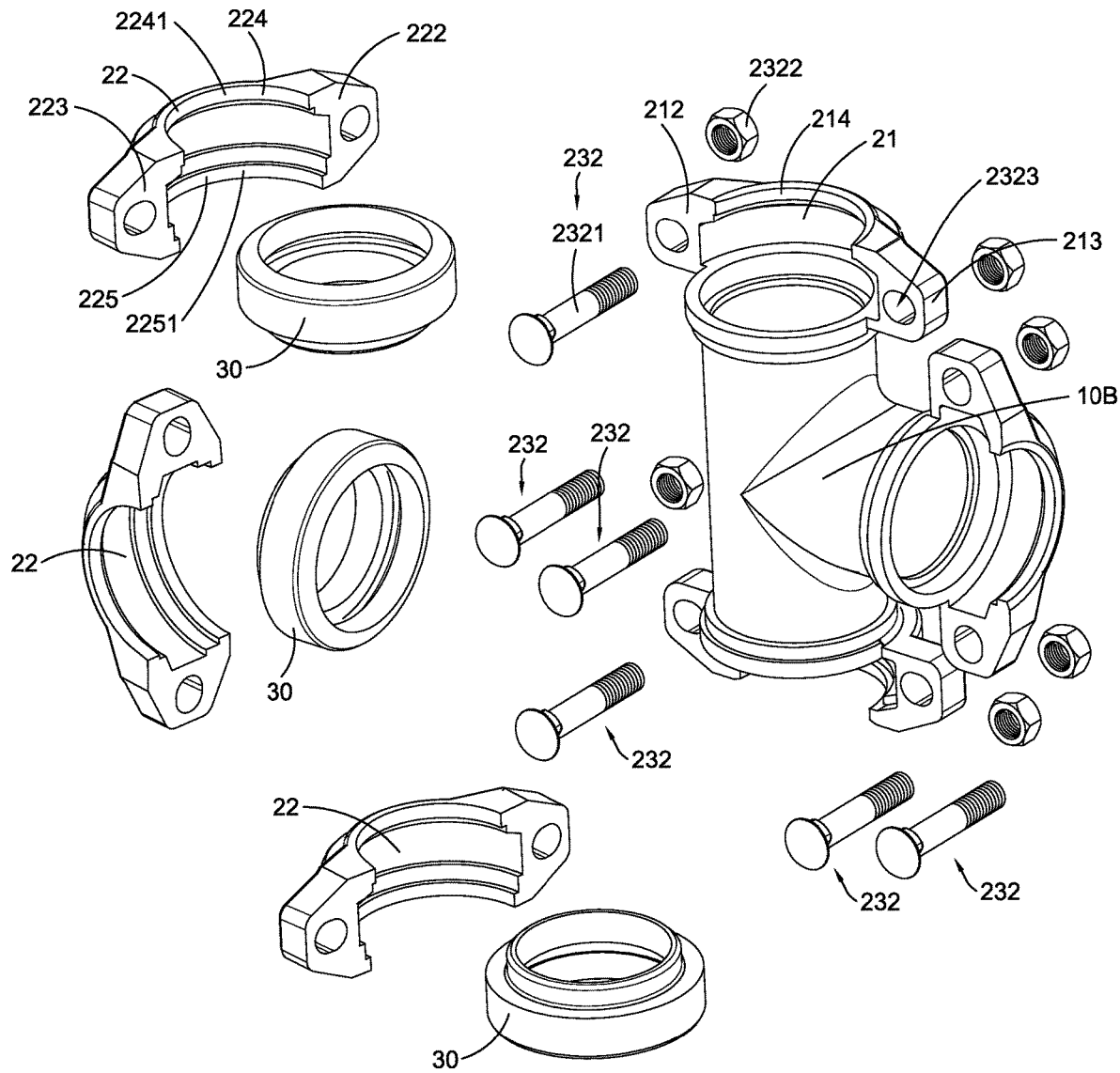

Referring to FIGS. 26A and 26B of the drawings, a quick-fitting pipe fitting assembly 100B according to a first alternative mode of the above third preferred embodiment of the present invention is illustrated. In this first alternative mode of the third preferred embodiment, the quick-fitting pipe fitting assembly 100B is a tee. The connecting elements 23 of each of the three coupling units 20 are embodied as two fastening elements 232 each comprising the bolt 2321, the nut 2322 and the fastening holes 2323. Accordingly, when fasten the fixed coupling element 21 with the corresponding movable coupling element 22, the two fastening elements 232 are operated to firmly fasten the first connecting portion 212 with the first connector portion 222, and firmly fasten the second connecting portion 213 with the second connector portion 223.

Figure 27A:
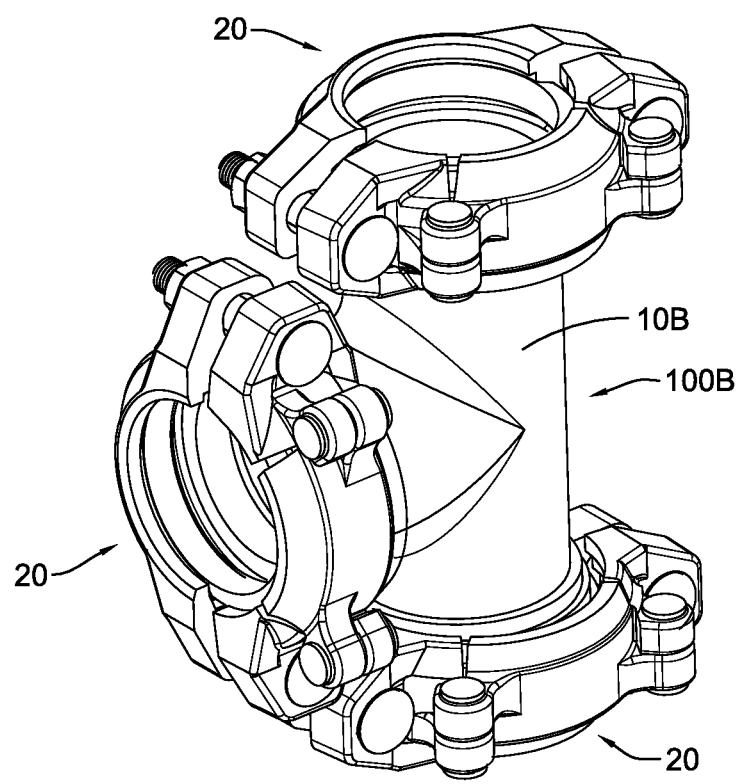
FIG. 27A is a perspective view of a quick-fitting pipe fitting assembly according to a second alternative mode of the above third preferred embodiment of the present invention.
Figure 27B:
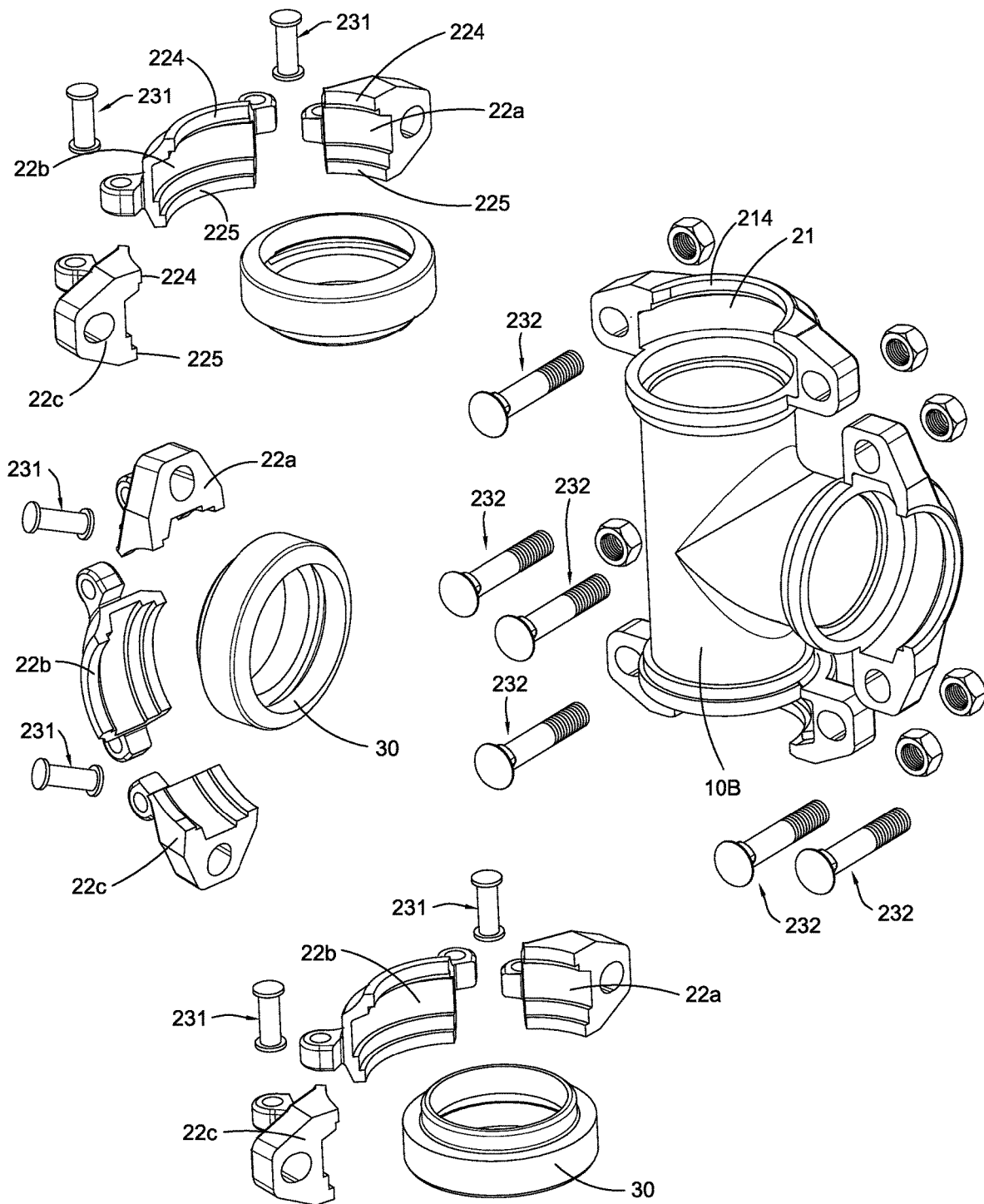
FIG. 27B is an exploded view of the quick-fitting pipe fitting assembly according to the second alternative mode of the above third preferred embodiment of the present invention.

Referring to FIGS. 27A and 27B of the drawings, a quick-fitting pipe fitting assembly 100B according to a second alternative mode of the above third preferred embodiment of the present invention is illustrated. In this second alternative mode of the third preferred embodiment, the quick-fitting pipe fitting assembly 100B is a tee, each of the coupling units 20 comprises a first movable coupling element 22a, a second movable coupling element 22b, and a third coupling element 22c. The first movable coupling element 22a and the third coupling element 22c are respectively connected with the fixed coupling element 21 by two fastening elements 232, the first movable coupling element 22a and the third coupling element 22c are respectively connected with the second movable coupling element 22b which is positioned between the first movable coupling element 22a and the third coupling element 22c by two pivotally connecting elements 231.

Figure 28A:
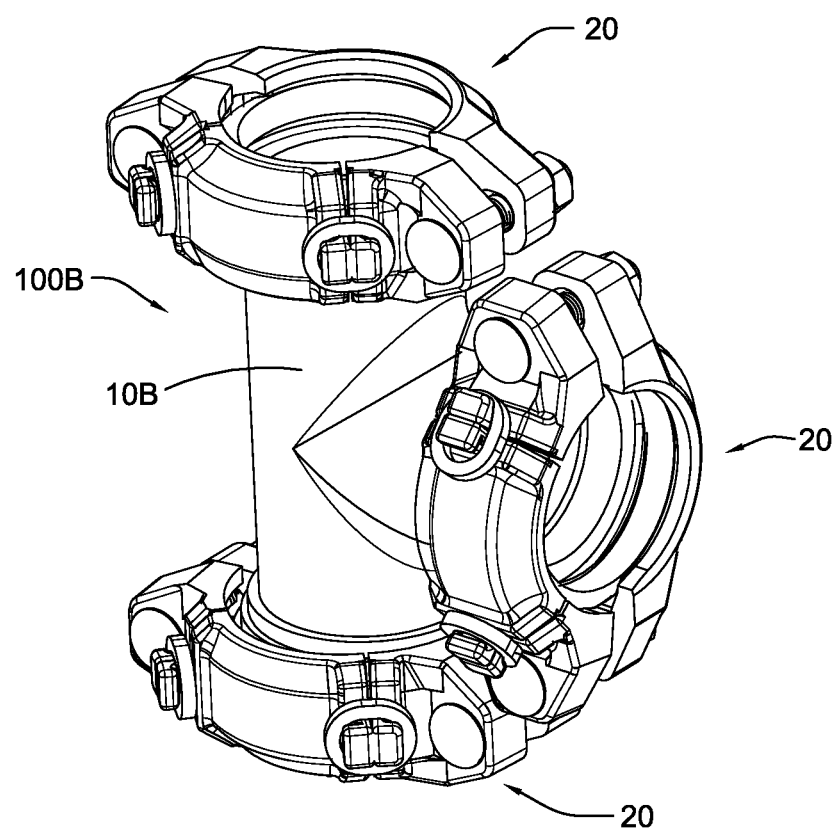
FIG. 28A is a perspective view of a quick-fitting pipe fitting assembly according to a third alternative mode of the above third preferred embodiment of the present invention.
Figure 28B:
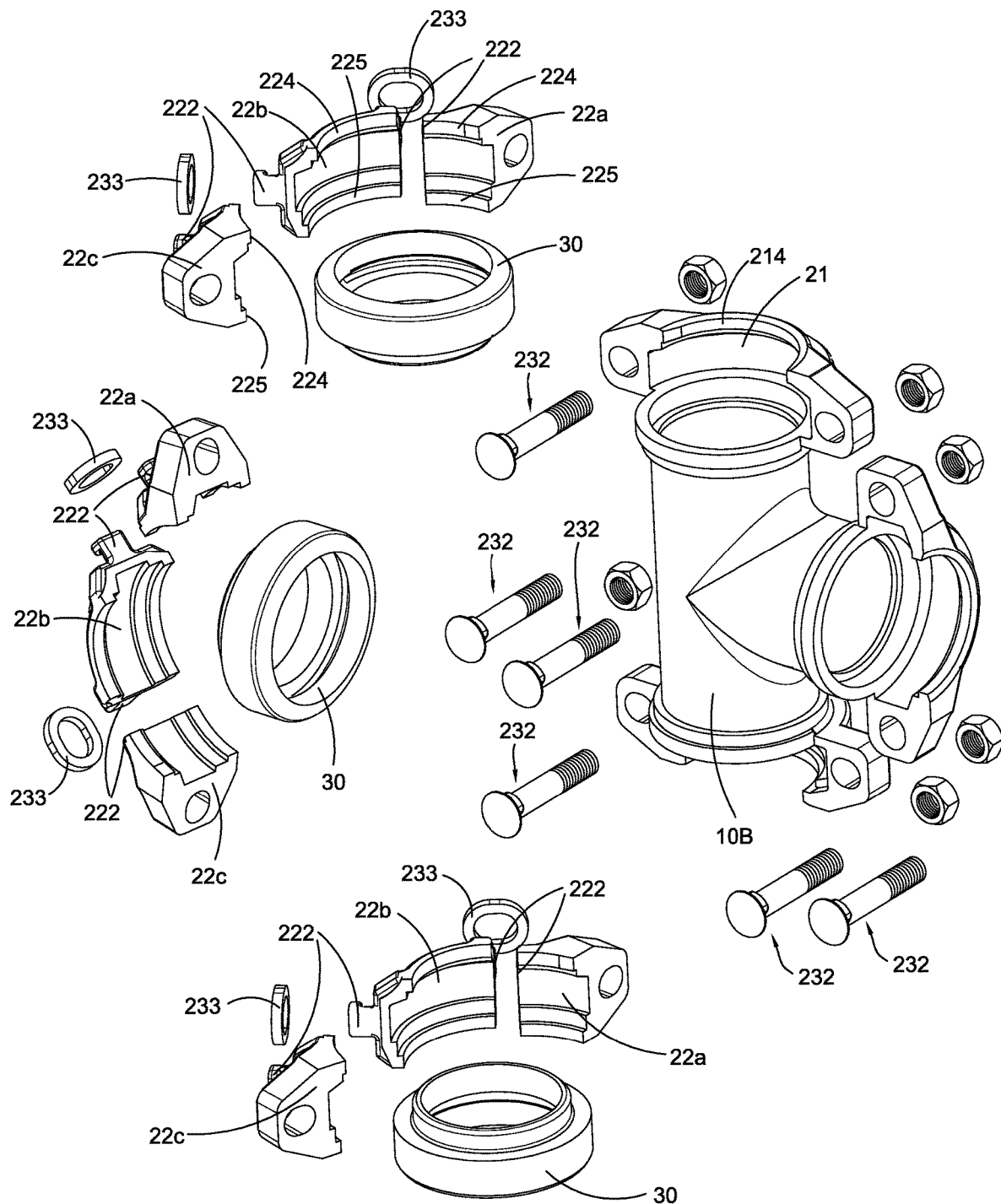
FIG. 28B is an exploded view of the quick-fitting pipe fitting assembly according to the third alternative mode of the above third preferred embodiment of the present invention.

Referring to FIGS. 28A and 28B of the drawings, a quick-fitting pipe fitting assembly 100B according to a third alternative mode of the above third preferred embodiment of the present invention is illustrated. In this third alternative mode of the third preferred embodiment, the quick-fitting pipe fitting assembly 100A is a tee, each of the coupling units 20 comprises a first movable coupling element 22a, a second movable coupling element 22b, and a third coupling element 22c. The first movable coupling element 22a and the third coupling element 22c are respectively connected with the fixed coupling element 21 by two fastening elements 232, the first movable coupling element 22a and the third coupling element 22c are respectively connected with the second movable coupling element 22b which is positioned between the first movable coupling element 22a and the third coupling element 22c by two snap rings 233. In other words, the second movable coupling element 22b comprises two first connector portions 222 at two sides thereof, each first connector portion 222 is connected with the first connector portion 222 of the first movable coupling element 22a or the third movable coupling element 22c by the snap ring 233.

Figure 29:
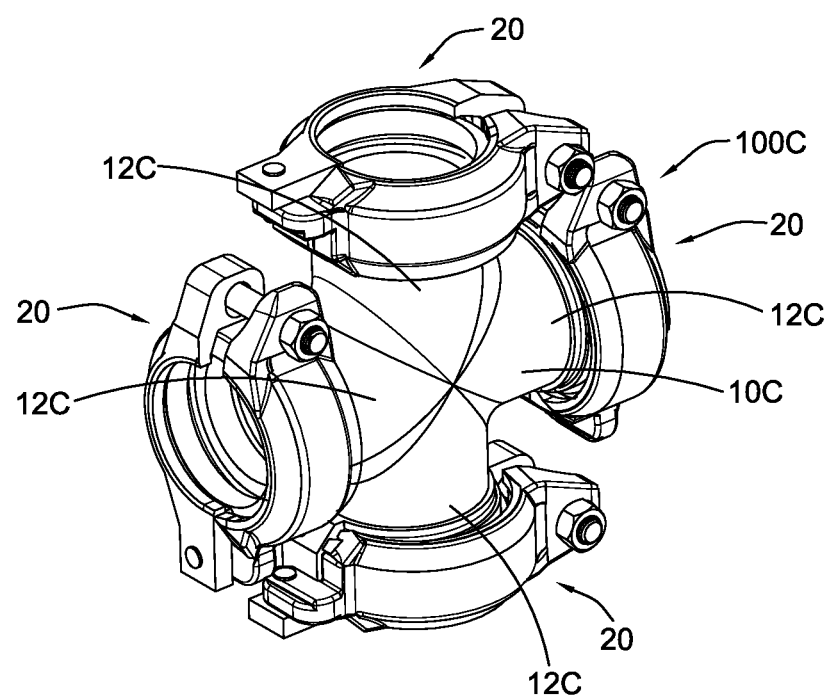
FIG. 29 is a perspective view of a quick-fitting pipe fitting assembly according to a fourth preferred embodiment of the present invention.
Figure 30:
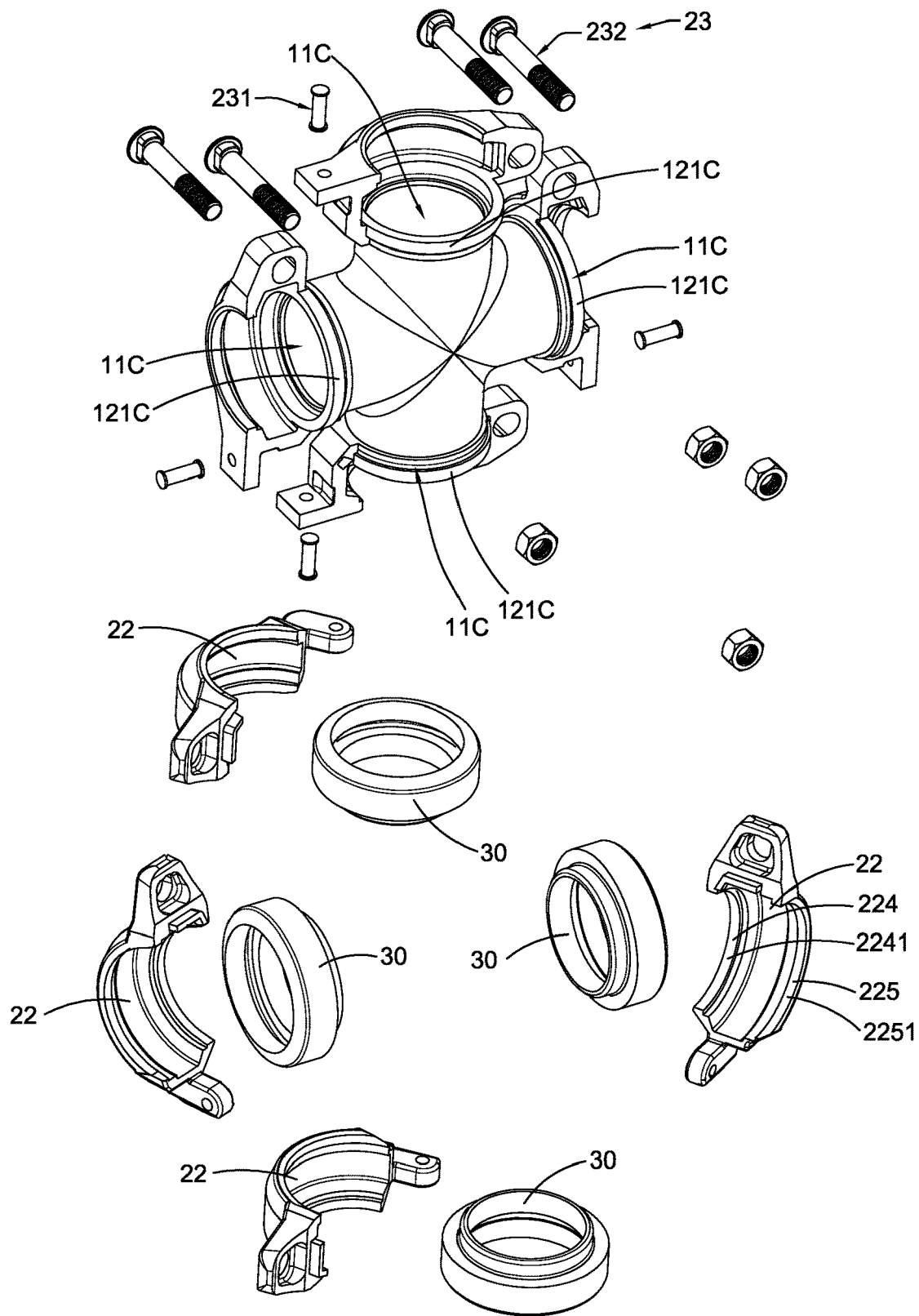
FIG. 30 is an exploded view of the quick-fitting pipe fitting assembly according to the above fourth preferred embodiment of the present invention.
Figure 31:
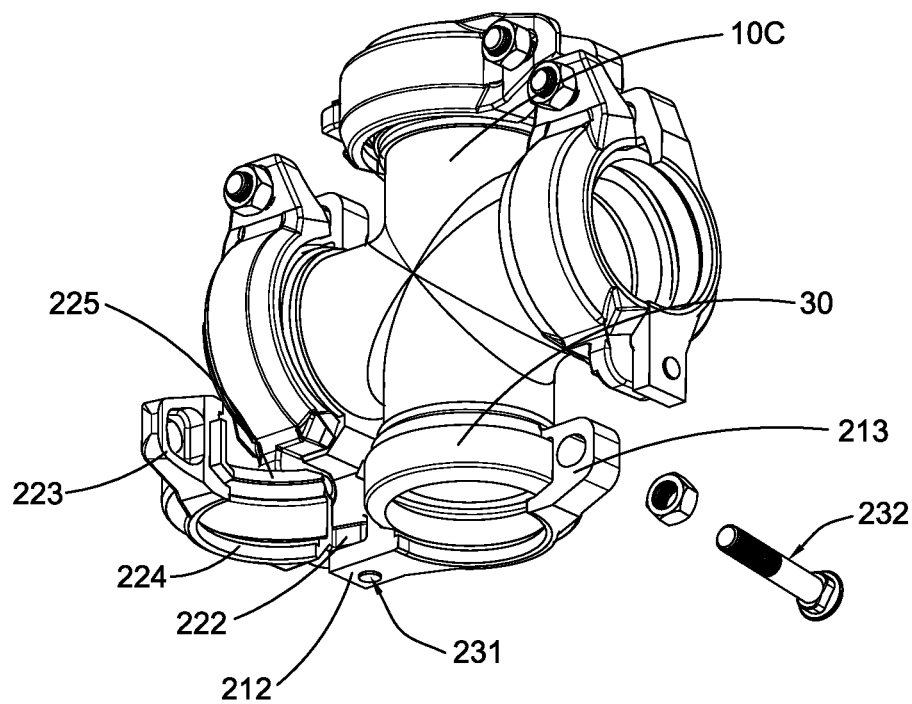
FIG. 31 is a partially exploded view illustrating movable coupling elements and a pipe fitting body of the quick-fitting pipe fitting assembly according to the above fourth preferred embodiment of the present invention.

Referring to FIGS. 29 to 31 of the drawings, a quick-fitting pipe fitting assembly 100C according to a fourth preferred embodiment of the present invention is illustrated. According to this fourth preferred embodiment, the quick-fitting pipe fitting assembly 100C, which is embodied as a cross, comprises a pipe fitting body 10C which is a cross body having four channels 11C and comprising four fitting portions 12C defining the four channels 11C respectively with each fitting portion 12C has an end portion 121C, four coupling units 20 provided at the four end portions 121C of the pipe fitting body 10C respectively for coupling with four pipe elements 200, and four gaskets 30 disposed at the four coupling units 20 respectively.

Each of the four coupling units 20 comprises a fixed coupling element 21, a movable coupling element 22, and a plurality of connecting elements 23 for connecting the fixed coupling element 21 with the movable coupling element 22. The fixed coupling element 21 is integrally extended from the corresponding end portion 121C of the pipe fitting body 10C for being fastened with the movable coupling element 22 by the connecting elements 23, so as to couple the corresponding pipe element 200 with the quick-fitting pipe fitting assembly 100C.

Similarly, the plurality of connecting elements 23 detachably couple the fixed coupling element 21 with the movable coupling element 22 of each of the four coupling units 20. According to this preferred embodiment, the plurality of connecting elements 23 comprise a pivotally connecting element 231 for pivotally connecting a first connecting portion 212 of the fixed coupling element 21 with a first connector portion 222 of the movable coupling element 22 and a fastening element 232 for fastening a second connecting portion 213 of the fixed coupling element 21 with a second connector portion 223 of the movable coupling element 22.

Figure 32A:
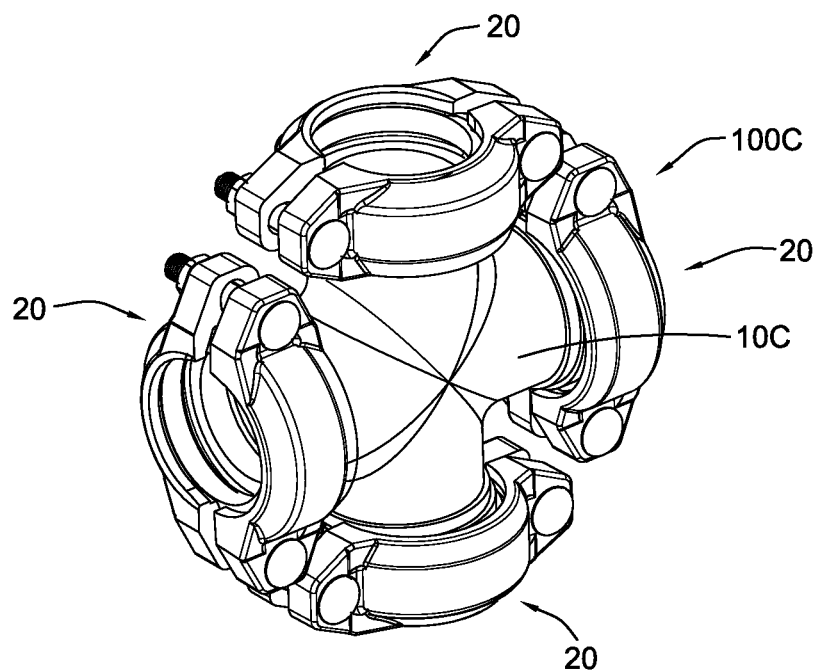
FIGS. 32A and 32B are perspective view and exploded view of a quick-fitting pipe fitting assembly according to a first alternative mode of the above fourth preferred embodiment of the present invention.
Figure 32B:
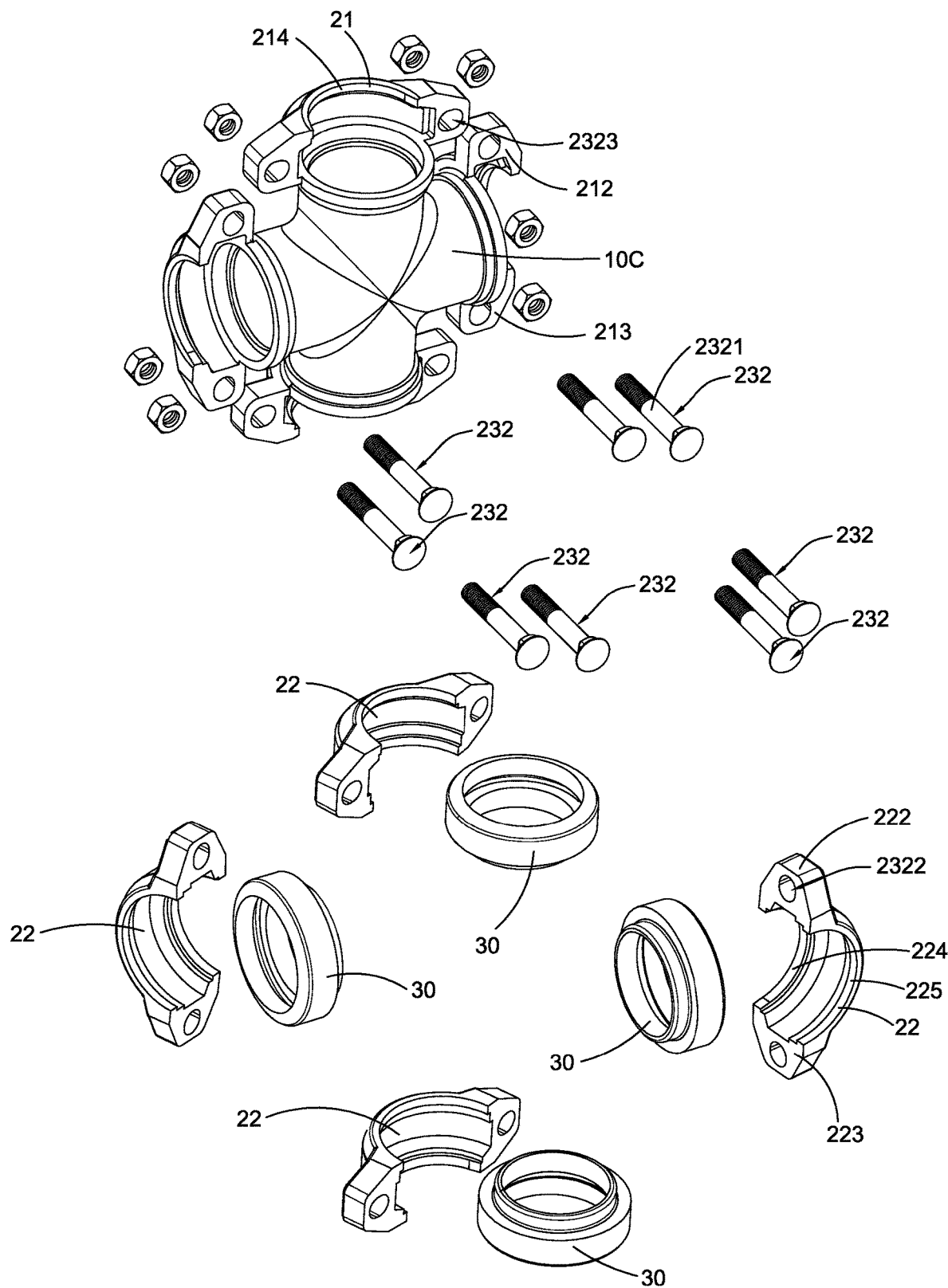

Referring to FIGS. 32A and 32B of the drawings, a quick-fitting pipe fitting assembly 100C according to a first alternative mode of the above fourth preferred embodiment of the present invention is illustrated. In this first alternative mode of the fourth preferred embodiment, the quick-fitting pipe fitting assembly 100C is a cross. The connecting elements 23 of each of the coupling units 20 are embodied as two fastening elements 232 each comprising the bolt 2321, the nut 2322 and the fastening holes 2323. Accordingly, when fasten the fixed coupling element 21 with the corresponding movable coupling element 22, the two fastening elements 232 are operated to firmly fasten the first connecting portion 212 with the first connector portion 222, and firmly fasten the second connecting portion 213 with the second connector portion 223.

Figure 33A:
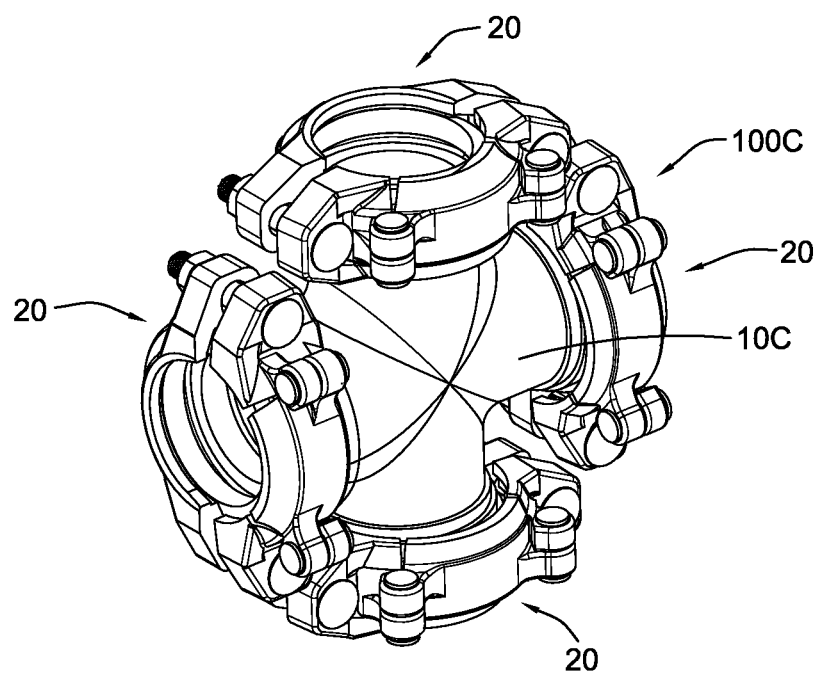
FIG. 33A is a perspective view of a quick-fitting pipe fitting assembly according to a second alternative mode of the above fourth preferred embodiment of the present invention.
Figure 33B:
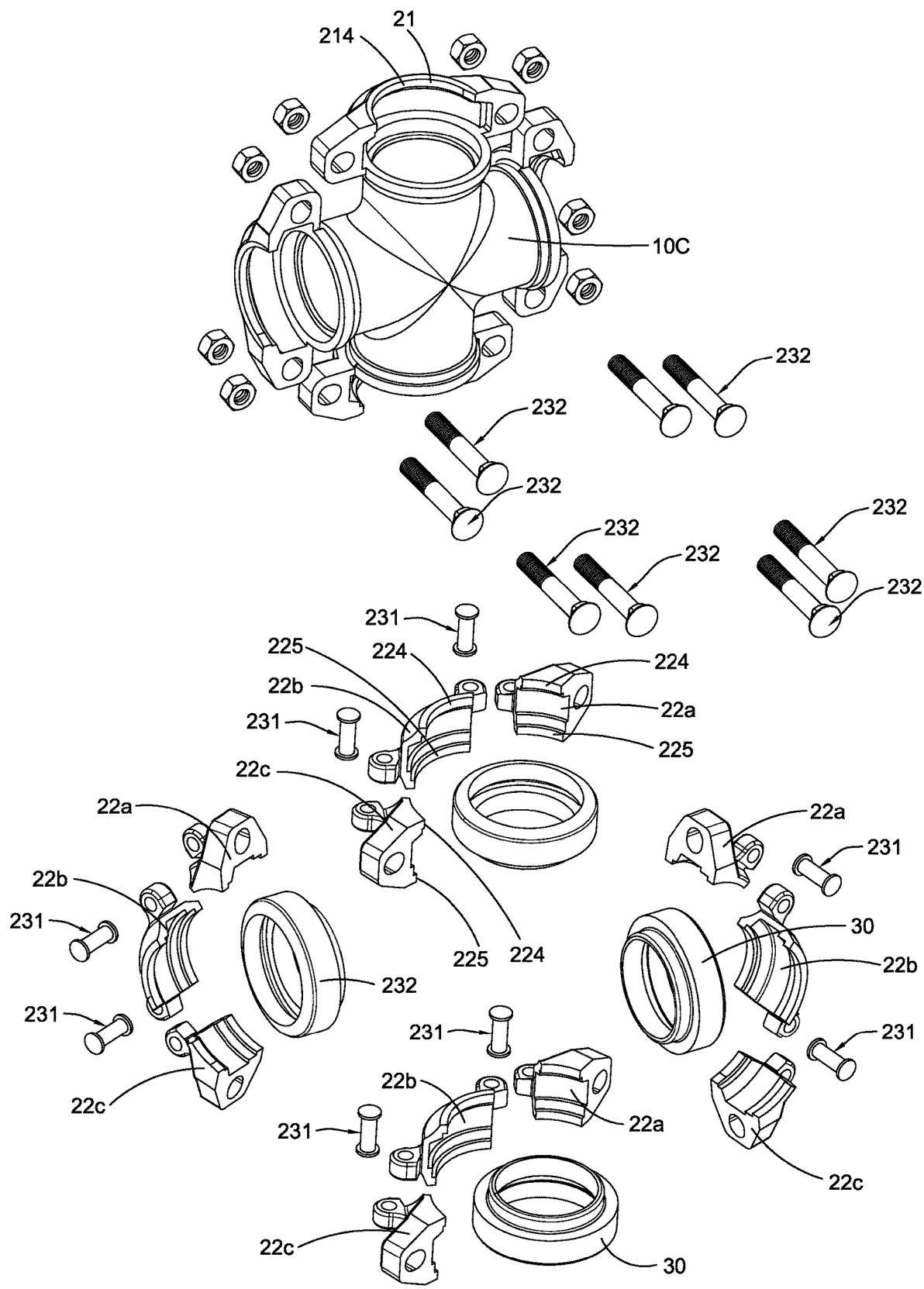
FIG. 33B is an exploded view of the quick-fitting pipe fitting assembly according to the second alternative mode of the above fourth preferred embodiment of the present invention.

Referring to FIGS. 33A and 33B of the drawings, a quick-fitting pipe fitting assembly 100C according to a second alternative mode of the above fourth preferred embodiment of the present invention is illustrated. In this second alternative mode of the fourth preferred embodiment, the quick-fitting pipe fitting assembly 100C is a cross, each of the coupling units 20 comprises a first movable coupling element 22a, a second movable coupling element 22b, and a third coupling element 22c. The first movable coupling element 22a and the third coupling element 22c are respectively connected with the fixed coupling element 21 by two fastening elements 232, the first movable coupling element 22a and the third coupling element 22c are respectively connected with the second movable coupling element 22b which is positioned between the first movable coupling element 22a and the third coupling element 22c by two pivotally connecting elements 231.

Figure 34A:
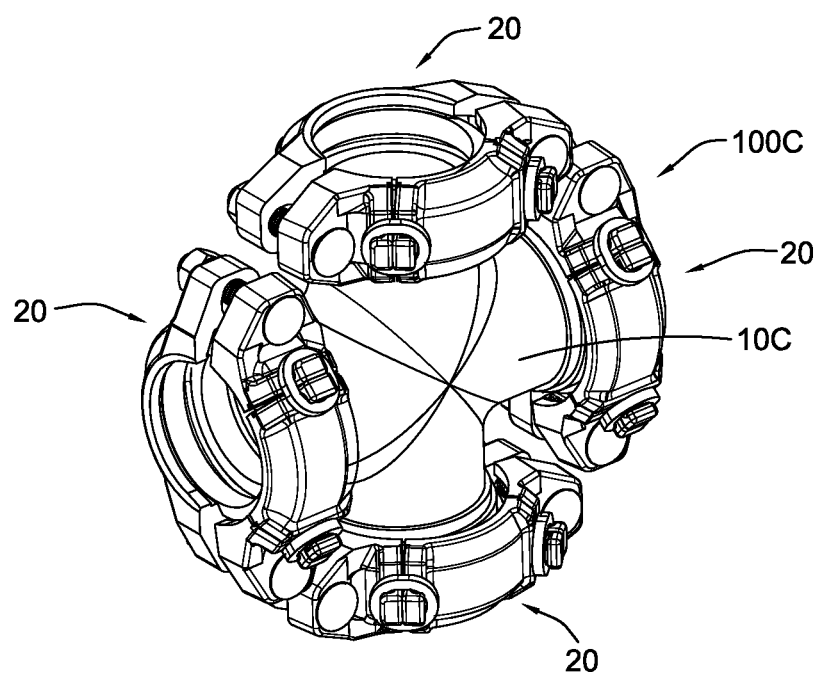
FIG. 34A is a perspective view of a quick-fitting pipe fitting assembly according to a third alternative mode of the above fourth preferred embodiment of the present invention.
Figure 34B:
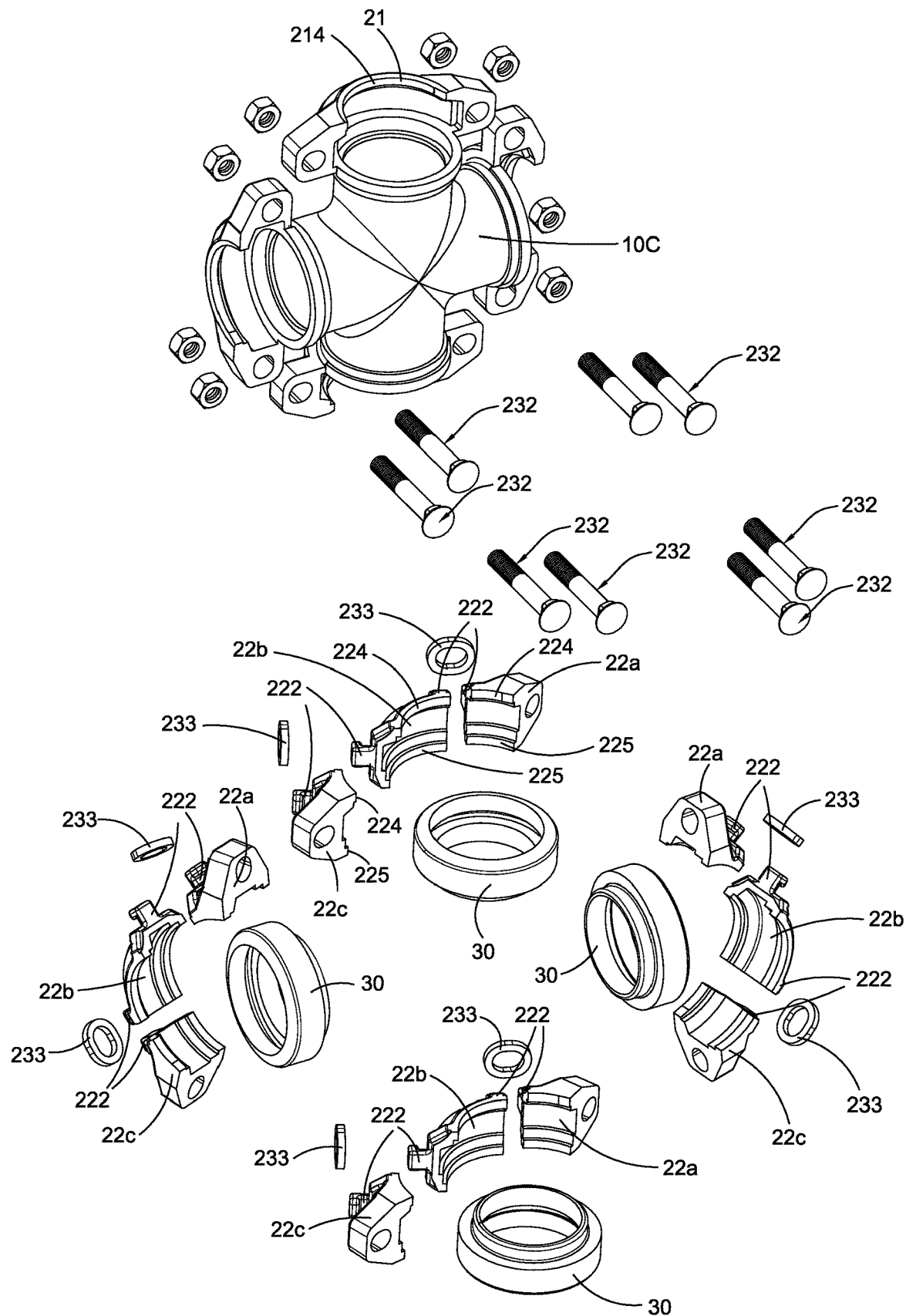
FIG. 34B is an exploded view of the quick-fitting pipe fitting assembly according to the third alternative mode of the above fourth preferred embodiment of the present invention.

Referring to FIGS. 34A and 34B of the drawings, a quick-fitting pipe fitting assembly 100C according to a third alternative mode of the above fourth preferred embodiment of the present invention is illustrated. In this third alternative mode of the fourth preferred embodiment, the quick-fitting pipe fitting assembly 100C is a cross, each of the coupling units 20 comprises a first movable coupling element 22a, a second movable coupling element 22b, and a third coupling element 22c. The first movable coupling element 22a and the third coupling element 22c are respectively connected with the fixed coupling element 21 by two fastening elements 232, the first movable coupling element 22a and the third coupling element 22c are respectively connected with the second movable coupling element 22b which is positioned between the first movable coupling element 22a and the third coupling element 22c by two snap rings 233. In other words, the second movable coupling element 22b comprises two first connector portions 222 at two sides thereof, each first connector portion 222 is connected with the first connector portion 222 of the first movable coupling element 22a or the third movable coupling element 22c by the snap ring 233.

Figure 35:
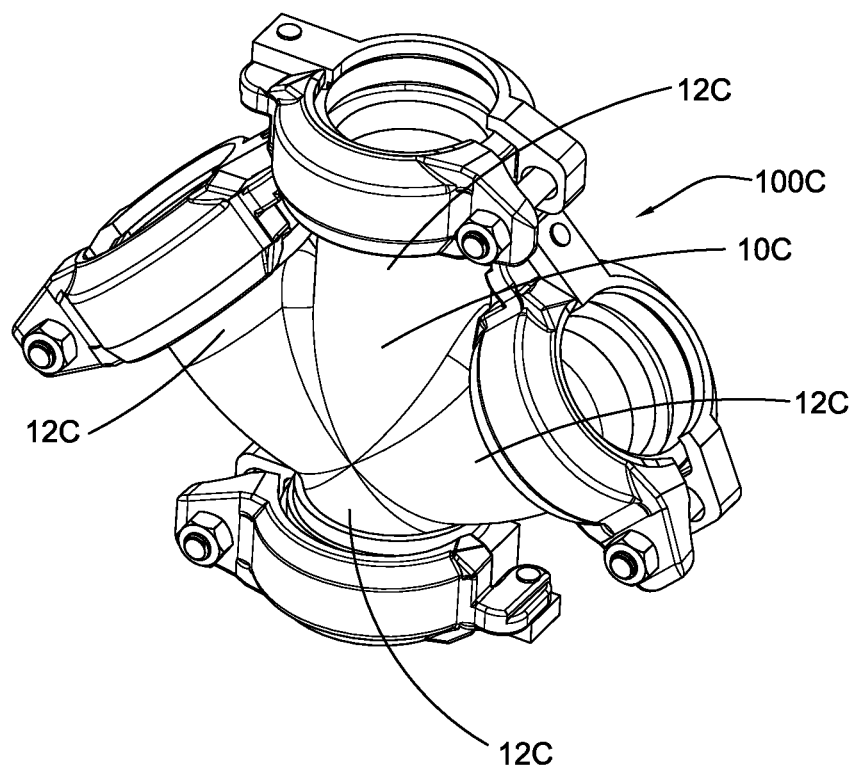
FIG. 35 is a perspective view of a quick-fitting pipe fitting assembly according to a fourth alternative mode of the above fourth preferred embodiment of the present invention.
Figure 36:
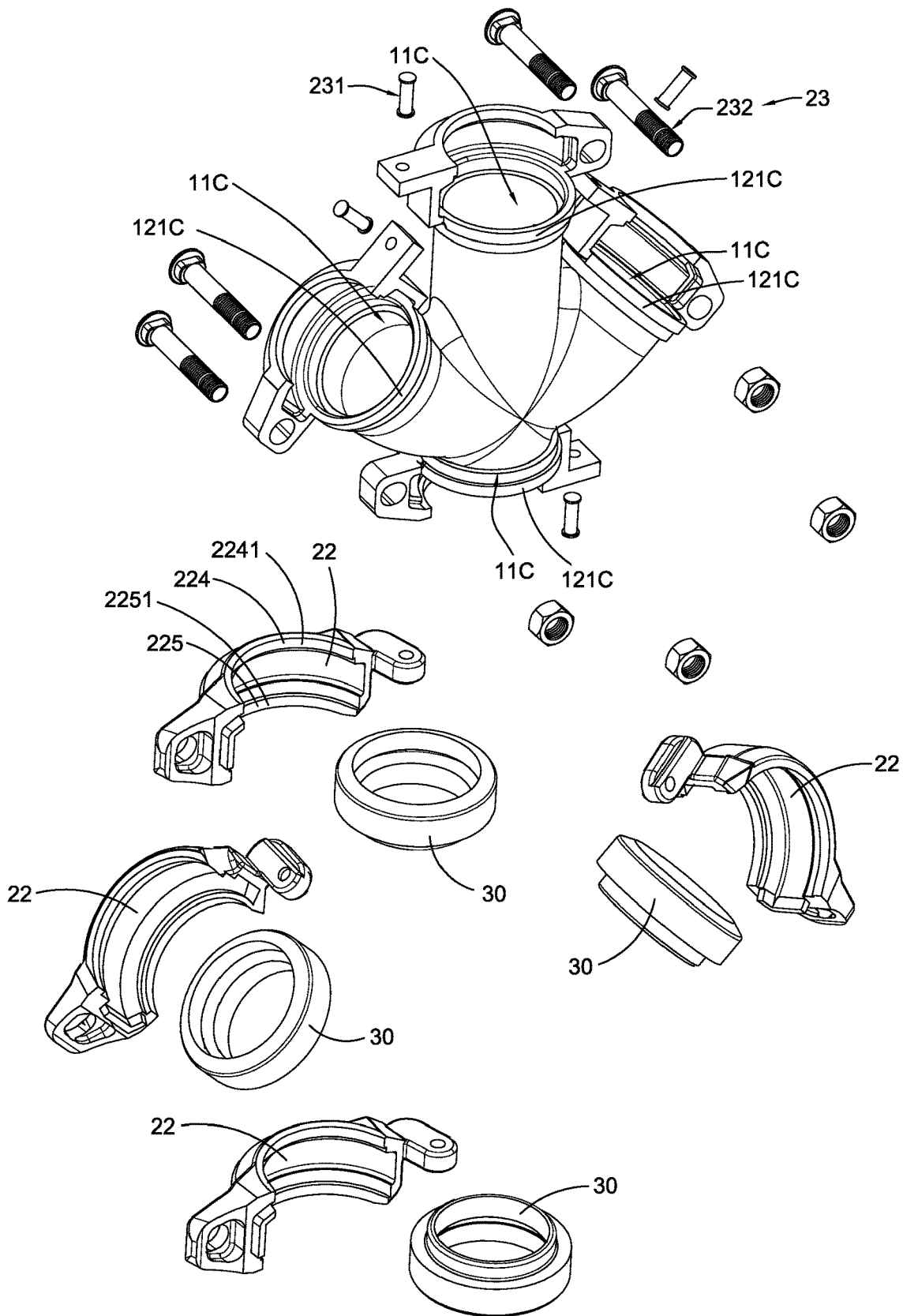
FIG. 36 is a schematic view illustrating the quick-fitting pipe fitting assembly according to the above fourth alternative mode of the above fourth preferred embodiment of the present invention.
Figure 37:
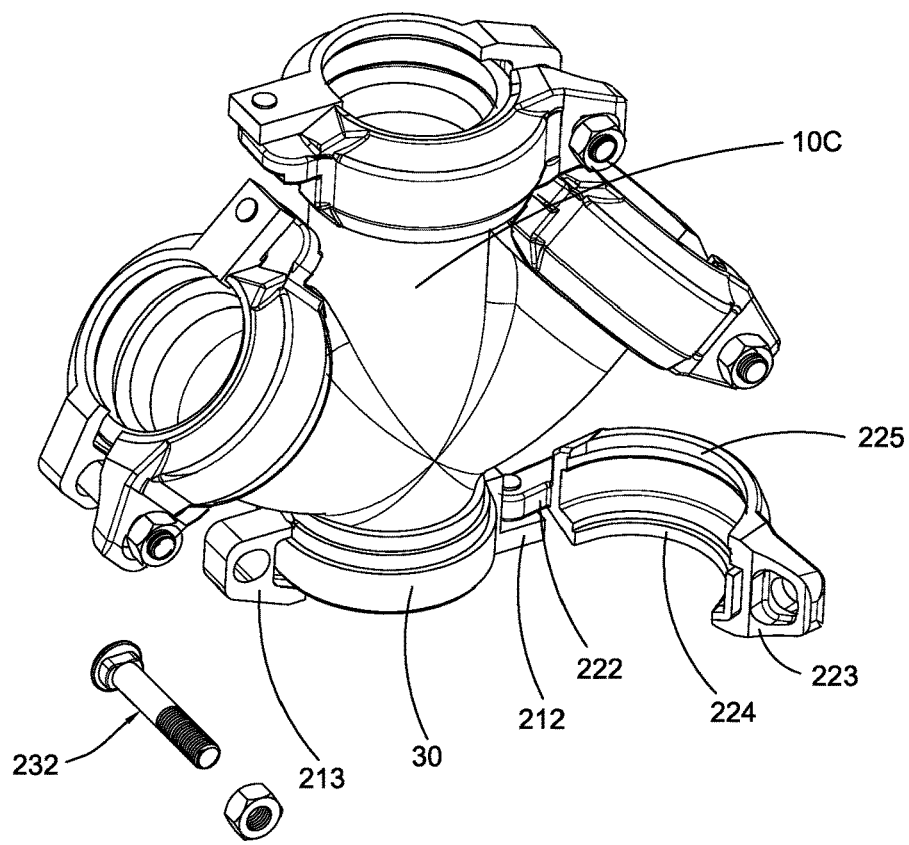
FIG. 37 is a partially exploded perspective view of the quick-fitting pipe fitting assembly according to the above fourth alternative mode of the above fourth preferred embodiment of the present invention.

Referring to FIGS. 35 and 37 of the drawings, a quick-fitting pipe fitting assembly 100C according to a fourth alternative mode of the above fourth preferred embodiment of the present invention is illustrated. In this fourth alternative mode of the fourth preferred embodiment, the quick-fitting pipe fitting assembly 100C is an oblique cross and is preferably made of a plastic material such as polyvinyl chloride or high density polyethylene. According to the embodiments shown in FIGS. 29 to 34B, the adjacent end portions 121C of the pipe fitting body 10C define an angle of 90°. According to this preferred embodiment, the quick-fitting pipe fitting assembly 100C, which is an oblique cross, comprises four fitting portions 12C with four end portions 121C, and two adjacent end portions 121C cannot be perpendicular with each other.

Figure 38:
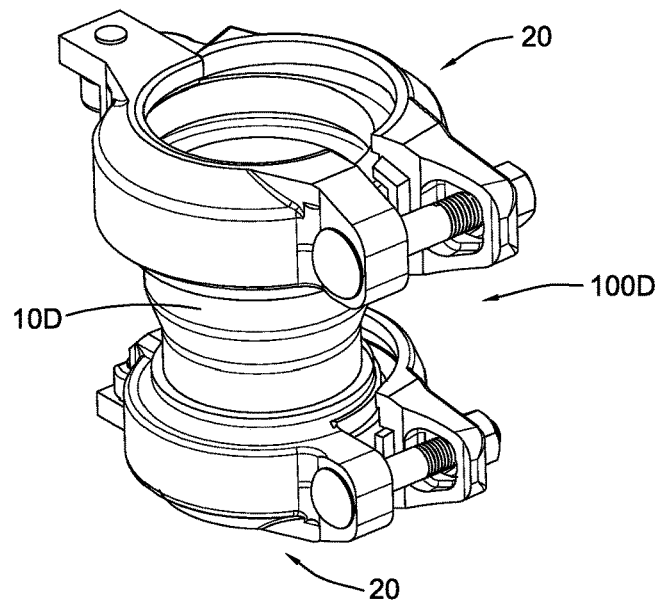
FIG. 38 is a perspective view of a quick-fitting pipe fitting assembly according to a fifth preferred embodiment of the present invention.
Figure 39:
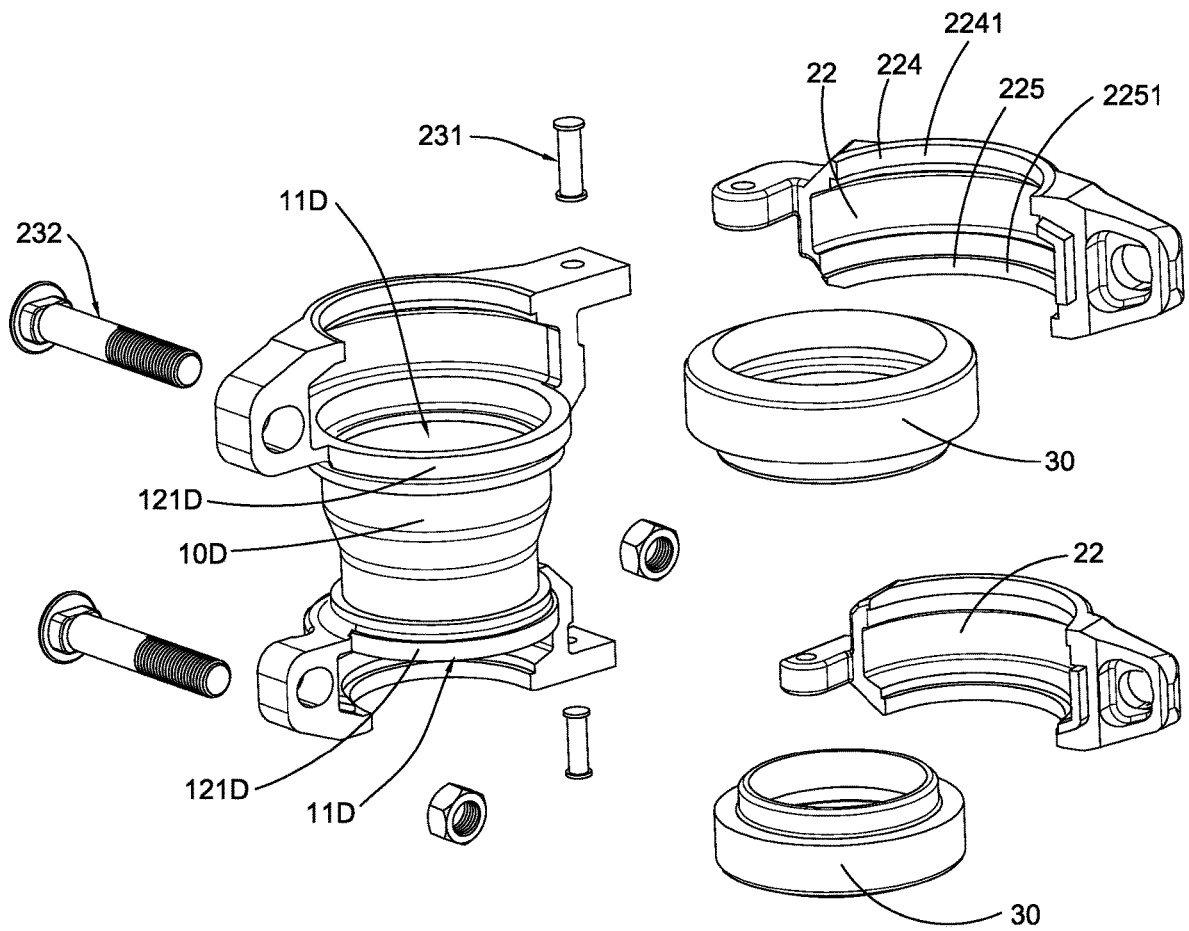
FIG. 39 is an exploded view of the quick-fitting pipe fitting assembly according to the above fifth preferred embodiment of the present invention.
Figure 40:
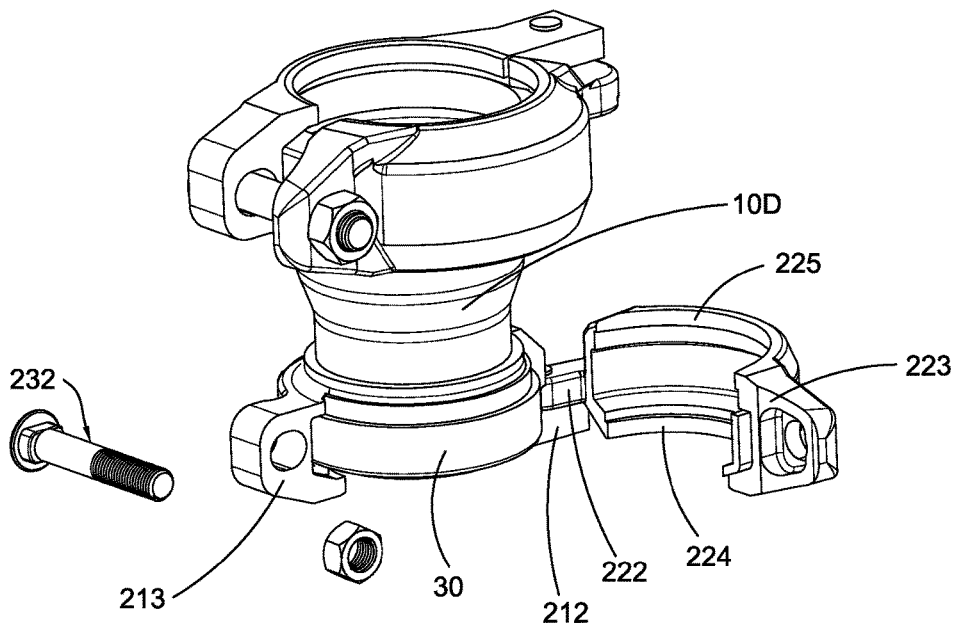
FIG. 40 is a partially exploded perspective view illustrating movable coupling elements and a pipe fitting body of the quick-fitting pipe fitting assembly according to the above fifth preferred embodiment of the present invention.

Referring to FIGS. 38 to 40 of the drawings, a quick-fitting pipe fitting assembly 100D according to a fifth preferred embodiment of the present invention is illustrated. According to this fifth preferred embodiment, the quick-fitting pipe fitting assembly 100D, which is embodied as a reducer, comprises a pipe fitting body 10D which is a reducer body having a channel 11D and comprises two end portions 121D, two coupling units 20 provided at the two end portions 121D of the pipe fitting body 10D respectively for coupling with two pipe elements 200, and two gaskets 30 disposed at the two coupling units 20 respectively.

The reducer of this fifth preferred embodiment is a pipe fitting used in process piping that reduces the pipe size from a larger bore to a smaller bore. In other words, the two end portions 121D of the pipe fitting body 10D have different diameters for coupling with the two pipe elements 200 with different diameters. In other words, a first end portion of the pipe fitting body 10D may have a relatively large diameter while a second end portion of the pipe fitting body 10D may have a relatively small diameter, and the corresponding coupling units 20 provided at the first and second end portions 121D respectively have different sizes.

Each of the two coupling units 20 comprises a fixed coupling element 21, a movable coupling element 22, and a plurality of connecting elements 23 for connecting the fixed coupling element 21 with the movable coupling element 22. The fixed coupling element 21 is integrally extended from the corresponding end portion 121D of the pipe fitting body 10D for being fastened with the movable coupling element 22 by the connecting elements 23, so as to couple the corresponding pipe element 200 with the quick-fitting pipe fitting assembly 100D.

Similarly, the plurality of connecting elements 23 detachably couple the fixed coupling element 21 with the movable coupling element 22 of each of the two coupling units 20. According to this preferred embodiment, the plurality of connecting elements 23 comprise a pivotally connecting element 231 for pivotally connecting a first connecting portion 212 of the fixed coupling element 21 with a first connector portion 222 of the movable coupling element 22 and a fastening element 232 for fastening a second connecting portion 213 of the fixed coupling element 21 with a second connector portion 223 of the movable coupling element 22.

Figure 41A:
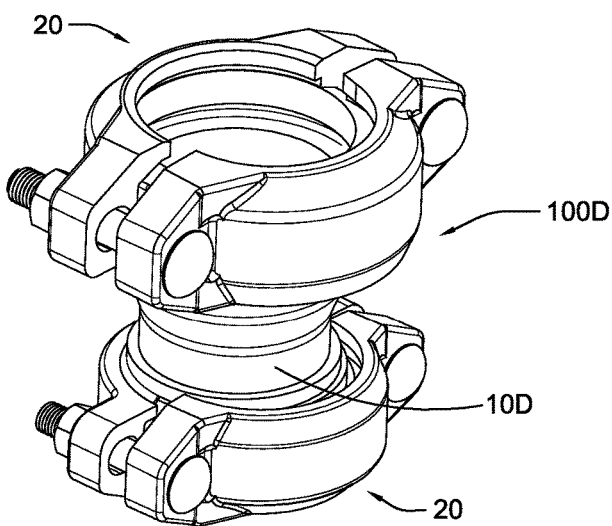
FIGS. 41A and 41B are perspective view and exploded view of a quick-fitting pipe fitting assembly according to a first alternative mode of the above fifth preferred embodiment of the present invention.
Figure 41B:
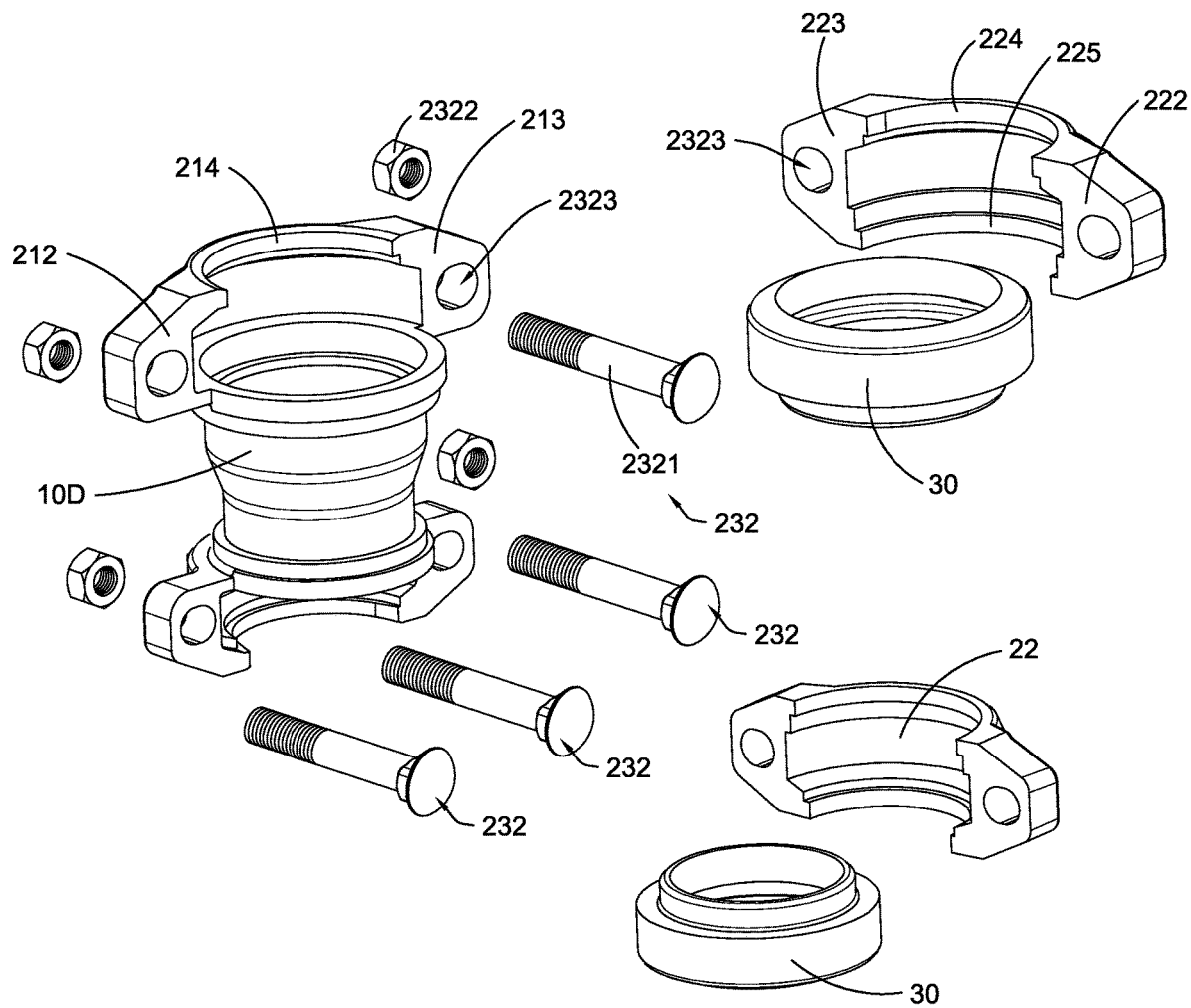

Referring to FIGS. 41A and 41B of the drawings, a quick-fitting pipe fitting assembly 100D according to a first alternative mode of the above fifth preferred embodiment of the present invention is illustrated. In this first alternative mode of the fifth preferred embodiment, the quick-fitting pipe fitting assembly 100D is a reducer. The connecting elements 23 of each of the coupling units 20 are embodied as two fastening elements 232 each comprising the bolt 2321, the nut 2322 and the fastening holes 2323. Accordingly, when fasten the fixed coupling element 21 with the corresponding movable coupling element 22, the two fastening elements 232 are operated to firmly fasten the first connecting portion 212 with the first connector portion 222, and firmly fasten the second connecting portion 213 with the second connector portion 223.

Figure 42A:
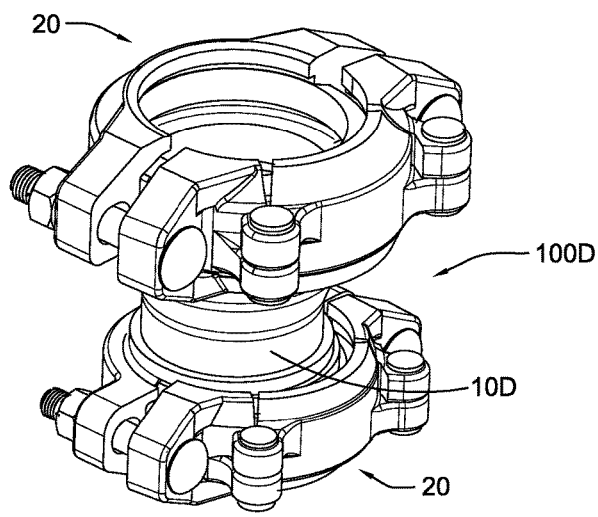
FIG. 42A is a perspective view of a quick-fitting pipe fitting assembly according to a second alternative mode of the above fifth preferred embodiment of the present invention.
Figure 42B:
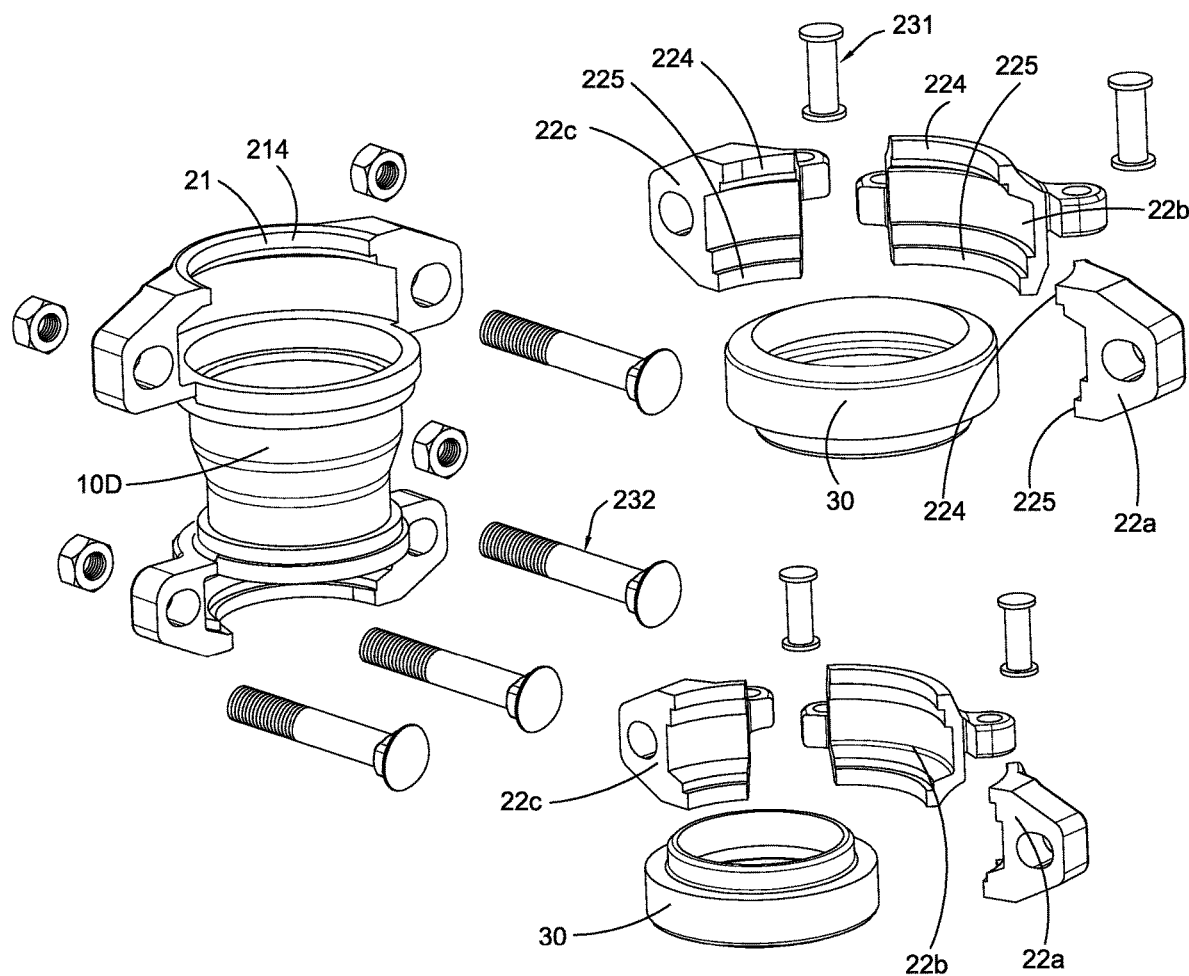
FIG. 42B is an exploded view of the quick-fitting pipe fitting assembly according to the second alternative mode of the above fifth preferred embodiment of the present invention.

Referring to FIGS. 42A and 42B of the drawings, a quick-fitting pipe fitting assembly 100D according to a second alternative mode of the above fifth preferred embodiment of the present invention is illustrated. In this second alternative mode of the fifth preferred embodiment, the quick-fitting pipe fitting assembly 100D is a reducer, each of the coupling units 20 comprises a first movable coupling element 22a, a second movable coupling element 22b, and a third coupling element 22c. The first movable coupling element 22a and the third coupling element 22c are respectively connected with the fixed coupling element 21 by two fastening elements 232, the first movable coupling element 22a and the third coupling element 22c are respectively connected with the second movable coupling element 22b which is positioned between the first movable coupling element 22a and the third coupling element 22c by two pivotally connecting elements 231.

Figure 43A:
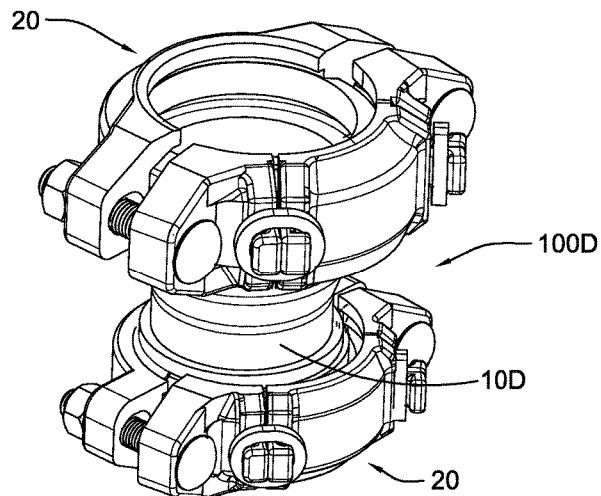
FIG. 43A is a perspective view of a quick-fitting pipe fitting assembly according to a third alternative mode of the above fifth preferred embodiment of the present invention.
Figure 43B:
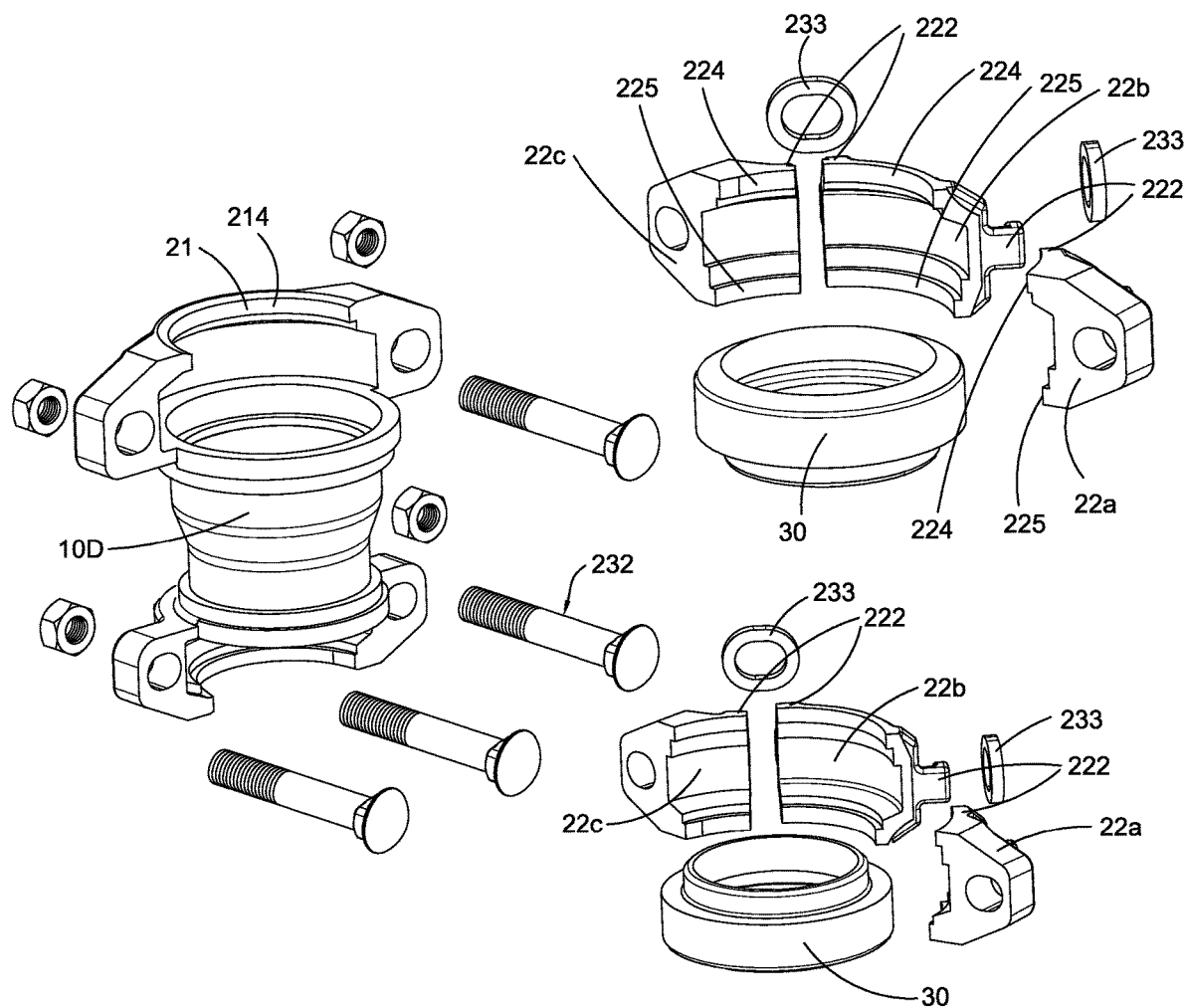
FIG. 43B is an exploded view of the quick-fitting pipe fitting assembly according to the third alternative mode of the above fifth preferred embodiment of the present invention.

Referring to FIGS. 43A and 43B of the drawings, a quick-fitting pipe fitting assembly 100D according to a third alternative mode of the above fifth preferred embodiment of the present invention is illustrated. In this third alternative mode of the fifth preferred embodiment, the quick-fitting pipe fitting assembly 100D is a reducer, each of the coupling units 20 comprises a first movable coupling element 22a, a second movable coupling element 22b, and a third coupling element 22c. The first movable coupling element 22a and the third coupling element 22c are respectively connected with the fixed coupling element 21 by two fastening elements 232, the first movable coupling element 22a and the third coupling element 22c are respectively connected with the second movable coupling element 22b which is positioned between the first movable coupling element 22a and the third coupling element 22c by two snap rings 233. In other words, the second movable coupling element 22b comprises two first connector portions 222 at two sides thereof, each first connector portion 222 is connected with the first connector portion 222 of the first movable coupling element 22a or the third movable coupling element 22c by the snap ring 233.

Figure 44:
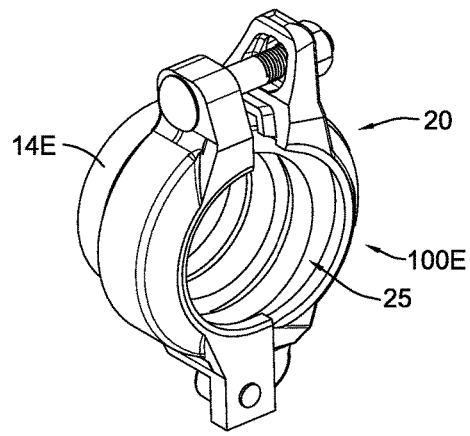
FIG. 44 is a perspective view of a quick-fitting pipe fitting assembly according to a sixth preferred embodiment of the present invention.
Figure 45:
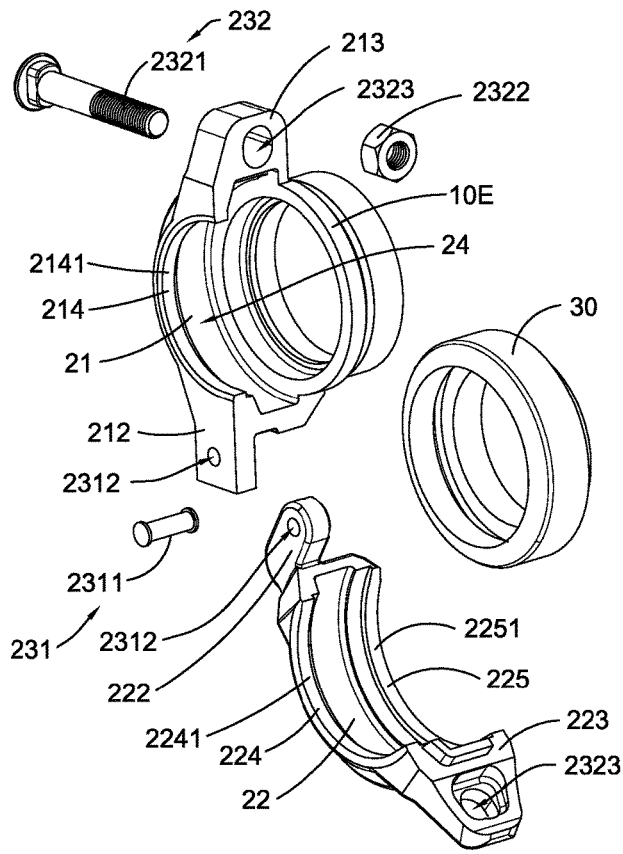
FIG. 45 is an exploded view of the quick-fitting pipe fitting assembly according to the above sixth preferred embodiment of the present invention.
Figure 46:
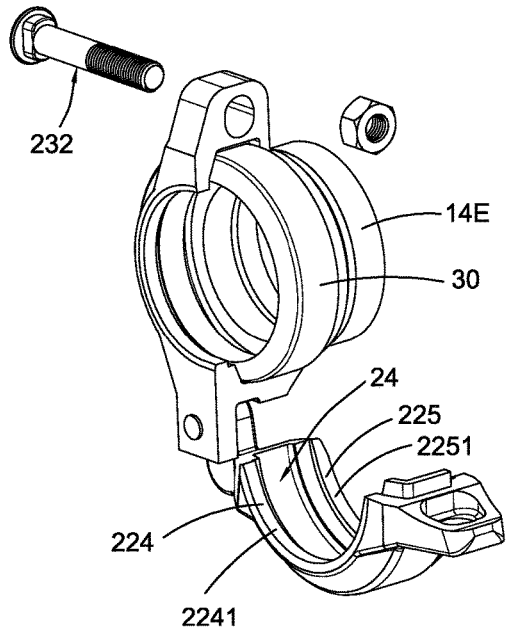
FIG. 46 is a partially exploded perspective view illustrating movable coupling elements and a pipe fitting body of the quick-fitting pipe fitting assembly according to the above sixth preferred embodiment of the present invention.

Referring to FIGS. 44 to 46 of the drawings, a quick-fitting pipe fitting assembly 100E according to a sixth preferred embodiment of the present invention is illustrated. According to this sixth preferred embodiment, the quick-fitting pipe fitting assembly 100E, which is embodied as a blind plate which has no bore and is used for closing a piping system, comprises a pipe fitting body 10E which comprises a blind plate sealing head 14E, a coupling unit 20 provided at the blind plate sealing head 14E for coupling with a pipe element 200, and a gasket 30 disposed at the coupling unit 20.

The coupling unit 20 comprises a fixed coupling element 21, a movable coupling element 22, and a plurality of connecting elements 23 for connecting the fixed coupling element 21 with the movable coupling element 22. The fixed coupling element 21 is integrally extended from the blind plate sealing head 14E for being fastened with the movable coupling element 22 by the connecting elements 23, so as to couple the corresponding pipe element 200 with the quick-fitting pipe fitting assembly 100E.

Similarly, the plurality of connecting elements 23 detachably couple the fixed coupling element 21 with the movable coupling element 22 of each of the two coupling units 20. According to this preferred embodiment, the plurality of connecting elements 23 comprise a pivotally connecting element 231 for pivotally connecting a first connecting portion 212 of the fixed coupling element 21 with a first connector portion 222 of the movable coupling element 22 and a fastening element 232 for fastening a second connecting portion 213 of the fixed coupling element 21 with a second connector portion 223 of the movable coupling element 22.

Figure 47A:
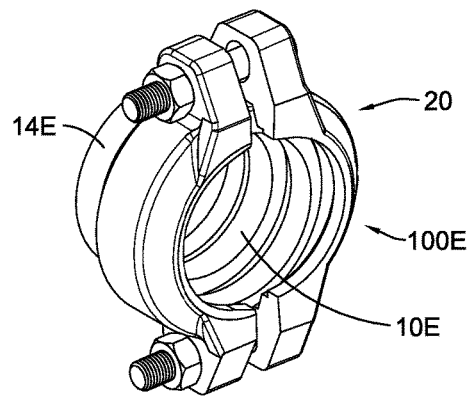
FIGS. 47A and 47B are perspective view and exploded view of a quick-fitting pipe fitting assembly according to a first alternative mode of the above sixth preferred embodiment of the present invention.
Figure 47B:
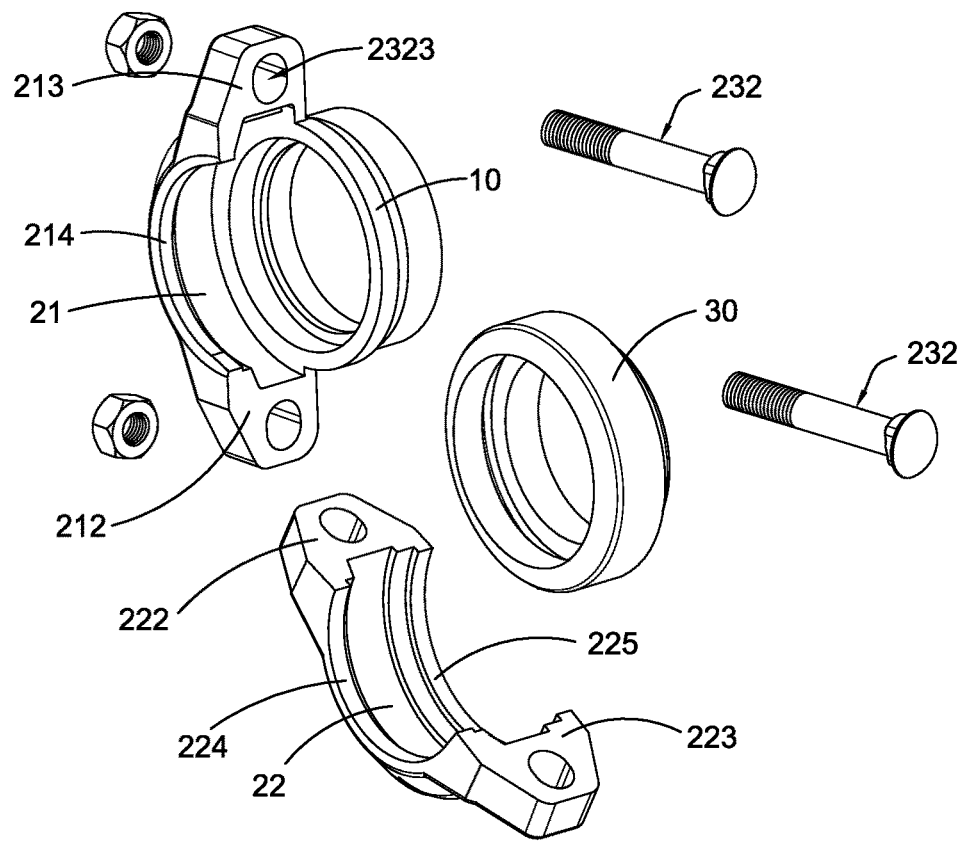

Referring to FIGS. 47A and 47B of the drawings, a quick-fitting pipe fitting assembly 100E according to a first alternative mode of the above sixth preferred embodiment of the present invention is illustrated. In this first alternative mode of the sixth preferred embodiment, the quick-fitting pipe fitting assembly 100E is a blind plate. The connecting elements 23 of each of the coupling units 20 are embodied as two fastening elements 232 each comprising the bolt 2321, the nut 2322 and the fastening holes 2323. Accordingly, when fasten the fixed coupling element 21 with the corresponding movable coupling element 22, the two fastening elements 232 are operated to firmly fasten the first connecting portion 212 with the first connector portion 222, and firmly fasten the second connecting portion 213 with the second connector portion 223.

Figure 48A:
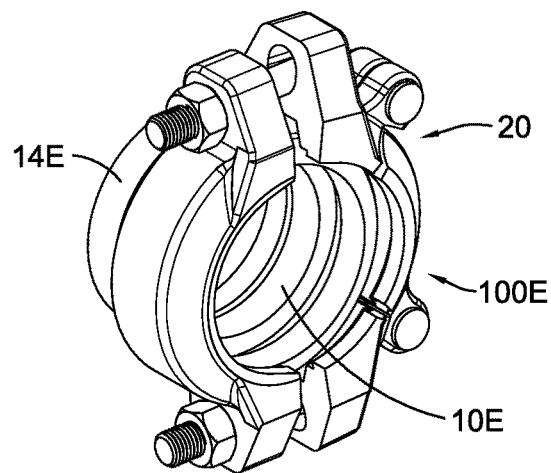
FIG. 48A is a perspective view of a quick-fitting pipe fitting assembly according to a second alternative mode of the above sixth preferred embodiment of the present invention.
Figure 48B:
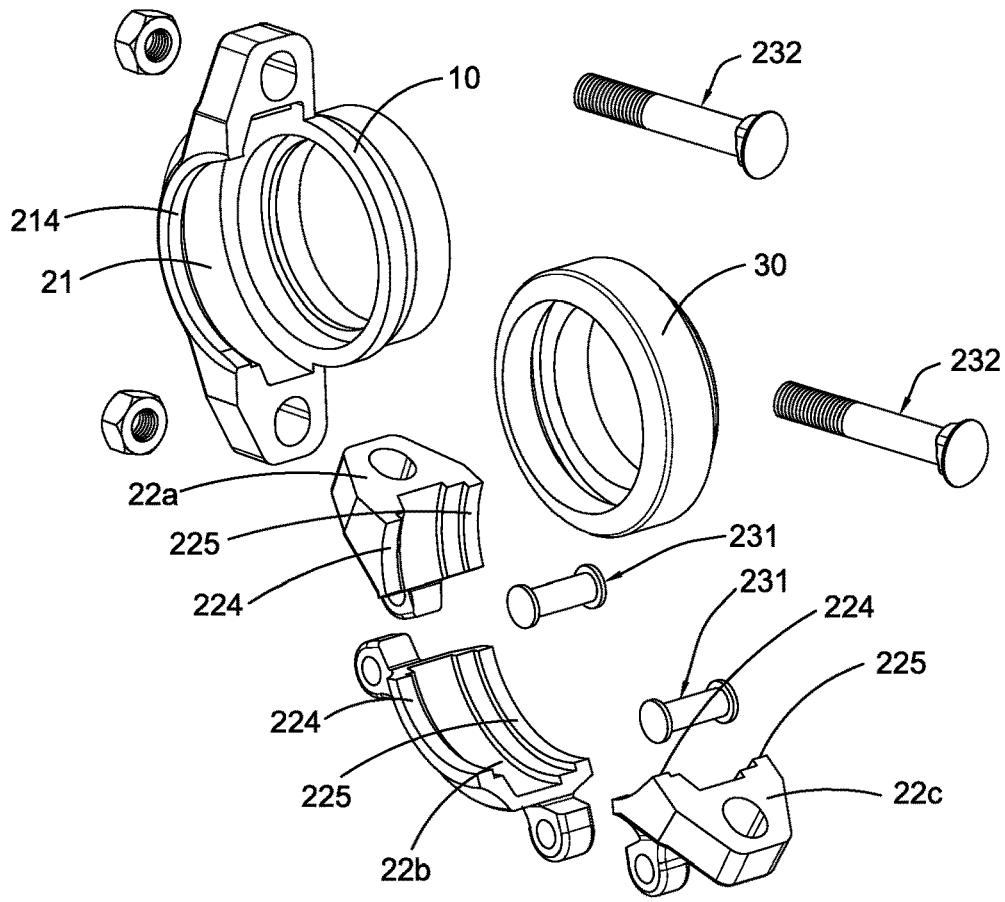
FIG. 48B is an exploded view of the quick-fitting pipe fitting assembly according to the second alternative mode of the above sixth preferred embodiment of the present invention.

Referring to FIGS. 48A and 48B of the drawings, a quick-fitting pipe fitting assembly 100E according to a second alternative mode of the above sixth preferred embodiment of the present invention is illustrated. In this second alternative mode of the sixth preferred embodiment, the quick-fitting pipe fitting assembly 100E is a blind plate, the coupling unit 20 comprises a first movable coupling element 22a, a second movable coupling element 22b, and a third coupling element 22c. The first movable coupling element 22a and the third coupling element 22c are respectively connected with the fixed coupling element 21 by two fastening elements 232, the first movable coupling element 22a and the third coupling element 22c are respectively connected with the second movable coupling element 22b which is positioned between the first movable coupling element 22a and the third coupling element 22c by two pivotally connecting elements 231.

Figure 49A:
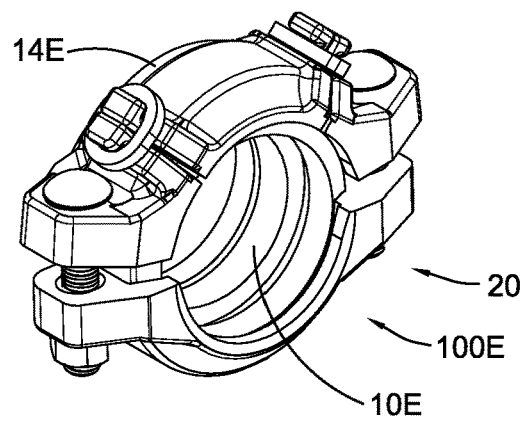
FIG. 49A is a perspective view of a quick-fitting pipe fitting assembly according to a third alternative mode of the above sixth preferred embodiment of the present invention.
Figure 49B:
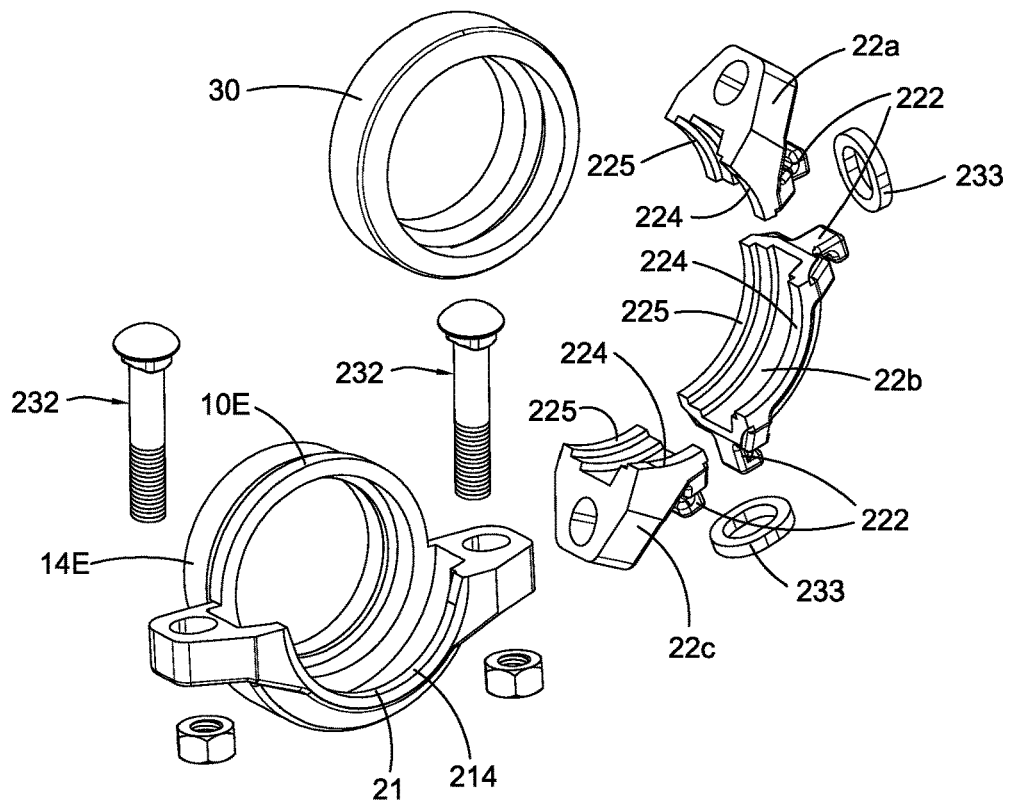
FIG. 49B is an exploded view of the quick-fitting pipe fitting assembly according to the third alternative mode of the above sixth preferred embodiment of the present invention.

Referring to FIGS. 49A and 49B of the drawings, a quick-fitting pipe fitting assembly 100E according to a third alternative mode of the above sixth preferred embodiment of the present invention is illustrated. In this third alternative mode of the sixth preferred embodiment, the quick-fitting pipe fitting assembly 100E is a blind plate, each of the coupling units 20 comprises a first movable coupling element 22a, a second movable coupling element 22b, and a third coupling element 22c. The first movable coupling element 22a and the third coupling element 22c are respectively connected with the fixed coupling element 21 by two fastening elements 232, and the first movable coupling element 22a and the third coupling element 22c are respectively connected with the second movable coupling element 22b which is positioned between the first movable coupling element 22a and the third coupling element 22c by two snap rings 233. In other words, the second movable coupling element 22b comprises two first connector portions 222 at two sides thereof, and each first connector portion 222 is connected with the first connector portion 222 of the first movable coupling element 22a and the third movable coupling element 22c by the snap ring 233.

Figure 50:
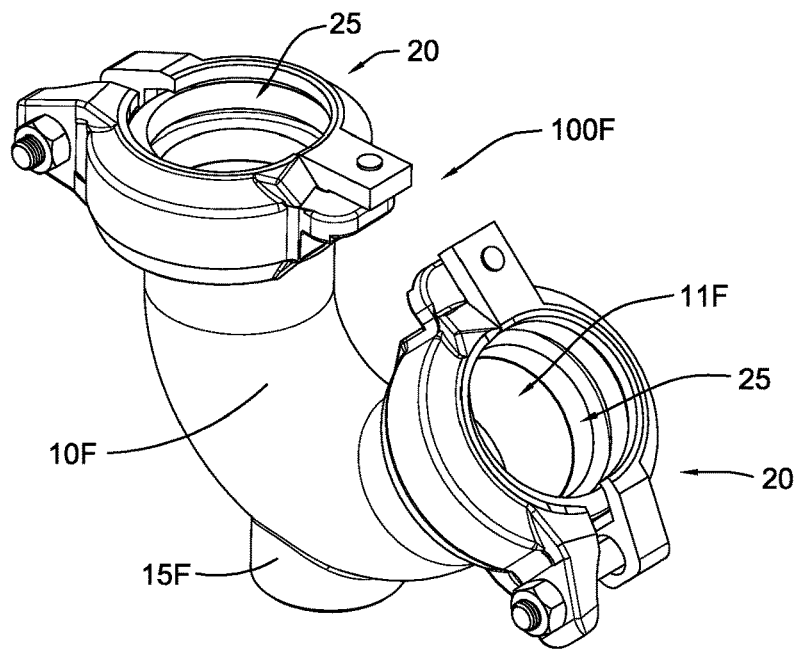
FIG. 50 is a perspective view of a quick-fitting pipe fitting assembly according to a seventh preferred embodiment of the present invention.
Figure 51:
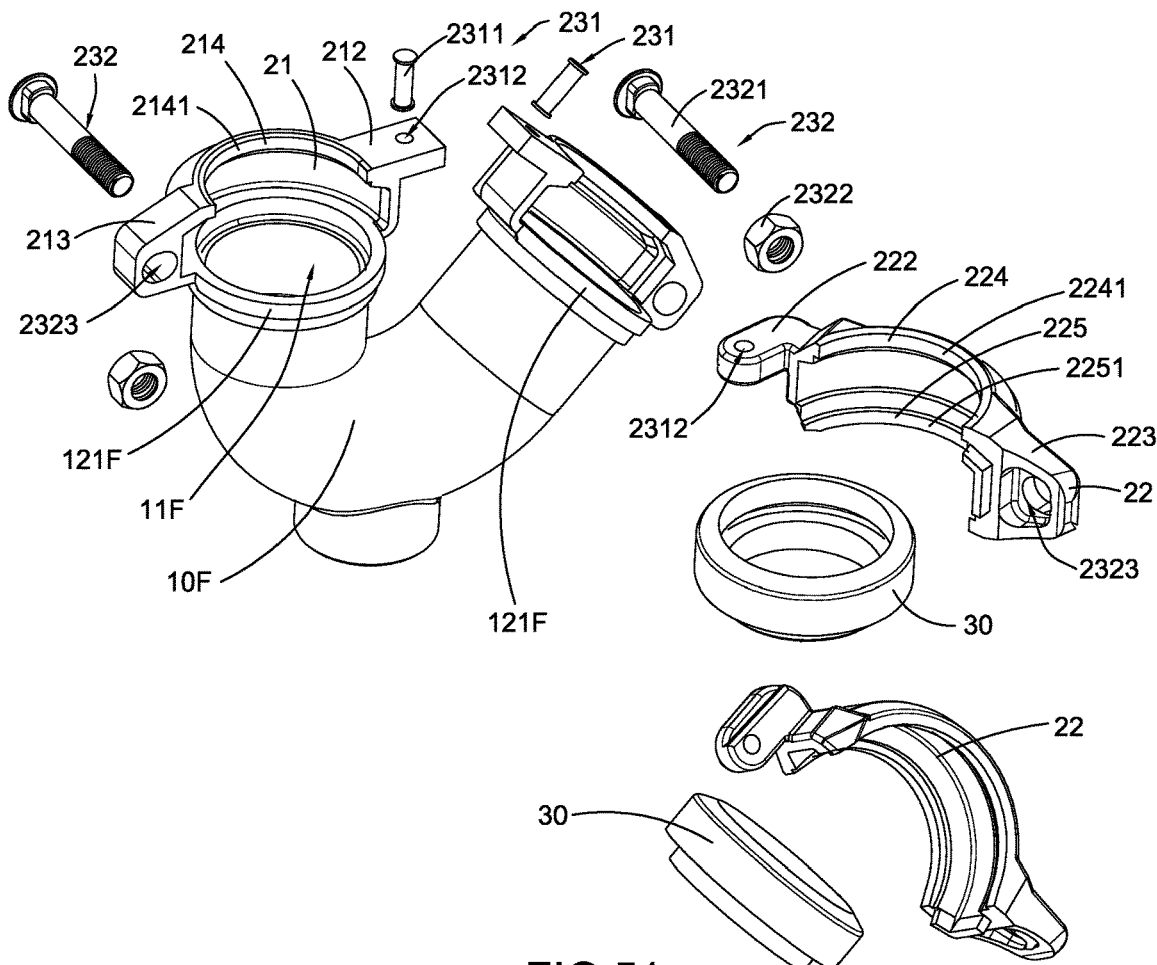
FIG. 51 is an exploded view illustrating the quick-fitting pipe fitting assembly according to the above seventh preferred embodiment of the present invention.
Figure 52:
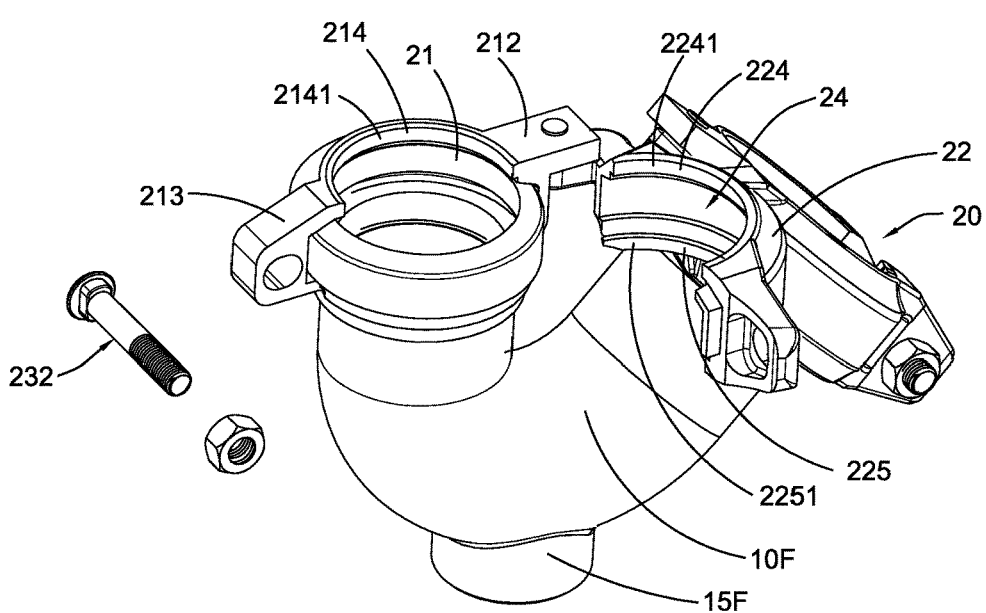
FIG. 52 is an exploded view of the quick-fitting pipe fitting assembly according to the above seventh preferred embodiment of the present invention.

Referring to FIGS. 50 to 52 of the drawings, a quick-fitting pipe fitting assembly 100F according to a seventh preferred embodiment of the present invention is illustrated. In this seventh preferred embodiment, the quick-fitting pipe fitting assembly 100F is a trap and is preferably made of a plastic material such as polyvinyl chloride or high density polyethylene.

The quick-fitting pipe fitting assembly 100F can be a P-trap, a U-trap, a S-trap or J-trap. As shown in the drawings of FIGS. 50 to 52, the quick-fitting pipe fitting assembly 100F of this embodiment is illustrated as a P-trap comprising a pipe fitting body 10F and a discharge portion 15F integrally extended from the pipe fitting body 10F which is a trap body comprising two end portions 121F and has a channel 11F which is a trap channel.

The quick-fitting pipe fitting assembly 100F further comprises two coupling units 20 provided at the two end portions 121F of the pipe fitting body 10F respectively for coupling with two pipe elements 200, and two gaskets 30 disposed at the two coupling units 20 respectively.

Each of the two coupling units 20 comprises a fixed coupling element 21, a movable coupling element 22, and a plurality of connecting elements 23 for connecting the fixed coupling element 21 with the movable coupling element 22. The fixed coupling element 21 is integrally extended from the corresponding end portion 121D of the pipe fitting body 10D for being fastened with the movable coupling element 22 by the connecting elements 23, so as to couple the corresponding pipe element 200 with the quick-fitting pipe fitting assembly 100D.

Similarly, the plurality of connecting elements 23 detachably couple the fixed coupling element 21 with the movable coupling element 22 of each of the two coupling units 20. According to this preferred embodiment, the plurality of connecting elements 23 comprise a pivotally connecting element 231 for pivotally connecting a first connecting portion 212 of the fixed coupling element 21 with a first connector portion 222 of the movable coupling element 22 and a fastening element 232 for fastening a second connecting portion 213 of the fixed coupling element 21 with a second connector portion 223 of the movable coupling element 22.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A pipe fitting assembly for coupling with at least one pipe element, comprising:
    a pipe fitting body;
    at least one coupling unit comprising a fixed coupling element integrally extended from said pipe fitting body and a movable coupling element;
    at least one gasket disposed at said at least one coupling unit;
    a plurality of connecting elements movably connecting said fixed coupling element with said movable coupling element, such that the at least one pipe element is adapted for being preassembled with the at least one coupling unit, wherein said plurality of connecting elements comprises at least one fastening element that is capable of being operated to fasten said movable coupling element with said fixed coupling element, so as for fastening the at least one pipe element with said at least one coupling unit,
    wherein the at least one pipe element comprises a coupling end portion having a coupling circumference, wherein said pipe fitting body comprises an end portion having a coupling surface, wherein said fixed coupling element comprises a fixed engaging key having a fixed engaging surface for engaging with the coupling circumference, wherein said movable coupling element comprises a first movable engaging key having a first movable engaging surface for engaging with the coupling circumference, and a second movable engaging key having a second movable engaging surface for engaging said coupling surface,
    wherein said fixed engaging surface of said fixed engaging key of said fixed coupling element has a fixed radius of curvature, wherein said first movable engaging surface and said second movable engaging surface of said movable coupling element have varying radiuses of curvature and are respectively deformed to change said varying radiuses of curvature for engaging with the coupling circumference and the coupling surface when said at least one fastening element is operated to fasten said movable coupling element with said fixed coupling element.

2. The pipe fitting assembly, as recited in claim 1, wherein each of said first movable engaging surface and said second movable engaging surface defines a curve of varying radiuses of curvature, wherein said curve is selected from the group consisting of a logarithmic spiral curve, an archimedes spiral curve, a pascal spiral curve, an ellipse curve, a high-power curve, and a combination thereof.

3. The pipe fitting assembly, as recited in claim 1, wherein said end portion of said pipe fitting body comprises a first part and a second part, wherein said fixed coupling element having two ends is integrally extended from said second part of said end portion of said pipe fitting body, wherein said first part of said end portion of said pipe fitting body comprises the coupling surface which is extended between said two ends of said fixed coupling element.

4. The pipe fitting assembly, as recited in claim 3, wherein said first part of said end portion of said pipe fitting body comprises a retaining protrusion integrally protruded from said coupling surface between said two ends of said fixed coupling element to retain said second movable engaging key at said end portion of the pipe fitting body.

5. The pipe fitting assembly, as recited in claim 3, wherein said first part of said end portion of said pipe fitting body comprises a retaining attachment attached to said coupling surface between said two ends of said fixed coupling element to retain said second movable engaging key at said end portion of the pipe fitting body.

6. The pipe fitting assembly, as recited in claim 3, wherein said first part of said end portion of said pipe fitting body has a retaining groove configured for engaging with said second movable engaging key.

7. The pipe fitting assembly, as recited in claim 3, wherein said first part of said end portion of said pipe fitting body is a plain end portion having said coupling surface for engaging with said second movable engaging surface of said second movable engaging key.

8. The pipe fitting assembly, as recited in claim 1, wherein the at least one pipe element comprises a coupling end portion having a coupling groove and the coupling circumference at a bottom of the coupling groove, wherein the coupling groove is arranged for engaging with said fixed engaging key and said first movable engaging key.

9. The pipe fitting assembly, as recited in claim 1, wherein the at least one pipe element comprises a coupling end portion having the coupling circumference and a protrusion ring integrally protruded from the coupling circumference for retaining said first movable engaging key at the coupling end portion of the at least one pipe element.

10. The pipe fitting assembly, as recited in claim 1, wherein the at least one pipe element comprises a coupling end portion having the coupling circumference and an attachment ring attached to the coupling circumference for retaining said first movable engaging key at the coupling end portion of the at least one pipe element.

11. The pipe fitting assembly, as recited in claim 1, wherein the at least one pipe element comprises a coupling end portion which is a plain end portion having the coupling circumference.

12. The pipe fitting assembly, as recited in claim 1, wherein said fixed coupling element and said first movable coupling element of said at least one coupling unit defines an inner cavity, wherein said end portion of said pipe fitting body has an outer end wall, wherein said at least one gasket is received in said inner cavity and comprises a portion biasing said outer end wall of said end portion of said pipe fitting body.

13. The pipe fitting assembly, as recited in claim 1, wherein said fixed coupling element and said first movable coupling element of said at least one coupling unit defines an inner cavity, wherein said end portion of said pipe fitting body has an inner end wall, wherein said at least one gasket comprises a gasket body which is received in said inner cavity and a biasing portion biasing said inner end wall of said end portion of said pipe fitting body.

14. The pipe fitting assembly, as recited in claim 1, wherein said at least one gasket comprises a portion adjacent to said end portion of said pipe fitting body and a rigid frame embedded in said portion of said at least one gasket.

15. The pipe fitting assembly, as recited in claim 1, wherein said plurality of connecting elements comprises a pivotally connecting element and said fastening element which connect said fixed coupling element with said first movable coupling element.

16. The pipe fitting assembly, as recited in claim 1, wherein said plurality of connecting elements comprises two said fastening elements which connect said fixed coupling element with said first movable coupling element.

17. The pipe fitting assembly, as recited in claim 1, wherein said least one coupling unit comprises a first movable coupling element, a second movable coupling element, and a third coupling element, wherein said plurality of connecting elements comprises two fastening elements and two pivotally connecting elements, wherein said first movable coupling element and said third coupling element are respectively connected with said fixed coupling element by said two fastening elements, wherein said first movable coupling element and said third coupling element are respectively connected with said second movable coupling element which is positioned between said first movable coupling element and said third coupling element by said two pivotally connecting elements.

18. The pipe fitting assembly, as recited in claim 1, wherein said least one coupling unit comprises a first movable coupling element, a second movable coupling element, and a third coupling element, wherein said plurality of connecting elements comprises two fastening elements and two snap rings, wherein said first movable coupling element and said third coupling element are respectively connected with said fixed coupling element by said two fastening elements, wherein said first movable coupling element and said third coupling element are respectively connected with said second movable coupling element which is positioned between said first movable coupling element and said third coupling element by said two snap rings.

19. The pipe fitting assembly, as recited in claim 1, wherein said quick-fitting pipe fitting is a pipe fitting selected from the group consisting of an elbow, a tee, a cross, a reducer, a blind plate, and a trap.

20. A method for coupling a pipe element via a pipe fitting assembly recited in claim 1, comprising a step of receiving a coupling end portion of the pipe element by a coupling unit which comprises a fixed coupling element and a movable coupling element, wherein said fixed coupling element is integrally extended from a pipe fitting body, and said movable coupling element is movably mounted with said fixed coupling element.

21. The method, as recited in claim 20, further comprising the steps of:
  aligning a fixed engaging surface of a fixed engaging key of the fixed coupling element and a first movable engaging surface of a first movable engaging key of the movable coupling element of the coupling unit with a coupling circumference of the pipe element;
  aligning a second movable engaging surface of a second movable engaging key of the coupling unit with a coupling surface of said pipe fitting body, wherein each of the first and second movable engaging surfaces has varying radiuses of curvature, wherein the fixed engaging surface has a fixed radius of curvature; and
  deforming said first movable engaging surface to allow said first movable engaging surface to at least partially contact with the coupling circumference of the pipe element and deforming said second movable engaging surface to allow said second movable engaging surface to at least partially contact with the coupling surface of said pipe fitting body.

22. A method for coupling a pipe element via a pipe fitting assembly recited in claim 1, comprising the following steps:
- (A) inserting a coupling end portion of the pipe element in a coupling unit comprising a fixed coupling element integrally extended from a pipe fitting body and a movable coupling element which is movably connected with said fixed coupling element; and
- (B) operating a fastening element to fasten said fixed coupling element with said movable coupling element to retain the coupling end portion of the pipe element in the coupling unit.

* * * * *